US011711284B2

(12) United States Patent
Svennebring et al.

(10) Patent No.: US 11,711,284 B2
(45) Date of Patent: Jul. 25, 2023

(54) LINK PERFORMANCE PREDICTION TECHNOLOGIES

(71) Applicant: Intel Corporation, Santa Clara, CA (US)

(72) Inventors: Jonas Svennebring, Sollentuna (SE); Antony Vance Jeyaraj, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/505,919

(22) Filed: Oct. 20, 2021

(65) Prior Publication Data

US 2022/0038359 A1 Feb. 3, 2022

Related U.S. Application Data

(62) Division of application No. 16/452,352, filed on Jun. 25, 2019, now Pat. No. 11,159,408.

(51) Int. Cl.
*H04L 43/0882* (2022.01)
*H04W 24/08* (2009.01)

(52) U.S. Cl.
CPC ......... *H04L 43/0882* (2013.01); *H04W 24/08* (2013.01)

(58) Field of Classification Search
CPC ............ H04L 43/0882; H04W 24/08
See application file for complete search history.

(56) References Cited

U.S. PATENT DOCUMENTS

| 2008/0049631 | A1 | 2/2008 | Morrill |
| 2018/0270679 | A1* | 9/2018 | Laselva ............ H04W 36/0088 |
| 2018/0302152 | A1 | 10/2018 | Shikhmanter et al. |
| 2019/0138934 | A1* | 5/2019 | Prakash ................. H04L 43/08 |
| 2019/0335351 | A1 | 10/2019 | Hui et al. |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 15)", Mar. 2019, 388 pages, 3GPP TS 36.413 v15.5.0.

(Continued)

*Primary Examiner* — Duc C Ho
(74) *Attorney, Agent, or Firm* — Schwabe, Williamson & Wyatt, P.C.

(57) ABSTRACT

Various systems and methods for determining and communicating Link Performance Predictions (LPPs), such as in connection with management of radio communication links, are discussed herein. The LPPs are predictions of future network behaviors/metrics (e.g., bandwidth, latency, capacity, coverage holes, etc.). The LPPs are communicated to applications and/or network infrastructure, which allows the applications/infrastructure to make operational decisions for improved signaling/link resource utilization. In embodiments, the link performance analysis is divided into multiple layers that determine their own link performance metrics, which are then fused together to make an LPP. Each layer runs different algorithms, and provides respective results to an LPP layer/engine that fuses the results together to obtain the LPP. Other embodiments are described and/or claimed.

30 Claims, 19 Drawing Sheets

(56) References Cited

OTHER PUBLICATIONS

"3rd Generation Partnership Project; Technical Specification Group Radio Access Network; NG-RAN; NG Application Protocol (NGAP) (Release 15)", Mar. 2019, 319 pages, 3GPP TS 38.413 v15.3.0.
Gitanjali Bhutani, "Application of Machine-Learning Based Prediction Techniques in Wireless Networks", May 2014, 10 pages, Int. J. Communications, Network and System Sciences.
Leo Breiman, "Radom Forests", 2001, 28 pages, Kulwer Academic Publishers, Netherlands.
Federico Castanedo, "A Review of Data Fusion Techniques", Aug. 9, 2013, 20 pages, Hidawi Publishing Corporation, The Scientific World Journal, vol. 2013, Article ID 704504.
Xu Chen et al.."Predicting a User's Next Cell With Supervised Learning Based on Channel States". May 13, 2013, 5 pages.
Rui Rodriques De Mello Junior, "Fusao De Dados Em Gamma", May 28, 2015, 111 pages.
Ted Gueniche et al., "Compact Prediction Tree: A Lossless Model for Accurate Sequence Prediction" 2013, 12 pages.
Intel, "Link Quality Prediction: Delivering Better Service Performances and Improved Network Efficiency with Predictive Network and Service Characterisation", Feb. 18, 2019, 12 pages.
Rachel C. King et al., "Application of data fusion techniques and technologies for wearable health monitoring", 2017, 12 pages, Medical Engineering and Physics 42.
A. Suresh Kumar et al., "Handover forecasting in 5G using machine learning", 2018, 4 pages, International Journal of Engineering & Technology, 7 (2.31).
Panagiotis Lytrivis et al., "Sensor Data Fusion in Automotive Applications", Feb. 2009, 10 pages.
Michael J. Mcguffin, "Simple Algorithms for Network Visualization: A Tutorial", Aug. 2012, 17 pages, Tsinghua Science and Technology, ISSN 1007-0214 Jan. 2012, Vo. 17, No. 4.
Rui R. Mello Jr. et al., "Exploring the Equivalence between Dynamic Dataflow Model and Gamma —General Abstract Model for Mutliset mAnipulation", Nov. 1, 2018, 9 pages.
Salman Memon et al., "Using Machine Learning for Handover Optimization in Vehicular Fog Computing", Dec. 18, 2018, 9 pages.
Maxmillian Minichetti, "Prediction of Cellular Service Quality", 2017, 6 pages, Standford University.
Takayuki Nishio et al., "Proactive Received Power Prediction Using Machine Learning and Depth Images for mmWave Networks", Jul. 24, 2018, 30 pages.
Dr. IR. Nada Milisavljevic, "Sensor and Data Fusion", 2009, 501 pages, In-Teh, Vienna, Austria.
Alfred Strauss et al., "Gamma Prediction models for Long-Term Creep Deformations of PC Bridges", Jan. 2017, 42 pages, Journal of Civil Engineering and Management.
Andrew Tch "Networks, explained", Aug. 4, 2017, 26 pages [retreived on Jun. 14, 2019]. Retrieved from the Internet: <URL: http://www.towardsdatascience.com/the-mostly-complete-chart-of-neural-netoworks-expalined-3fb6f2367464>.
Mingyuan Zhou et al., "Augmentable Gamma Belief Networks", 2016,4 4 pages, Journal of Machine Learning Research 17.
Kizhou Zhu "Machine Learning in Indoor Positioning and Channel Prediction Systems", 2018, 87 pages, University of Victoria.
Office Action dated Nov. 4, 2020 for U.S. Appl. No. 16/452,352, 13 pages.
Office Action dated Mar. 8, 2021 for U.S. Appl. No. 16/452,352, 6 pages.

\* cited by examiner

LINK PERFORMANCE PREDICTION TECHNOLOGIES

TECHNICAL FIELD

The present application is a divisional application of U.S. application Ser. No. 16/452,352 filed on Jun. 25, 2021, now U.S. Pat. No. 11,159,408 issued on Oct. 26, 2021, the contents of which is hereby incorporated by reference in its entirety.

BACKGROUND

Emerging wireless network technologies (e.g., Fifth Generation (5G) or New Radio (NR)) are expected to provide increased improvements in data rates, device density, latency, and power consumption. Some new services that may exploit these improvements include gigabit wireless broadband network access, smart factories, rich media content streaming including virtual and augmented reality gaming, autonomous or semi-autonomous driving applications, services provided by unmanned aerial vehicles (UAVs), and cloud computing and/or edge intelligence services. To make the most of these potential improvements, mobile network operators will need to transition from a single purpose consumer broadband network to a versatile network supporting services as diverse as high-density sensor networks to real-time safety and mission-critical industrial applications.

The realized and perceived performance of wireless networks depends on radio link quality. The variation in wireless network performance becomes more pronounced as link quality conditions are more dynamic, such as when user equipment are highly mobile (as opposed to being relatively static). As a result, the realized and/or perceived performance of wireless networks will be dependent on the conditions experienced on the wireless link.

Currently, some network traffic types (e.g., streaming media) are tolerant to some delay, within buffering limits, while other types of traffic (e.g., bulk software downloads) are even less sensitive to dynamic link quality conditions. Building additional infrastructure and/or using reactive solutions (e.g., Dynamic Adaptive Streaming over Hypertext Transfer Protocol (HTTP) (DASH or MPEG-DASH) and HTTP Live Streaming (HLS)) to address variations in network conditions (e.g., performance and congestion) has often been enough to provide sufficient quality of service and/or quality of experience for these traffic types. However, these existing solutions may not be sufficient to support new traffic types and/or new services that may be realized by the emerging wireless network technologies.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
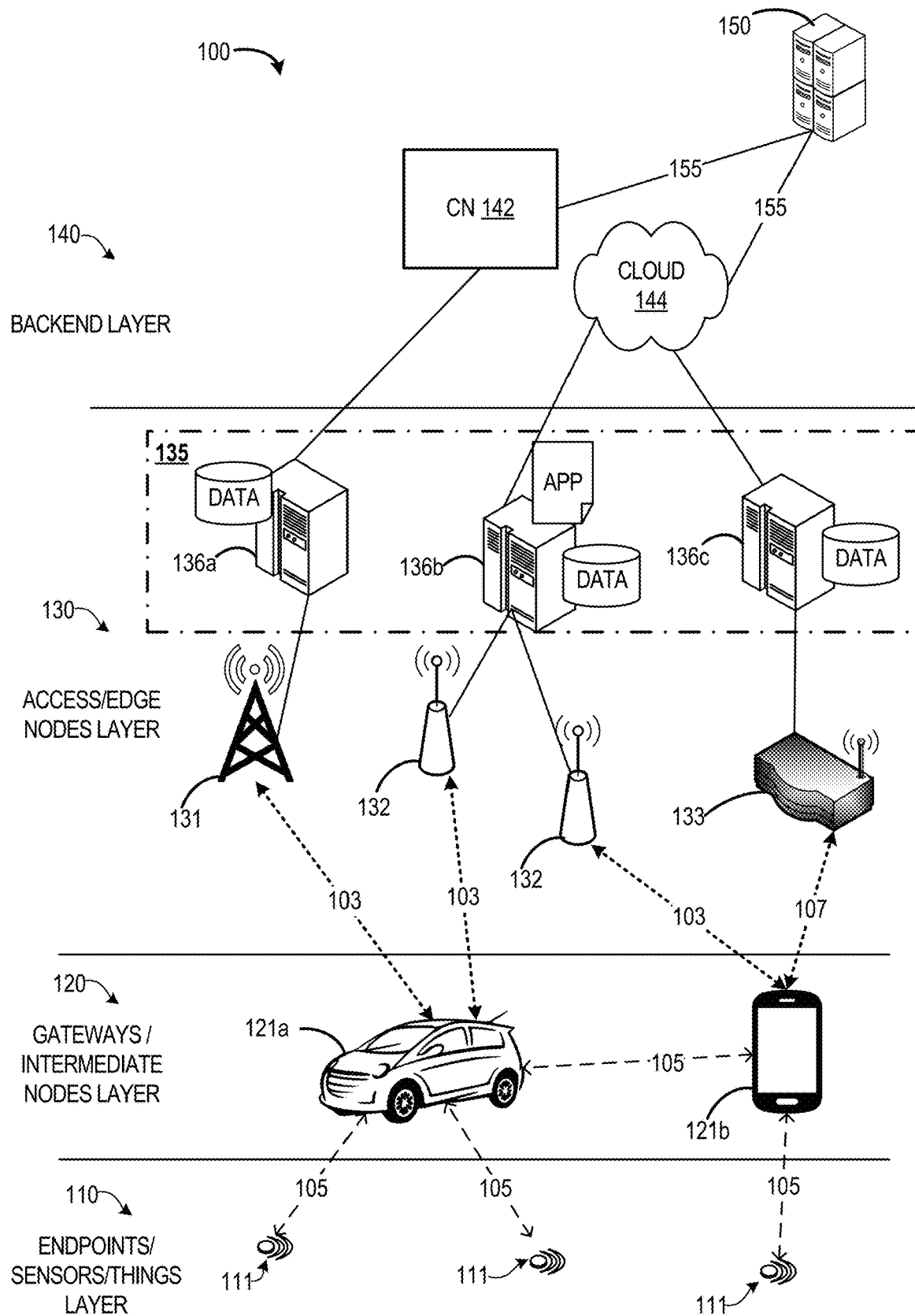
FIG. 1 depicts an example edge computing environment according to various embodiments.

Disclosed embodiments are related to wireless communications, and in particular, technologies for Link Quality Prediction (LQP) or Link Performance Prediction (LPP). LQP/LPP to improve wireless network performance by predicting future network behaviors/metrics (e.g., bandwidth (BW), latency, capacity, coverage holes, etc.) and making applications, user equipment (UE), and/or network infrastructure more aware of these predicted network behaviors/metrics. The LPP technology discussed herein uses machine learning (ML) techniques and a rich set of historical and real-time data feeds to dynamically predict the quality and/or performance of any given radio link and optimize application level behaviors. This allows the applications/UEs/infrastructure to make operational decisions such as, for example, taking precautions where there are coverage holes, increasing throughput where there are high-performing cells, entering an idle or sleep mode in crowded or overloaded cells, adjusting transmission power, adjusting antenna tilt and/or azimuth, and/or other like operational decisions. The aforementioned applications may be user applications running on user equipment (UEs), core network functions in a mobile network operator's core network, and/or server-side applications running on one or more servers in a datacenter or server farm. These LPPs provide improved customer experience as well as improvements in network/signaling resource utilization/conservation, which in turn enables more optimal infrastructure deployments. Embodiments herein are related to different approaches to making these forward-looking LPPs for different types of network behaviors in various scenarios. The LPP technology discussed herein can also be used for other network planning and management tasks to further improve network performance and reduce operating costs.

In various embodiments, the link performance analysis is divided into multiple layers. Each prediction layer determines its own predicted performance metrics, which are then fused together by an LPP layer or LPP engine to make a link performance prediction. Each layer runs one or more ML algorithms or ML models, which are then used to determine respective predicted performance metrics. Each prediction layer provides its respective predicted performance metrics to the LPP layer/engine that fuses the results together to obtain an LPP. In embodiments, specific ML algorithms, or combinations of ML algorithms, are used at each prediction layer to determine the respective predicted performance metrics, and one or more layers may use different ML algorithms (or combinations of ML algorithms) than those used by other prediction layers. The LPP layer/engine generates and provides LPP indications to relevant applications/UEs/infrastructure to allow those applications/UEs/infrastructure to tailor their operations accordingly. The various prediction layers and the LPP layer/engine may be located in one or more servers in a server farm/data center or in one or more edge servers (e.g., MEC servers) deployed at the edge of a network. Other embodiment may be described and/or claimed.

The technical approaches and/or the prediction methodologies discussed herein obtain inputs from a plurality of prediction layers, and determines a LPP for individual UEs based on the obtained inputs and an internal state of the system. The LPP is communicated to the individual UEs, communicated to one or more network elements communicating with the individual UEs, and/or network access node (NANs) to which the individual UEs is/are attached. In general, the LPP is a "hint" or other like indicator that one or more applications operating on the individual UEs, network element(s), and/or NANs can use to adjust their mode of operation, internal behaviors, and/or signaling/communication resources based on the LPP.

As examples, the LPP may be in the form of one or more of a BW, latency, jitter, round trip time (RTT), number of interrupts, out-of-order delivery of data packets, transmission power, bit error rate, BER, packet loss rate, PRR, SNR, SINR, SINAD ratio, BLER, RSSI, RSRP, RSRQ, channel interference measurements, thermal noise power measurements, received interference power measurements, network or cell load, a recommended or needed transmission power, and/or a prediction of any other measurement or data type discussed herein. The LPP can be directly communicated (e.g., Mbps for BW), with some calculations (logarithmic, percentage, etc.) or in a discrete levels (e.g., a value of "1" for <100 kbps, 2 for <500 kbps, and/or the like).

Referring now to FIG. 1, which illustrates an example edge computing environment 100 in accordance with various embodiments. FIG. 1 specifically illustrates the different layers of communication occurring within the environment 100, starting from endpoint sensors or things layer 110 (e.g., operating in an Internet of Things (IoT) network topology) comprising one or more IoT devices 111 (also referred to as edge endpoints 110 or the like); increasing in sophistication to gateways or intermediate node layer 120 comprising one or more user equipment (UEs) 121*a* and 121*b* (also referred to as intermediate nodes 120 or the like), which facilitate the collection and processing of data from endpoints 110; increasing in processing and connectivity sophistication to access node layer 130 (or "edge node layer 130") comprising a plurality of network access nodes (NANs) 131, 132, and 133 (collectively referred to as "NANs 131-133" or the like) and a plurality of edge compute nodes 136*a-c* (collectively referred to as "edge compute nodes 136" or the like) within an edge computing system 135; and increasing in connectivity and processing sophistication to a backend layer 110 comprising core network (CN) 142 and cloud 144. The processing at the backend layer 110 may be enhanced by network services as performed by a remote application server 150 and/or other cloud services. Some or all of these elements may be equipped with or otherwise implement some or all aspects of the LPP embodiments discussed infra.

The environment 100 is shown to include end-user devices, such as intermediate nodes 120 and endpoints 110, which are configured to connect to (or communicatively couple with) one or more multiple communication networks (also referred to as "access networks," "radio access networks," or the like) based on different access technologies (or "radio access technologies") for accessing application services. These access networks may include one or more of NANs 131, 132, and/or 133. The NANs 131-133 are arranged to provide network connectivity to the end-user devices via respective links 103, 107 between the individual NANs and the one or more UEs 111, 121.

As examples, the communication networks and/or access technologies may include cellular technology such as LTE, MuLTEfire, and/or NR/5G (e.g., as provided by Radio Access Network (RAN) node 131 and/or RAN nodes 132), WiFi or wireless local area network (WLAN) technologies (e.g., as provided by access point (AP) 133 and/or RAN nodes 132), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), User Datagram Protocol (UDP), QUIC (sometimes referred to as "Quick UDP Internet Connections"), Stream Control Transmission Protocol (SCTP), Resource Reservation Protocol (RSVP), Virtual Private Network (VPN), Multi-Path TCP (MPTCP), Generic Routing Encapsulation (GRE), GeoNetworking protocol, Basic Transport Protocol (BTP), etc.).

The intermediate nodes 120 include UE 121*a* and UE 121*b* (collectively referred to as "UE 121" or "UEs 121"). In this example, the UE 121*a* is illustrated as a vehicle UE, and UE 121*b* is illustrated as a smartphone (e.g., handheld touchscreen mobile computing device connectable to one or more cellular networks). However, these UEs 121 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 110 include UEs 111, which may be IoT devices (also referred to as "IoT devices 111"), which are uniquely identifiable embedded computing devices (e.g., within the Internet infrastructure) that comprise a network access layer designed for low-power IoT applications utilizing short-lived UE connections. The IoT devices 111 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 111 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 111 can utilize technologies such as M2M or MTC for exchanging data with an MTC server (e.g., a server 150), an edge server 136 and/or edge computing system 135, or device via a PLMN, ProSe or D2D communication, sensor networks, or IoT networks. The M2M or MTC exchange of data may be a machine-initiated exchange of data.

The IoT devices 111 may execute background applications (e.g., keep-alive messages, status updates, etc.) to facilitate the connections of the IoT network. Where the IoT devices 111 are, or are embedded in, sensor devices, the IoT network may be a WSN. An IoT network describes an interconnecting IoT UEs, such as the IoT devices 111 being connected to one another over respective direct links 105. The IoT devices may include any number of different types of devices, grouped in various combinations (referred to as an "IoT group") that may include IoT devices that provide one or more services for a particular user, customer, organizations, etc. A service provider (e.g., an owner/operator of server 150, CN 142, and/or cloud 144) may deploy the IoT devices in the IoT group to a particular area (e.g., a geolocation, building, etc.) in order to provide the one or more services. In some implementations, the IoT network may be a mesh network of IoT devices 111, which may be termed a fog device, fog system, or fog, operating at the edge of the cloud 144. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 144 to Things (e.g., IoT devices 111). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 130) and/or a central cloud computing service (e.g., cloud 144) for performing heavy computations or computationally burdensome tasks. On the other hand, edge cloud computing consolidates human-operated, voluntary resources, as a cloud. These voluntary resource may include, inter-alia, intermediate nodes 120 and/or endpoints 110, desktop PCs, tablets, smartphones, nano data centers, and the like. In various implementations, resources in the edge cloud may be in one to two-hop proximity to the IoT devices 111, which may result in reducing overhead related to processing data and may reduce network delay.

In some embodiments, the fog may be a consolidation of IoT devices 111 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 144. The fog operating at the edge of the cloud 144 may overlap or be subsumed into an edge network 130 of the cloud 144. The edge network of the cloud 144 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 136 or edge devices). The Fog layer resides on top of the edge layer and is a consolidation of networking devices such as the intermediate nodes 120 and/or endpoints 110 of FIG. 1.

Data may be captured, stored/recorded, and communicated among the IoT devices 4804 (or, for example, among the intermediate nodes 120 and/or endpoints 110 that have direct links 105 with one another as shown by FIG. 1). Analysis of the traffic flow and control schemes may be implemented by aggregators that are in communication with the IoT devices 111 and each other through a mesh network. The aggregators may be a type of IoT device 111 and/or network appliance. In the example of FIG. 1, the aggregators may be edge nodes 130, or one or more designated intermediate nodes 120 and/or endpoints 110. Data may be uploaded to the cloud 144 via the aggregator, and commands can be received from the cloud 144 through gateway devices that are in communication with the IoT devices 111 and the aggregators through the mesh network. Unlike the traditional cloud computing model, in some implementations, the cloud 144 may have little or no computational capabilities and only serves as a repository for archiving data recorded and processed by the fog. In these implementations, the cloud 144 centralized data storage system and provides reliability and access to data by the computing resources in the fog and/or edge devices. Being at the core of the architecture, the Data Store of the cloud 144 is accessible by both Edge and Fog layers of the aforementioned edge-fog network.

As mentioned previously, the access networks provide network connectivity to the end-user devices 120, 110 via respective NANs 131-133. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 131, 132. This virtualized framework allows the freed-up processor cores of the NANs 131, 132 to perform other virtualized applications, such as virtualized applications for LPP embodiments discussed herein.

The UEs 121, 111 may utilize respective connections (or channels) 103, each of which comprises a physical communications interface or layer. The connections 103 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 111, 121 and the NANs 131-133 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 111, 121 and NANs 131-133 may operate using LAA, enhanced LAA (eLAA), and/or further eLAA (feLAA) mechanisms. The UEs 121, 111 may further directly exchange communication data via respective direct links 105, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/ Bluetooth Low Energy (BLE) protocols).

The UEs 111, 121 are capable of measuring various signals or determining/identifying various signal/channel characteristics. Signal measurement may be performed for cell selection, handover, network attachment, testing, and/or other purposes. The measurements collected by the UEs 111, 121 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 131-133 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0, 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 131-133.

The UE 121*b* is shown to be configured to access an access point (AP) 133 via a connection 107. In this example, the AP 133 is shown to be connected to the Internet without connecting to the CN 142 of the wireless system. The connection 107 can comprise a local wireless connection, such as a connection consistent with any IEEE 802.11 protocol, wherein the AP 133 would comprise a wireless fidelity (WiFi®) router. In embodiments, the UEs 121 and IoT devices 111 can be configured to communicate using suitable communication signals with each other or with any of the AP 133 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 131 and 132 that enable the connections 103 may be referred to as "RAN nodes" or the like. The RAN nodes 131, 132 may comprise ground stations (e.g., terrestrial access points) or satellite stations providing coverage within a geographic area (e.g., a cell). The RAN nodes 131, 132 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 131 is embodied as a NodeB, evolved NodeB (eNB), or a next generation NodeB (gNB), and the RAN nodes 132 are embodied as relay nodes, distributed units, or Road Side Unites (RSUs). Any other type of NANs can be used.

Any of the RAN nodes 131, 132 can terminate the air interface protocol and can be the first point of contact for the UEs 121 and IoT devices 111. In some embodiments, any of the RAN nodes 131/132 can fulfill various logical functions for the RAN including, but not limited to, radio network controller (RNC) functions such as radio bearer management, uplink and downlink dynamic radio resource management and data packet scheduling, and mobility management. In embodiments, the UEs 111, 121 can be configured to communicate using OFDM communication signals with each other or with any of the NANs 131, 132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RNC function(s) operated by the RAN or individual NANs 131-132 organize downlink transmissions (e.g., from any of the RAN nodes 131, 132 to the UEs 111, 121) and uplink transmissions (e.g., from the UEs 111, 121 to RAN nodes 131, 132) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 111, 121 at each transmission time interval (TTI). A TTI is the duration of a transmission on a radio link 103, 105, and is related to the size of the data blocks passed to the radio link layer from higher network layers.

The area or region to be supplied with wireless network service or connectivity by the NAN 131-133 is divided into cells, each of which have a pattern dependent on the physical characteristics (e.g., terrain, physical objects or obstacles, etc.) and radio transmission/reception characteristics. The cell patterns may be in the form of shapes, such as circles, hexagons, squares, or the like, having a size that varies depending, in part, on the radio transmission/reception characteristics. Each of these cells is assigned with multiple channels or frequency carriers that are provided by a respective NAN 131, 132, 133. The channels or frequencies used in one cell can be reused in other cells, provided that the same frequencies are not reused in adjacent cells, which would cause co-channel interference. For example, a first NAN 131 may provide an LTE cell in a frequency band (or overall cell bandwidth) of 600 MHz to 6 gigahertz (GHz) with channel BWs (or carrier BWs) of 1.4, 3, 5, 10, 15, or 20 megahertz (MHz) (depending on the duplex mode of the frequency band), which may be aggregated together to create a channel BW up to 100 MHz (in LTE-Advance) or up to 640 MHz (in LTE-Advanced Pro). In a second example, a second NAN 131 may provide a 5G/NR cell with a maximum carrier BW (or channel BW) of 100 MHz in frequency range 1 (FR1: 450 MHz to 6 GHz) or a maximum carrier BW (or channel BW) of 400 MHz in frequency range 2 (FR2: 24.25 GHz to 52.6 GHz) that can be aggregated with a maximum bandwidth of 800 MHz. In each of the aforementioned examples, the exact frequency band and the channel BWs that can be used may depend on the country and/or regulatory regime in which the NAN 133 is located.

A given cell has a certain amount of radio resources within its frequency band that can be allocated to individual UEs 111, 121. The amount of resources per cell may be expressed a number of PRBs per TTI, and the amount of available resources (e.g., non-occupied PRBs) depends on the traffic load of a cell. The amount of data that can be transmitted in a PRB depends in part on radio link quality. Radio link quality may also change based on UE 121, 111 mobility within a particular cell (referred to as "intra-cell mobility" or the like) and mobility between cells (referred to as "inter-cell mobility" or the like). Additionally, radio signal properties/characteristics are affected by interference from other radio signals and physical obstacles (e.g., tress, buildings, statues, etc.) blocking a line-of-sight (LoS) of radio transmitters or receivers. The amount of data that can be transmitted in a PRB affects the realized and/or perceived performance of a wireless network or a given link 103, 105, 107. In other words, the radio signal performance properties/characteristics impact the BW and/or network services that can be provided by individual cells and/or individual NANs 131-133, as well as the resource consumption of the UEs 111, 121 and the NANs 131-133 themselves. As discussed in more detail infra, the LPP technology discussed herein is used to predict future performance and/or characteristics of the wireless interfaces 103, 105, 107 based on various criteria.

The NANs 131/132 may be configured to communicate with one another via respective interfaces or links (not shown), such as an X2 interface for LTE implementations (e.g., when CN 142 is an Evolved Packet Core (EPC)), an Xn interface for 5G or NR implementations (e.g., when CN 142 is an Fifth Generation Core (5GC)), or the like. The NANs 131 and 132 are also communicatively coupled to CN 142. In embodiments, the CN 142 may be an evolved packet core (EPC) network, a NextGen Packet Core (NPC) network, a 5G core (5GC), or some other type of CN. The CN 142 may comprise a plurality of network elements, which are configured to offer various data and telecommunications services to customers/subscribers (e.g., users of UEs 121 and IoT devices 111) who are connected to the CN 142 via a RAN. The components of the CN 142 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 142 may be referred to as a network slice, and a logical instantiation of a portion of the CN 142 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 142 components/functions.

The CN 142 is shown to be communicatively coupled to an application server 150 and a network 150 via an IP communications interface 155. the one or more server(s) 150 comprise one or more physical and/or virtualized systems for providing functionality (or services) to one or more clients (e.g., UEs 121 and IoT devices 111) over a network (e.g., cloud 144). The server(s) 150 may include various computer devices with rack computing architecture component(s), tower computing architecture component(s), blade computing architecture component(s), and/or the like. The server(s) 150 may represent a cluster of servers, a server farm, a cloud computing service, or other grouping or pool of servers, which may be located in one or more datacenters. The server(s) 150 may also be connected to, or otherwise associated with one or more data storage devices (not shown). Moreover, the server(s) 150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 150 offer applications or services that use IP/network resources. As examples, the server(s) 150 may provide traffic management services, cloud analytics, content streaming services, immersive gaming experiences, social networking and/or microblogging services, and/or other like services. In addition, the various services provided by the server(s) 150 may include initiating and controlling software and/or firmware updates for applications or individual components implemented by the UEs 121 and IoT devices 111. The server(s) 150 can also be configured to support one or more communication services (e.g., Voice-over-Internet Protocol (VoIP) sessions, PTT sessions, group communication sessions, social networking services, etc.) for the UEs 121 and IoT devices 111 via the CN 142.

The cloud 144 may represent a cloud computing service, the Internet, a local area network (LAN) or a wide area network (WAN) including proprietary and/or enterprise networks for a company or organization, or combinations thereof. The cloud 144 may be a network that comprises computers, network connections among the computers, and software routines to enable communication between the computers over network connections. In this regard, the cloud 144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 144 may be via a wired or a wireless connection using the various communication protocols discussed infra. More than one network may be involved in a communication session between the illustrated devices. Connection to the cloud 144 may require that the computers execute software routines which enable, for example, the seven layers of the OSI model of computer networking or equivalent in a wireless (cellular) phone network. Cloud 144 may be used to enable relatively long-range communication such as, for example, between the one or more server(s) 150 and one or more UEs 121 and IoT devices 111. In some embodiments, the cloud 144 may represent the Internet, one or more cellular networks, local area networks, or wide area networks including proprietary and/or enterprise networks, TCP/Internet Protocol (IP)-based network, or combinations thereof. In such embodiments, the cloud 144 may be associated with network operator who owns or controls equipment and other elements necessary to provide network-related services, such as one or more base stations or access points, one or more servers for routing digital data or telephone calls (e.g., a core network or backbone network), etc. The backbone links 155 may include any number of wired or wireless technologies, and may be part of a LAN, a WAN, or the Internet. In one example, the backbone links 155 are fiber backbone links that couple lower levels of service providers to the Internet, such as the CN 412 and cloud 144.

In embodiments, the edge compute nodes 136 may include or be part of a MEC system 135. The MEC system 135 includes a collection of MEC servers 136 (including MEC servers 136a, 136b, and 136c in FIG. 1) and MEC management systems (not shown by FIG. 1) necessary to run MEC applications (e.g., MEC Apps 436 of FIG. 4) within an operator network or a subset of an operator network. The MEC servers 136 are physical computer systems that include a MEC platform (e.g., MEC platform 437 of FIG. 4) and a virtualization infrastructure (e.g., VI 438 of FIG. 4), and provide compute, storage, and network resources to MEC applications. Each of the MEC servers 136 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 120 and/or endpoints 110. The MEC servers 136 may also be referred to as "MEC hosts 136" or "edge servers." The VI of the MEC servers 136 provide virtualized environments and virtualized resources (e.g., "virtualized infrastructure") for the MEC hosts 136, and the MEC applications may run as virtual machines (VMs) and/or application containers on top of the VI. The components and/or entities of the MEC system 135 are discussed in more detail infra with respect to FIG. 4. It should be understood that the disclosed MEC systems and services deployment examples are only one illustrative example of edge computing systems/networks 135, and that the example embodiments discussed herein may be applicable to many other edge computing/networking technologies in various combinations and layouts of devices located at the edge of a network. Examples of such other edge computing/networking technologies that may implement the LPP embodiments may include Content Delivery Networks (CDNs) (also referred to as "Content Distribution Networks" or the like); Mobility Service Provider (MSP) edge computing and/or Mobility as a Service (MaaS) provider systems; Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the LPP embodiments.

As shown by FIG. 1, each of the NANs 131, 132, and 133 are co-located with edge compute nodes (or "edge servers") 136a, 136b, and 136c, respectively. These implementations may be small-cell clouds (SCCs) where an edge compute node 136 is co-located with a small cell (e.g., pico-cell, femto-cell, etc.), or may be mobile micro clouds (MCCs) where an edge compute node 136 is co-located with a macro-cell (e.g., an eNB, gNB, etc.). The edge compute node 136 may be deployed in a multitude of arrangements other than as shown by FIG. 1. In a first example, multiple NANs 131-133 are co-located or otherwise communicatively coupled with one edge compute node 136. In a second example, the edge servers 136 may be co-located or operated by RNCs, which may be the case for legacy network deployments, such as 3G networks. In a third example, the edge servers 136 may be deployed at cell aggregation sites or at multi-RAT aggregation points that can be located either within an enterprise or used in public coverage areas. In a fourth example, the edge servers 136 may be deployed at the edge of CN 142. These implementations may be used in follow-me clouds (FMC), where cloud services running at distributed data centers follow the UEs 121 as they roam throughout the network.

In any of the aforementioned embodiments and/or implementations, the edge servers 136 provide a distributed computing environment for application and service hosting, and also provide storage and processing resources so that data and/or content can be processed in close proximity to subscribers (e.g., users of UEs 121, 111) for faster response times. The edge servers 136 also support multitenancy run-time and hosting environment(s) for applications, including virtual appliance applications that may be delivered as packaged VM images, middleware application and infrastructure services, content delivery services including content caching, mobile big data analytics, and computational offloading, among others. Computational offloading involves offloading computational tasks, workloads, applications, and/or services to the edge servers 136 from the UEs 111/121, CN 142, cloud 144, and/or server(s) 150, or vice versa. For example, a device application or client application operating in a UE 121/111 may offload application tasks or workloads to one or more edge servers 136. In another example, an edge server 136 may offload application tasks or workloads to one or more UE 121/111 (e.g., for distributed ML computation or the like).

As alluded to previously, various aspects of the LPP embodiments may be performed by one or more server(s) 150, by one or more NFs in the CN 142, by cloud 144 (or one or more cloud computing nodes within the cloud 144), and/or by one or more edge compute nodes 136. The collection or combination of systems or devices that perform the LPP embodiments discussed herein may be collectively referred to as an "LPP service," which is discussed in more detail with respect to FIG. 2.

Figure 2:
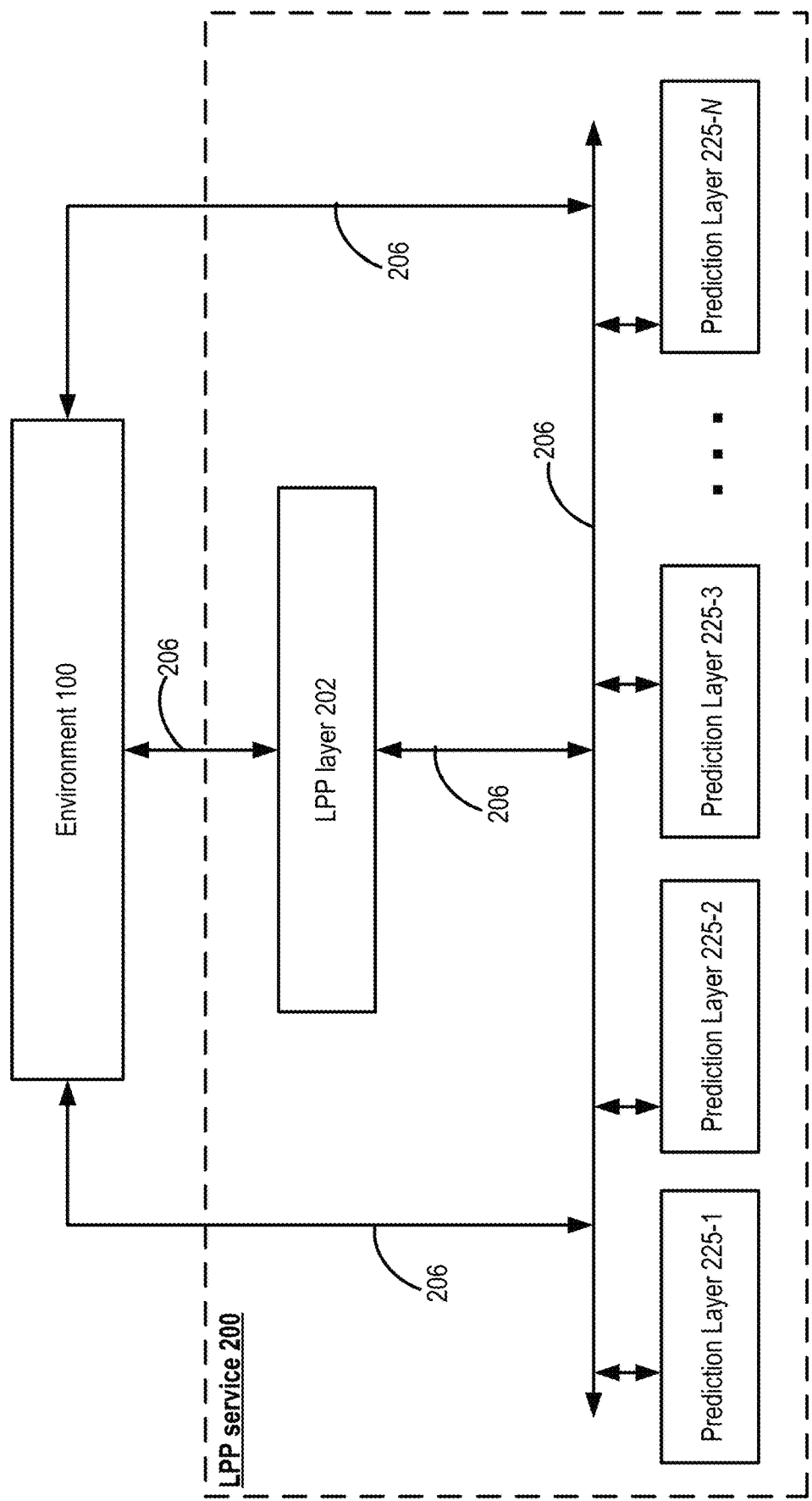
FIG. 2 illustrates example logical components and interaction points of Link Performance Prediction Service (LPPS), in accordance with various embodiments.

Referring now to FIG. 2, wherein example logical components and interaction points of an LPP service (LPPS) 200, in accordance with various embodiments, is illustrated. As shown, for the illustrated embodiments, the LPPS 200 includes an LPP layer 202 and a plurality of prediction layers 225-1 to 225-N (collectively referred to as "prediction layers 225" or the like). In the illustrated embodiment, the components of the LPPS 200 interact with one or more elements in the edge computing environment 100 discussed previously with respect to FIG. 1.

The LPPS 200 predicts how network performance (e.g., performance of environment 100) changes over time with a relatively high degree of confidence. For example, the LPPS 200 is capable of predicting link performance in time and space, which allows applications, UEs 111, 121, and/or network infrastructure able to shift delay tolerant traffic in time and/or space in order to smooth out peak demand and improve overall network resource utilization. The ability to forecast and communicate link performance predictions can also help applications, UEs 111, 121, and/or network infrastructure modify their behavior to account for congested or otherwise sub-optimal network conditions.

In embodiments, the LPPS 200 uses spatial and temporal (spatio-temporal) historical data and/or real-time data to predict link quality. The spatio-temporal historical data is data related to the performance experienced over multiple locations (e.g., space) and at multiple time instances (e.g., temporal). The spatio-temporal historical data provides ability to locate performance at specific location and time. Real-time data includes data/information such as live traffic status (e.g., vehicles on a given roadway or the like), abnormal events (e.g., natural disasters and the like), network load (e.g., resource utilization of NANs 131, 132, 133, edge compute nodes 136, and the like), radio conditions (e.g., amount of occupied radio resources, amount of signaling taking place over the radio links 103, 105, 107, interference measurements, etc.), UE 111, 121 location (e.g., geographic position within a given cell), UE 111, 121 motion/mobility (e.g., speed and direction of travel within a given cell or between cells), and/or routing information (e.g., number and types of hops between source and destination nodes or the like), if known. The LPPS 200 uses the historical and real-time data collected across a wide range of mobile devices (e.g., UEs 111, 121) and network elements (e.g., NANs 131, 132, and 133, edge compute nodes 136, core network elements in CN 142, etc.), allowing the LPPS 200 to build a view of the network performance that users and services will likely experience over time. Consumers (e.g., UEs 111, 121 and NANs 131, 132, 133, application/service providers, etc.) can subscribe to predictions that have direct relevance to network performance and/or their service performance. The LPPS 200 responds to the consumer indicating any significant changes in performance over time. These embodiments are discussed in more detail infra with respect to FIGS. 13-17.

Each of the prediction layers 225 provide functionality independent of functionality provided by other layers 225, as well as different functionality of the LPP layer 202. For example, the LPP layer 202 may implement a data fusion engine (also referred to as an "LPP engine") (discussed in more detail infra), the prediction layer 225-1 may implement one or more first ML models/algorithms to generate a first type of predicted performance metrics, the prediction layer 225-2 may implement one or more second ML models/algorithms to generate a second type of predicted performance metrics, and so forth to the prediction layer 225-N, which may implement one or more Nth ML models/algorithms to generate an Nth type of predicted performance metrics (where N is a number).

In various embodiments, each prediction layer 225 runs one or more ML models to determine respective predicted performance metrics, and provides their respective predicted performance metrics to the LPP layer 202. Machine learning algorithms build mathematical models, referred to as a "machine learning model" or simply "model", based on sample data, known as "training data", in order to make predictions or decisions without being explicitly programmed to perform such tasks. Generally, an ML algorithm is a computer program that learns from experience with respect to some task and/or some performance measure, and an ML model is an object or data structure created after an ML algorithm is trained with one or more training datasets. After training, the ML model may be used to make predictions on new datasets. Although the term "ML algorithm" refers to different concepts than the term "ML model," these terms as discussed herein may be used interchangeably for the purposes of the present disclosure. In embodiments, specific ML algorithms, or combinations of ML algorithms, are used at individual prediction layers 225 to determine respective predicted performance metrics, and one or more layers 225 may use different ML algorithms (or combinations of ML algorithms) than those used by other prediction layers 225. Examples implementations of different prediction layers 225 are discussed infra with regard to FIGS. 6-12.

In some embodiments, at least one of the layers 225 is responsible for collecting data from one or more UEs 111/121 and/or NANs 131-133 in environment 100, which may be processed by that layer 225 and provided to other layers 225 for determining their respective predicted performance metrics. In such embodiments, the layers 225 that are responsible for data collection may obtain data from applications, components, or the like at the data sources (e.g., the UEs 111, 121, NANs 131-133, etc.) that collect data from system software (e.g., operating systems, device drivers, firmware, utility applications, etc.) and/or various user/client applications operating on those devices via a suitable API, middleware, software glue, proxy applications, trusted applications, etc., and provide the collected data to the data collection layer(s) 225. In some embodiments, these applications, components, etc., may be custom plug-ins configured to interact with, and collected data/metrics from the system software, other applications, etc.

The LPP layer 202 obtains the predicted performance metrics from the prediction layers 225 and fuses the predicted performance metrics together to obtain an LPP for an LPPS consumer (not shown by FIG. 2). The LPP layer 202 may include any suitable technology to fuse the predicted performance metrics provided by the prediction layers 225. Data fusion is a process of integrating and/or combining data collected from multiple sources at different spatial and temporal scales in order to make inferences about that data. In some embodiments, these "inferences" may be the link performance predictions, while in other embodiments, the LPP layer 202 implements suitable ML model(s)/algorithm(s) to generate the link performance predictions based on the inferences.

For example, the LPP layer 202 may be trained during a training phase using predetermined data inputs to establish model parameters (e.g., initial state distribution) and to associate at least some of the states with inferences having meaningful significance. The established model parameters are stored in memory (e.g., memory circuitry 320 of FIG. 3 or the like). Then during an operational phase, the LPP layer 202 performs data fusion on real (live) data from the prediction layers 225, and in order to increase the accuracy of the model, continually modifies the established model parameters as necessary based on a comparison between a prediction and what is actually received.

In various embodiments, the LPP layer 202 (or the LPP engine) is configured to perform Multi-Cell Multi-Layer (MCML) data fusion techniques. In such embodiments, the LPP layer 202 takes data from one or more prediction layers 225 and combines that data with data from one or more other prediction layers 225 to derive the link performance prediction for corresponding LPPS consumers. In one MCML example, the LPP layer 202 may take an output from a cell transition prediction layer (see e.g., FIGS. 9-10), which is in the form of expected cells a UE 111, 121 will visit, and pairs that output with outputs provided by a cell load prediction layer (see e.g., FIG. 7) to predict a performance of individual cells based on mobility of the UE 111, 121. In a second MCML example, network data and/or parameters (e.g., a mobile network associated with CN 142 of FIG. 1), data from traffic and/or mobility patterns, subscriber information, and data from GPS are fed in to different prediction layers 225 for training and prediction of performance metrics from those prediction layers 225 are fused to predict final network performance at a particular time/date. As mentioned previously, each prediction layer 225 can be trained with data from different sources (network, traffic, GPS, subscriber information).

In various embodiments, MCML data fusion accounts for different operational states, operational contexts, and/or mobility states. For example, as discussed in more detail infra, a cell transition prediction layer (see e.g., FIGS. 9-10) may be used to predict the cells that a UE 111, 121 will visit at particular time instances based on a current cell in which the UE 111, 121 is camping, a previous cell visited by the UE 111, 121, and travel direction and velocity measurements. When the UE 111, 121 is stationary (not moving), the link performance prediction is based on a current cell's behavior, and the LPP layer 202 fuses the current cell's characteristics and cell load, including real-time and predicted future behavior(s) and/or load(s), to obtain the LPP. When the UE 111, 121 is moving in a relatively dense area (e.g., where cell sizes are relatively small, such as in a city), and the predicted cell behaviors and predicted cell load(s) of each cell predicted to be visited by the UE 111, 121 is combined (fused) together for the LPP. When the UE 111, 121 is moving in a relatively sparse area (e.g., where cell sizes are relatively large, such as in a rural area), the link performance prediction is based on intra-cell behavior(s) (e.g., predicted signal strength, signal quality, power changes, etc., within individual cells; see e.g., FIG. 8) for each cell predicted to be visited by the UE 111, 121, and the intra-cell behavior(s) of each predicted cell is combined (fused) with respective predicted cell behaviors and respective predicted cell load(s). When the UE 111, 121 is moving using a navigation application, the cell transition prediction layer predicts the cell transitions using a cell movement/mobility pattern determined from obtained route/journey data, navigation settings, and/or other information from the navigation application, and each cell predicted to be visited by the UE 111, 121 is combined (fused) with respective predicted cell behaviors and respective predicted cell load(s). In these embodiments, if network topology information and/or backhaul link performance predictions are available, then the predicted cell behavior(s) and/or load(s) may be combined (fused) with these additional network topology predictions and/or backhaul link predictions.

In some embodiments, MCML data fusion involves the LPP layer 202 (or LPP engine) requesting, from the cell transition prediction layer for a UE 111, 121, a prediction of various cell that the UE 111, 121 may visit given a current cell. These predictions may be based on spatio-temporal history data associated with the UE 111, 121 (e.g., mobility data) and/or the current cell. The cell transition prediction layer returns data including the expected future cells the UE 111, 121 may visit, the expected probability of visiting each cell in a given region, a predicted time interval (or amount of time) for the UE 111, 121 to travel to each cell, and an predicted amount time that the UE 111, 121 will remain in each cell. Then, the LPP layer 202 requests predicted cell/link characteristics and/or behaviors for each cell indicated by the cell transition prediction layer at the time interval the UE 111, 121 is expected to enter each cell and the amount of time the UE 111, 121 is predicted to be in each cell. The LPP layer 202 combines (fuses) the returned predicted cell/link characteristics and/or behaviors for each cell to determine a predicted link performance (e.g., the LPP) given the current and future cell load as well as expected deviation(s). The LPP layer 202 now knows the probability that the UE 111, 121 will enter or travel through a particular cell, the predicted amount of time the UE 111, 121 will take to enter the particular cell, the amount of predicted time to be spent in the particular cell, as well as the LPP for each cell at each time instance. The LPP layer 202 then looks at a time window from a current time to some future time instance (e.g. 30 seconds, 1 minutes, 2 minutes, etc., from the current time depending on how steady the link is), and breaks this time window into time intervals (e.g. 1 second). The time interval for the UE 111, 121 to reach respective cells is added to the time window with respective characteristics/loads, and the probability that the UE 111, 121 will visit the respective cells. Then, the LPP layer 202 runs through the time window, and filters out probabilities that are deemed to be too low for consideration. As an example, changes detected to be larger than a certain level (e.g., 5%, 10% deviation, etc.) may be filtered out. The determined LPP for each remaining portions of the time window may be sent to the UE 111, 121 or other LPPS consumer, taking into account the amount of delay and predicted location of the UE 111, 121 (or other LPPS consumer).

Additionally or alternatively, one or more other data fusion techniques may be used to combine or fuse the predicted performance metrics. Examples of these known data fusion techniques may include, but are not limited to, data association techniques (e.g., Nearest Neighbors, K-Means Probabilistic Data Association (PDA) and/or PDA Filter (PDAF), Principle Component Analysis (PCA), Joint Probabilistic Data Association (JPDA), Distributed JPDA (JPDA-D), Multiple Hypothesis Test (MHT), Distributed MHT (MHT-D), graphical modeling, and/or the like), state estimation techniques (e.g., maximum likelihood, maximum posterior, Kalman filter, distributed Kalman filter, particle filter, distributed particle filter, covariance intersection, covariance union, Optimal Theory, Regularization, Uncertainty Ellipsoids, and/or the like), decision fusion techniques (e.g., Bayesian methods (e.g., evidence theory, robust statistics, recursive operators, etc.), Dempster-Shafer Inference, Abductive Reasoning, Semantic methods, and/or the like), intelligent aggregation techniques (e.g., one or more ML techniques such as neural networks (including any neural network discussed herein), genetic algorithms, fuzzy logic, etc.), and/or any other suitable data fusion techniques.

The link performance predictions are used to generate the LPP notifications that the LPPS 200 provides to LPPS consumers such as applications, UEs 111/121, and/or NANs 131-133, which allow the LPPS consumers to tailor their operations accordingly. The LPP notifications, in one embodiment, are conceptually similar to traffic notifications provided by a navigation application or vehicular driving applications. While the traffic notifications provide up-to-date information about current and forecasted traffic conditions, the LPP notifications provide information about current and forecasted link quality or performance.

In some embodiments, the LPPS 200 may provide intelligent network management services to network operators. For example, network operators may use the LPP notifications to autonomously manage transmitter power, antenna direction, angle, and tilt; and other parameters of the NANs 131, 132, 133. Additionally or alternatively, the link performance predictions in the LPP notifications may be fed into for Self-Organizing Network (SON) functions in LTE or 5G/NR implementations. In some embodiments, the LPPS 200 may be used for network degradation control, which entails identifying instances of poor performance and troubleshooting. (e.g., identifying when equipment should be repaired or replaced).

In some embodiments, the LPPS 200 may be used for efficient small cell backhaul planning. For example, the link performance predictions in the LPP notifications may be used to identify locations to deploy small cells (e.g., RAN nodes 132, AP 133, or the like) to enhance coverage and/or capacity while taking into account the associated backhaul and power requirements for such deployments. Additionally or alternatively, in some embodiments, the LPPS 200 may be used for backhaul link resource allocation. In these embodiments, the link performance predictions may indicate the load or usage of different backhaul links at different time periods on different days, and network operators can reduce operating costs by powering down backhaul links which are expected to require low usage at particular times before powering them back up at predicted peak usage times.

By providing the LPP notifications to users, network operators, and service providers, network operators and service providers may tailor their applications/services to utilize network resources in a more efficient manner than using conventional technologies. As an example, individual NANs 131, 132, 133 may schedule background traffic (e.g., paging, control signaling, heartbeat signaling, and/or other like traffic/signaling that takes place even when there is no user or application interaction with a UE 111, 121) for transmission during peaks in network performance. In this example, the peaks in network performance may be based on a predicted time and/or mobility when a UE 111, 121 will be proximate to a serving NAN 131, 132, 133 or a predicted period during which the network should have sufficient capacity headroom.

The LPP notifications may also be used by network operators and service providers to improve Quality of Service (QoS) and/or Quality of Experience (QoE), which are traditionally associated with network performance metrics. Static network performance metrics only provide a partial, snapshot view of the QoS and/or QoE. Using the LPP notifications, network operators and service providers can adjust traffic routes, mode of operation, and/or other parameters to optimize QoS and QoE since they will have advance warning regarding any significant changes in expected network performance.

The LPPS 200 itself may be an abstraction layer between service providers (e.g., operators/owners of server(s) 150 of FIG. 1) and the underlying mobile access network (e.g., an owner/operator of CN 142 and/or some or all of the NANs 131, 132) giving an abstracted view of the access network link quality, which allows service providers and/or application developers to make proactive decisions to improve QoS/QoE.

In a first example, a service provider is a content streaming service and/or platform that uses CDN edge compute nodes 130 to stream content to UEs 121. In this example, the service provider uses the LPP notifications to adapt streaming buffers operated by the CDN edge compute nodes 130 to cover for poor coverage areas (e.g., coverage holes) that will likely be encountered by traveling UEs 121. Using the LPP notifications from the LPPS 200, the CDN edge compute nodes 130 may pre-fetch and stream required content (e.g., for storage in a local buffer at the UEs 121) prior to a UE 121 entering or traveling through a poor coverage area (or coverage hole). Additionally or alternatively, content may be pre-fetched an loaded to CDN edge compute nodes 130 along a predicted travel path/route of a UE 121 (e.g., closer to the UE's 121 anticipated point of consumption), and the amount of content streamed to the UE 121 at different points along the predicted path/route may be based on predicted network performance at those different points.

In a second example, a service provider provides over-the-top (OTT) real-time services including, for example, television, messaging (e.g., instant messaging, online chats, etc.), and voice calling. In this example, the service provider uses the LPP notifications to provide advance warnings to users indicating when an OTT connection will likely be lost, and how long the connection may take to be reconnected.

In a third example, a service provider provides interactive map and navigation services, which provides to UEs 121*a* turn-by-turn directions for a selected route. In this example, the service provider may use the LPP notifications to optimize the travel routes based on physical traffic (e.g., volume of vehicles traveling in a certain road or highway) and/or predicted network connectivity, which may be useful for semi-autonomous or fully-autonomous vehicle systems. Furthermore, these optimizations may be useful in industrial contexts, such as in "smart factories" or manufacturing plants, where mobile IoT devices 111 can use LPP notifications for route optimization purposes.

In a fourth example, a mobile network operator (e.g., an owner/operator of CN 142 and/or some or all of the NANs 131, 132) uses to guarantee a certain level of network performance (e.g., Service Level Guarantees) for enterprise-level customers. In this example, the mobile network operator may use the LPP notifications and/or the LPPS 200 to quantify their network performance at varying levels of granularities showing their customers that they can provide a consistent high-quality QoS/QoE.

In some embodiments, the layers 225/202 may communicate with one another through one or more connectors 206. The connectors 206 may be software connectors that connect the various layers 202/225 of the LPPS 200 to one another so each layer 202/225 does not need to know the underlying details of other layers 202/225. The connectors 206 facilitate message passing/routing between individual layers 202/225, which may include encapsulating data from one layer 202/225 for consumption by an intended destination layer 202/225 or components thereof. As an example, the connectors 206 may be an exogenous connector, which coordinates and controls a totality of interactions/communications of the layers 202/225 where the connectors 206 perform the method or procedure calls on behalf of a requesting/calling layer 202/225. Additionally or alternatively, the connectors 206 may be middleware or "software glue," which connects two or more separate components by translating or adapting instructions/commands obtained from one layer 202/225 into instructions/commands that can be understood by another layer 202/225. In these ways, individual layers 225/202 may be replaced with new/different layers 225/202 without requiring each remaining layer 225/202 to be updated to communicate with the new/different layers 225/202. Therefore, the LPPS 200 may provide relatively easy abstraction since each layer 225/202 is loosely coupled from one another. Additionally, in some embodiments (e.g., where one or more of the layers 225 are operated by different edge servers 130), the connectors 206 may operate on top of one or more communication protocols, such as those discussed herein.

In some embodiments, the LPPS 200 may be implemented as a centralized service wherein the various prediction layers 225 and/or the LPP layer 202 are located in one or more servers in one or more server farms or data centers (e.g., individual servers 150 of FIG. 1). In other embodiments, the LPPS 200 may be implemented as an edge computing service wherein the various prediction layers 225 and/or the LPP layer 202 are located in one or more edge servers 136 deployed at the edge of a network (e.g., CN 142, cloud 144, or the like). In one example implementation, the plurality of prediction layers 225 and the LPP layer 202 are operated by the cloud 144 of FIG. 1, such as by individual cloud compute nodes in the cloud 144. In another example implementation, each of the prediction layers 225 are operated by individual edge compute nodes 136, and the LPP layer 202 is operated by the cloud 144. In another example implementation, each of the prediction layers 225 are distributed across multiple edge compute nodes 136. In another example implementation, each edge compute node 136 operates a respective LPPS 200. In any of the aforementioned implementations, each prediction layer 225 and the LPP layer 202 may be operated in respective VMs and/or application containers (e.g., docker® containers, Kubernetes™ provided by the Cloud Native Computing Foundation™, Linux Containers (LXC), etc.) in one or more cloud servers and/or edge compute nodes 136. Other implementations are possible in other embodiments.

Figure 3:
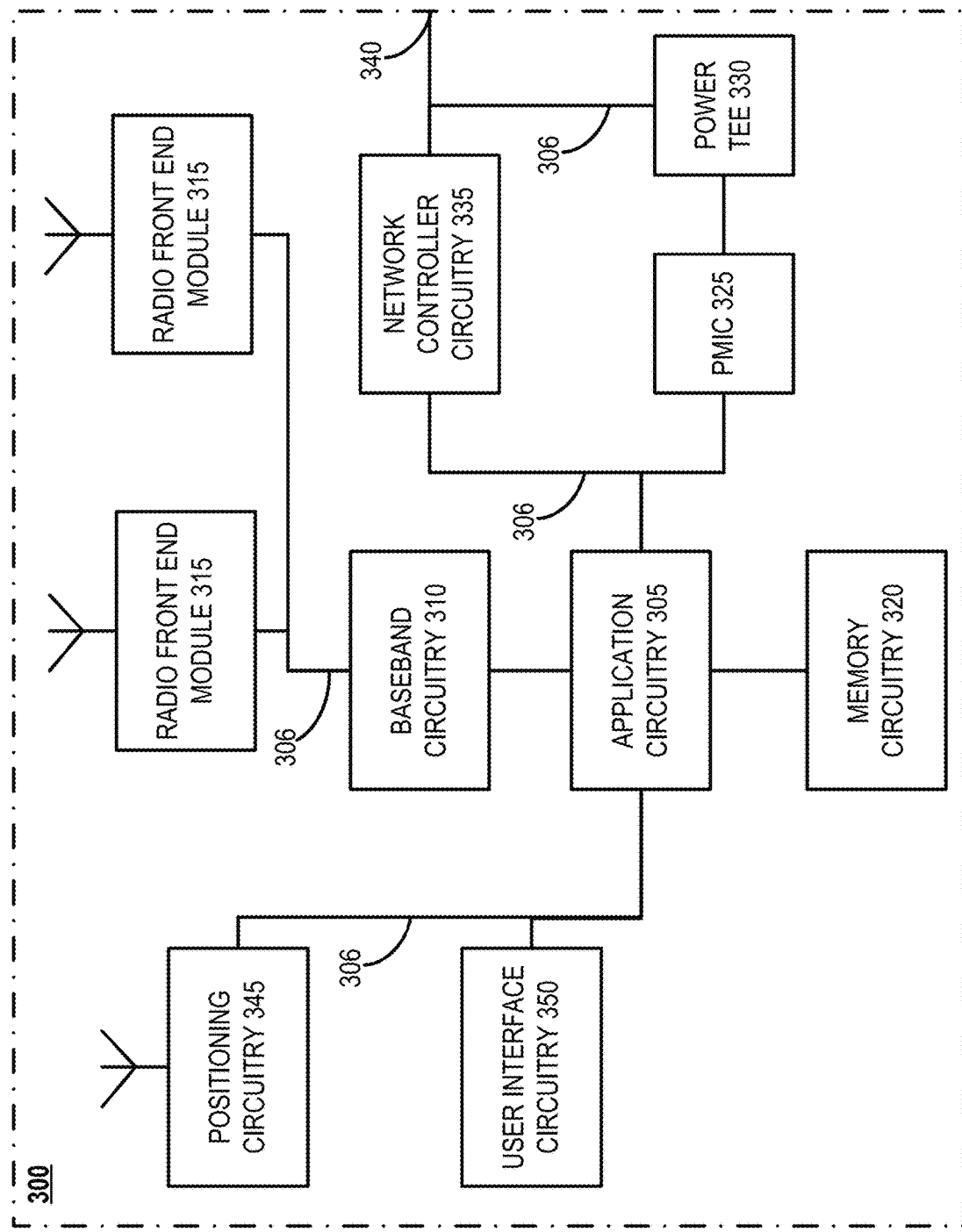
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, access network node (e.g., the edge nodes 130 shown of FIG. 1), edge compute nodes 136, server(s) 150, and/or any other element/device discussed herein. In other examples, the system 300 could be implemented in or by an intermediate node 120 or endpoint 110.

The system 300 includes application circuitry 305, baseband circuitry 310, one or more radio front end modules (RFEMs) 315, memory circuitry 320, power management integrated circuitry (PMIC) 325, power tee circuitry 330, network controller circuitry 335, network interface connector 340, positioning circuitry 345, and user interface 350. In some embodiments, the device 300 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 305 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 305 may comprise, or may be, a special-purpose processor/controller to operate according to the various embodiments herein. As examples, the processor(s) of application circuitry 305 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 300 may not utilize application circuitry 305, and instead may include a special-purpose processor/controller to process IP data received from an EPC or 5GC, for example.

In some implementations, the application circuitry 305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. 1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 305 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 310 may be implemented, for example, as a solder-down substrate including one or more integrated circuits, a single packaged integrated circuit soldered to a main circuit board or a multi-chip module containing two or more integrated circuits. The baseband circuitry 310 includes one or more processing devices (e.g., baseband processors) to carry out various protocol and radio control functions. Baseband circuitry 310 may interface with application circuitry of system 300 for generation and processing of baseband signals and for controlling operations of the RFEMs 315. The baseband circuitry 310 may handle various radio control functions that enable communication with one or more radio networks via the RFEMs 315. The baseband circuitry 310 may include circuitry such as, but not limited to, one or more single-core or multi-core processors (e.g., one or more baseband processors) or control logic to process baseband signals received from a receive signal path of the RFEMs 315, and to generate baseband signals to be provided to the RFEMs 315 via a transmit signal path. In various embodiments, the baseband circuitry 310 may implement a real-time OS (RTOS) to manage resources of the baseband circuitry 310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 3, in one embodiment, the baseband circuitry 310 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 315 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 315 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 310 and/or RFEMs 315. The baseband circuitry 310 may also support radio communications for more than one wireless protocol.

Continuing with the aforementioned embodiment, the baseband circuitry 310 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/de-mapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 315, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 310 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The memory circuitry 320 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 300, an operating system of infrastructure equipment 300, one or more applications, and/or for carrying out the embodiments discussed herein. The computational logic may be stored or loaded into memory circuitry 320 as instructions for execution by the processors of the application circuitry 305 to provide or perform the functions described herein. The various elements may be implemented by assembler instructions supported by processors of the application circuitry 305 or high-level languages that may be compiled into such instructions. The permanent copy of the programming instructions may be placed into persistent storage devices of memory circuitry 320 in the factory during manufacture, or in the field through, for example, a distribution medium (not shown), through a communication interface (e.g., from a distribution server), and/or over-the-air (OTA).

In some embodiments, the infrastructure equipment 300 may be a NAN 131-133 that is configured to collect data for the LPP services 200 discussed herein. In these embodiments, the memory circuitry 320 may store one or more applications and/or software components including program code, instructions, modules, assemblies, packages, protocol stacks, software engine(s), firmware, etc., which when running on the infrastructure equipment 300 (e.g., executed by application circuitry 305), collect spatial-temporal data (see e.g., FIG. 6 infra), and provides this information to one or more prediction layers 205 in the LPPS 200 via a suitable backhaul link via network controller circuitry 335 and network interface connector 340. As discussed in more detail infra, the spatial-temporal data such as operational parameters of the system 300, signal measurements, and/or other like data as discussed herein, may be accessed using suitable APIs, Application Binary Interfaces (ABIs), middleware, drivers, configuration files, trusted application(s), etc., for accessing measurement data and/or other like information from the baseband circuitry and/or from network functions in the CN 142. For example, these APIs, drivers, etc., may access measurement data of measurements directly measured by the infrastructure equipment 300, measurements collected by UEs 111, 121 during minimization drive tests (MDTs), and/or measurement data collected by UEs 111, 121 and/or the infrastructure equipment 300 measurements performed by the UEs 111, 121 for other purposes, such as measurements taken for cell selection, handovers, and/or the like. In another example, one or more APIs may be used to collect network load information from the CN 142 (or one or more NFs within the CN 142 or the like). In some embodiments, these applications, components, plug-ins, firmware, etc., may also subscribe to the LPPS 200 to receive LPP notifications or "hints" from the LPPS 200 (see e.g., FIGS. 13-19).

In other embodiments, the infrastructure equipment 300 may be a server computer system that is configured to operate one or more prediction layers 225-1 to 225-N and/or the LPPS layer 202 of FIG. 2. In these embodiments, the memory circuitry 320 may store one or more applications and/or software components including program code, instructions, modules, assemblies, packages, protocol stacks, software engine(s), firmware, etc., which when running on the infrastructure equipment 300 (e.g., executed by application circuitry 305), perform various functions of the one or more prediction layers 225-1 to 225-N and/or the LPPS layer 202, such as those discussed with respect to FIGS. 6-19 infra.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols. In various embodiments, the network controller circuitry 335 enables communication with associated equipment and/or with a backend system (e.g., server(s) 130 of FIG. 1), which may take place via a suitable gateway device.

The positioning circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-Technology for Positioning, Navigation, and Timing (Micro-PNT) IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various other infrastructure equipment, or the like.

The components shown by FIG. 3 may communicate with one another using interface circuitry 306 or interconnect (IX) 306, which may include any number of bus and/or interconnect (IX) technologies such as industry standard architecture (ISA), extended ISA (EISA), inter-integrated circuit (I$^2$C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 4:
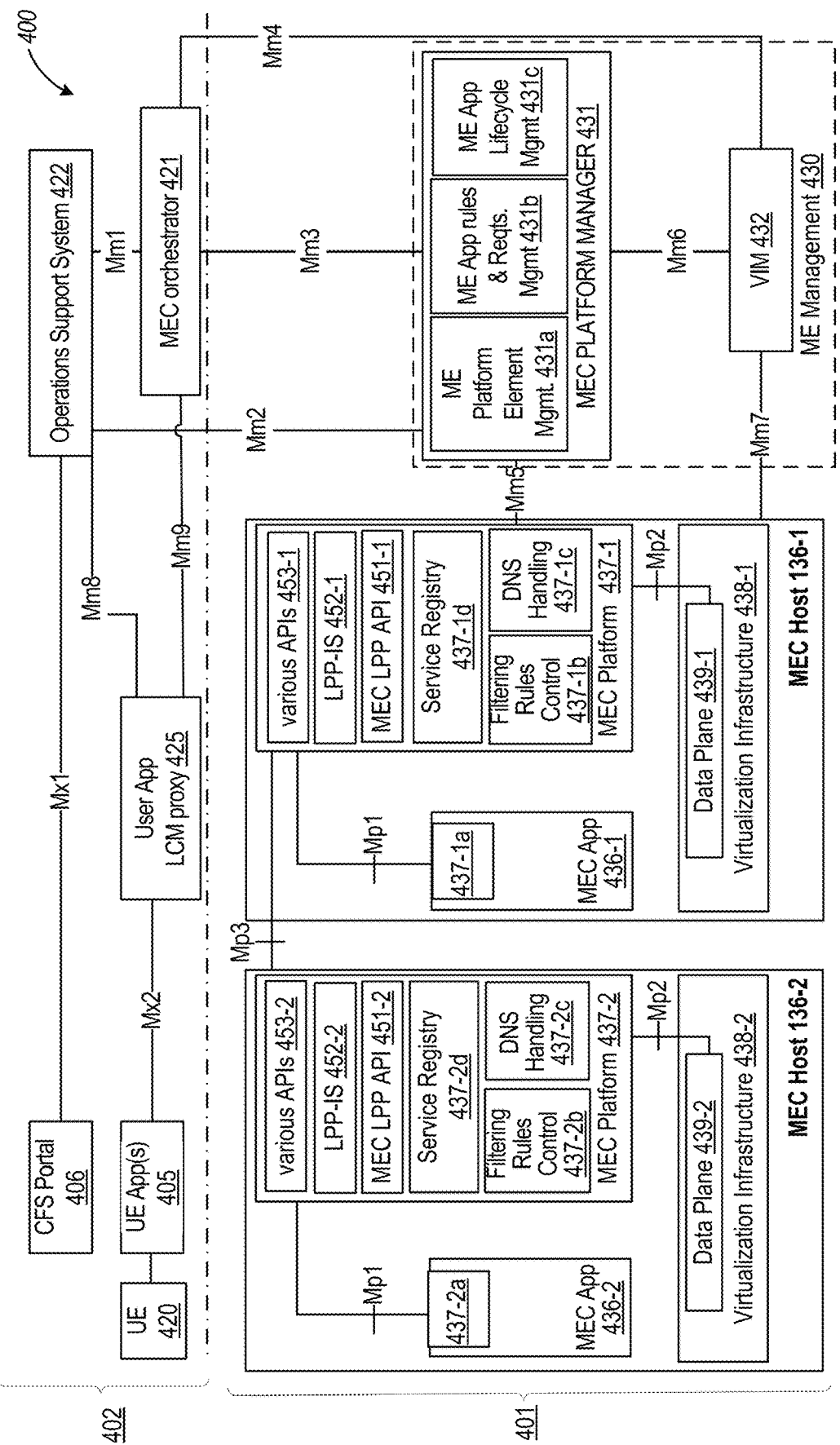
FIG. 4 depicts an example Multi-access Edge Computing (MEC) system architecture in which any one or more of the techniques (e.g., operations, processes, methods, and methodologies) discussed herein may be performed according to various embodiments.

FIG. 4 depicts a block diagram for an example Multi-access Edge Computing (MEC) system architecture 400 according to various embodiments. As mentioned previously, the edge compute nodes 136 of FIG. 1 may be implemented using MEC technologies. MEC offers application developers and content providers cloud-computing capabilities and an Information Technology (IT) service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, the MEC system 400 allows applications to, inter alia, exchange data, provide data to aggregation points, and access to data in databases which provide an overview of the local situation derived from a multitude of sensors.

The illustrated logical connections between various entities of the MEC architecture 400 may be access-agnostic and not dependent on a particular deployment. MEC enables implementation of MEC applications (MEC Apps) 436-1 and 436-2 (collectively referred to as "MEC Apps 436" or the like) as software-only entities that run on top of a Virtualization Infrastructure (VI) 438-1 and 438-2 (collectively referred to as "VI 438" or the like), which is located in or close to the network edge. A MEC app 436 is an application that can be instantiated on a MEC host 136 within the MEC system 400 and can potentially provide or consume MEC services 437a. The term "user application" in the context of MEC refers to an MEA 436 that is instantiated in the MEC system 400 in response to a request from a user (e.g., UE 111, 121) via a device application. FIG. 4 shows the general entities involved, and these entities can be grouped into multi-access edge system level 402, multi-access edge host level 401, and network level entities (not shown). The multi-access edge host level 401 includes a MEC host 136-1 and MEC host 136-2 (which may be the same or similar to the MEC servers 136 discussed previously, and are collectively referred to as "MEC host 136" or the like) and Multi-access Edge (ME) management 430, which provide functionality to run MEC Apps 436 within an operator network or a subset of an operator network. The multi-access edge system level 402 includes multi-access edge system level management 402, UE 420 (which may be the same or similar to the intermediate nodes 120 and/or endpoints 110 discussed herein), and third party entities. The network level (not shown) includes various external network level entities, such as a 3GPP network (e.g., CN 142 of FIG. 1), a local area network (e.g., a LAN, WLAN, PAN, etc.), and an external network (e.g., CN 142 and/or cloud 144 of FIG. 1). The multi-access edge host level 401 includes multi-access edge host level management and one or more MEC hosts 136. The multi-access edge host level management may include various components that handle the management of the multi-access edge specific functionality of a particular MEC platform 437, MEC host 136, and the MEC Apps 436 to be run. The MEC host 136 includes the MEC platform 437, MEC Apps 436, and VI 438.

The MEC system 400 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 400 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 136 is an entity that contains an MEC platform 437 and VI 438 which provides compute, storage, and network resources for the purpose of running MEC Apps 436. Each of the VIs 438 includes a respective data plane (DP) 439 (including DP 439-1 and 439-2) that executes respective traffic rules 437-1b and 437-2b (collectively referred to as "traffic rules 437b") received by the MEC platform 437, and routes the traffic among applications (e.g., MEC Apps 436), MEC services 437-1a and 437-2a (collectively referred to as "MEC services 437a"), DNS server/proxy (see e.g., via DNS handling entities 437-1c and 437-2c), 3GPP network, local networks, and external networks. The MEC DP 438a may be connected with the (R)AN nodes 131 and CN 142 of FIG. 1, and/or may be connected with the AP 133 of FIG. 1 via a wider network, such as the internet, an enterprise network, or the like. The other entities depicted and/or discussed herein may be the same or similar as those discussed with regard to FIG. 1.

The MEC platforms 437-1 and 437-2 (collectively referred to as "MEC platform 437" or the like) within a MEC host 136 may be a collection of essential functionality required to run MEC Apps 436 on a particular VI 438 and enable them to provide and consume MEC services 437a, and that can provide itself a number of MEC services 437a. The MEC platform 437 can also provide various services and/or functions, such as offering an environment where the MEC Apps 436 can discover, advertise, consume and offer MEC services 437a (discussed infra), including MEC services 437a available via other platforms when supported. The MEC platform 437 may be able to allow authorized MEC Apps 436 to communicate with third party servers located in external networks. The MEC platform 437 may receive traffic rules from the MEC platform manager 431, applications, or services, and instruct the data plane accordingly (see e.g., Traffic Rules Control 437b). The MEC platform 437 may send instructions to the DP 438 within the VI 438 via the Mp2 reference point. The Mp2 reference point between the MEC platform 437 and the DP 438 of the VI 438 may be used to instruct the DP 438 on how to route traffic among applications, networks, services, etc. In some implementations, the MEC platform 437 may translate tokens representing UEs XP01 in the traffic rules into specific IP addresses. The MEC platform 437 also receives DNS records from the MEC platform manager 431 and configures a DNS proxy/server accordingly. The MEC platform 437 hosts MEC services 437a including the multi-access edge services discussed infra, and provide access to persistent storage and time of day information. Furthermore, the MEC platform 437 may communicate with other MEC platforms 437 of other MEC servers 136 via the Mp3 reference point.

The VI 438 may represent the totality of all hardware and software components which build up the environment in which MEC Apps 436 and/or MEC platform 437 are deployed, managed and executed. The VI 438 may span across several locations, and the network providing connectivity between these locations is regarded to be part of the VI 438. The physical hardware resources of the VI 438 includes computing, storage and network resources that provide processing, storage and connectivity to MEC Apps 436 and/or MEC platform 437 through a virtualization layer (e.g., a hypervisor, VM monitor (VMM), or the like). The virtualization layer may abstract and/or logically partition the physical hardware resources of the MEC server 136 as a hardware abstraction layer. The virtualization layer may also enable the software that implements the MEC Apps 436 and/or MEC platform 437 to use the underlying VI 438, and may provide virtualized resources to the MEC Apps 436 and/or MEC platform 437, so that the MEC Apps 436 and/or MEC platform 437 can be executed.

The MEC Apps 436 are applications that can be instantiated on a MEC host 136 within the MEC system 400 and can potentially provide or consume MEC services 437a. The term "MEC service" refers to a service provided via a MEC platform 437 either by the MEC platform 437 itself or by a MEC App 436. MEC Apps 436 may run as VM on top of the VI 438 provided by the MEC server 136, and can interact with the MEC platform 437 to consume and provide the MEC services 437a. The MEC Apps 436 are instantiated on the VI 438 of the MEC server 136 based on configuration or requests validated by the ME management 430. The MEC Apps 436 can also interact with the MEC platform 437 to perform certain support procedures related to the lifecycle of the MEC Apps 436, such as indicating availability, preparing relocation of user state, etc. The MEC Apps 436 may have a certain number of rules and requirements associated to them, such as required resources, maximum latency, required or useful services, etc. These requirements may be validated by the ME management 430, and can be assigned to default values if missing. MEC services 437-1a and 437-2a (collectively referred to as "MEC services "437a" or the like) are services provided and/or consumed either by the MEC platform 437 and/or MEC Apps 436. The service consumers (e.g., MEC Apps 436 and MEC platform 437) may communicate with particular MEC services 437a over individual APIs (including MEC LPP API 451-1, 451-2 and various APIs 453-1, 453-2 in FIG. 4). When provided by an application, a MEC service 437a can be registered in a list of services in the service registries 437-1d and 437-2d (collectively referred to as "service registry 437d" or the like) to a respective the MEC platform 437 over the Mp1 reference point. Additionally, the MEC Apps 436 can subscribe to one or more services 437a for which it is authorized over the Mp1 reference point. In various embodiments, one or more MEC Apps 436 are configured to collect data for the LPP services discussed herein (e.g., LPPS 200 of FIG. 2). In these embodiments, the MEC platform 437 may operate these MEC Apps 436 to perform the various functionalities of the LPP layer 202 (or LPP engine) and/or one or more prediction layers 225 to 225-N of FIG. 2, and/or perform the various functionalities of the embodiments discussed infra with respect to FIG. 6-19.

The MEC system 400 may support a feature called UserApps. When the MEC system 400 supports the feature UserApps, the ME management 430 may support the instantiation of MEC Apps 436 (or user applications) on multiple MEC hosts 136 following a single instantiation request, and when required by the operator in response to a request by the user. The application instance may need to fulfill a number of potential constraints predefined for the application 405. Once instantiated, connectivity may be established between the UE 420 and the application instance. Potential constraints may include latency, location, compute resources, storage resources, network capability, security conditions, and the like. As part of the user application (or MEC app 436) instantiation, the MEC system 400 will create an associated application context that the MEC system 400 maintains for the lifetime of the user application (or MEC app 436). The application context is a set of reference data about an application instance that is used to identify it, enable lifecycle management operations and associate it with its device application, The term "user context" in the context of MEC refers to application-specific runtime data maintained by a MEC app 436, which is associated with a user of that application. The application context contains information specific to the application instance such as its unique identifier within the MEC system 400 and the address (e.g., URI or the like) provided for clients (e.g., UE 420) that are external to the MEC system 400 to interact with the user application.

When the MEC system 400 supports the feature UserApps, the system 400 may, in response to a request by a user, support the establishment of connectivity between the UE 420 and an instance of a specific MEC App 436 fulfilling the requirements of the MEC App 436 regarding the UE 420. If no instance of the MEC App 436 fulfilling these requirements is currently running, the multi-access edge system management may create a new instance of the application 405 on a MEC host 136 that fulfills the requirements of the application 405. Once instantiated, connectivity is established between the UE 420 and the new MEC App 436 instance. Requirements of the application can include latency, location, compute resources, storage resources, network capability, security conditions, and the like. When the MEC system 400 supports the UserApps feature, the system 400 may support the on-boarding of MEC Apps 436 during the execution of an instantiation request, may allow the establishment of connectivity between the UE 420 and a specific instance of an MEC App 436, may support the capability to terminate the MEC App 436 instance when no UE 420 is connected to it anymore, and may support the termination of the MEC App 436 running on multiple MEC servers 136 following a single termination request.

As shown by FIG. 4, the Mp1 reference point is between the MEC platform 437 and the MEC Apps 436. The Mp1 reference point may provide service registration 437d, service discovery, and communication support for various services, such as the MEC services 437-1a provided by MEC host 136-1 and MEC services 437-2a provided by MEC host 136-2 (collectively referred to as "MEC services 437a" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 437a include Radio Network Information Service (RNIS), location services, and bandwidth management services. The RNIS, when available, provides authorized MEC Apps 436 with radio network related information, and expose appropriate up-to-date radio network information to the MEC Apps 436. The radio network information (RNI) may include, inter alia, radio network conditions, measurement and statistics information related to the user plane, information related to UEs 420 served by the radio node(s) associated with the MEC host 136 (e.g., UE context and radio access bearers), changes on information related to UEs 420 served by the radio node(s) associated with the MEC host 136, and/or the like. The RNI may be provided at the relevant granularity (e.g., per UE 420, per cell, per period of time).

The service consumers (e.g., MEC Apps 436 and MEC platform 437) may communicate with the RNIS over an RNI API 453 to obtain contextual information from a corresponding RAN. RNI may be provided to the service consumers via an access node (e.g., (R)AN nodes 131, 132, or AP 133 of FIG. 1). The RNI API 453 may support both query and subscription (e.g., a pub/sub) based mechanisms that are used over a Representational State Transfer (RESTful) API 453 or over a message broker of the MEC platform 437 (not shown by FIG. 4). A MEC App 436 may query information on a message broker via a transport information query procedure, wherein the transport information may be pre-provisioned to the MEC App 436 via a suitable configuration mechanism. The various messages communicated via the RNI API 453 may be in XML, JSON, Protobuf, or some other suitable format.

The RNI may be used by MEC Apps 436 and MEC platform 437 to optimize the existing services and to provide new types of services that are based on up to date information on radio conditions. As an example, a MEC App 436 may use RNI to optimize current services such as video throughput guidance. In throughput guidance, a radio analytics MEC App 436 may use MEC services to provide a backend video server with a near real-time indication on the throughput estimated to be available at the radio downlink interface in a next time instant. The throughput guidance radio analytics application 436 computes throughput guidance based on the required radio network information it obtains from a multi-access edge service running on the MEC server 136. RNI may be also used by the MEC platform 437 to optimize the mobility procedures required to support service continuity, such as when a certain MEC App 436 requests a single piece of information using a simple request-response model (e.g., using RESTful mechanisms) while other MEC Apps 436 subscribe to multiple different notifications regarding information changes (e.g., using a pub/sub mechanism and/or message broker mechanisms).

The location services (LS), when available, may provide authorized MEC Apps 436 with location-related information, and expose such information to the MEC Apps 436. With location related information, the MEC platform 437 or one or more MEC Apps 436 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 420 currently served by the radio node(s) associated with the MEC server 136, information about the location of all UEs 420 currently served by the radio node(s) associated with the MEC server 136, information about the location of a certain category of UEs 420 currently served by the radio node(s) associated with the MEC server 136, a list of UEs 420 in a particular location, information about the location of all radio nodes currently associated with the MEC server 136, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 136, or a subset thereof, according to a desired deployment. In this regard, the OMA Zonal Presence API 453 provides means for MEC Apps 436 to retrieve information about a zone, the access points associated to the zones and the users that are connected to the access points. In addition, the OMA Zonal Presence API 453, allows authorized application to subscribe to a notification mechanism, reporting about user activities within a zone. In various embodiments, a MEC server 136 may access location information or zonal presence information of individual UEs 420 using the OMA Zonal Presence API 453 to identify the relative location or positions of the UEs 420.

The bandwidth management services (BWMS) provides for the allocation of bandwidth (BW) to certain traffic routed to and from MEC Apps 436, and specify static/dynamic up/down BW resources, including BW size and BW priority. MEC Apps 436 may use the BWMS to update/receive BW information to/from the MEC platform 437. In some embodiments, different MEC Apps 436 running in parallel on the same MEC server 136 may be allocated specific static, dynamic up/down BW resources, including BW size and BW priority. The BWMS includes a BW management (BWM) API 453 to allowed registered applications to statically and/or dynamically register for specific BW allocations per session/application. The BWM API 453 includes HTTP protocol bindings for BWM functionality using RESTful services or some other suitable API mechanism.

Referring back to FIG. 4, multi-access edge management comprises multi-access edge system level management and the multi-access edge host level management 430. The ME management 430 comprises the MEC platform manager 431 and the VI manager (VIM) 432, and handles the management of MEC-specific functionality of a particular MEC server 136 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 431 is responsible for managing the life cycle of applications including informing the multi-access edge orchestrator (MEC-O) 421 of relevant application related events. The MEC platform manager 431 may also provide MEP element management functions 431$a$ to the MEC platform 437, manage MEC App rules and requirements 431$b$ including service authorizations, traffic rules, DNS configuration and resolving conflicts, and manage MEC App 436 lifecycles (MEALC mgmt 431$c$). The MEC platform manager 431 may also receive virtualized resources fault reports and performance measurements from the VIM 432 for further processing. The Mm5 reference point between the MEC platform manager 431 and the MEC platform 437 is used to perform platform configuration, configuration of the MEPE mgmt 431$a$, the MERR mgmt 431$b$, the MEALC mgmt 431$c$, management of application relocation, etc.

The VIM 432 may be an entity that allocates, manages and releases virtualized (compute, storage and networking) resources of the VI 438, and prepares the VI 438 to run a software image. To do so, the VIM 432 may communicate with the VI 438 over the Mm7 reference point between the VIM 432 and the VI 438. Preparing the VI 438 may include configuring the VI 438, and receiving/storing the software image. When supported, the VIM 432 may provide rapid provisioning of applications, such as described in "Openstack++ for Cloudlet Deployments", available at http://reports-archive.adm.cs.cmu.edu/anon/2015/CMU-CS-15-123.pdf. The VIM 432 may also collect and report performance and fault information about the virtualized resources, and perform application relocation when supported. For application relocation from/to external cloud environments, the VIM 432 may interact with an external cloud manager to perform the application relocation, for example using the mechanism described in "Adaptive VM Handoff Across Cloudlets", and/or possibly through a proxy. Furthermore, the VIM 432 may communicate with the MEC platform manager 431 via the Mm6 reference point, which may be used to manage virtualized resources, for example, to realize the application lifecycle management. Moreover, the VIM 432 may communicate with the MEC-O 421 via the Mm4 reference point, which may be used to manage virtualized resources of the MEC server 136, and to manage application images. Managing the virtualized resources may include tracking available resource capacity, etc.

The multi-access edge system level management includes the MEC-O 421 as a core component, which has an overview of the complete MEC system 400. The MEC-O 421 may maintain an overall view of the MEC system 400 based on deployed multi-access edge hosts 901, available resources, available MEC services 437$a$, and topology. The Mm3 reference point between the MEC-O 421 and the MEC platform manager 431 may be used for the management of the application lifecycle, application rules and requirements and keeping track of available MEC services 437$a$. The MEC-O 421 may communicate with the user application lifecycle management proxy (UALMP) 425 via the Mm9 reference point in order to manage MEC Apps 436 requested by UE application 405.

The MEC-O 421 may also be responsible for on-boarding of application packages, including checking the integrity and authenticity of the packages, validating application rules and requirements and if necessary adjusting them to comply with operator policies, keeping a record of on-boarded packages, and preparing the VIM(s) 402 to handle the applications. The MEC-O 421 may select appropriate MEC host(s) 901 for application instantiation based on constraints, such as latency, available resources, and available services. The MEC-O 421 may also trigger application instantiation and termination, as well as trigger application relocation as needed and when supported.

The Operations Support System (OSS) 422 refers to the OSS of an operator that receives requests via the Customer Facing Service (CFS) portal 406 (and over the Mx1 reference point) and from UE applications 405 for instantiation or termination of MEC Apps 436, and decides on the granting of these requests. The CFS portal 406 (and the Mx1 interface) may be used by third-parties to request the MEC system 400 to run applications 406 in the MEC system 400. Granted requests may be forwarded to the MEC-O 421 for further processing. When supported, the OSS 422 also receives requests from UE applications 405 for relocating applications between external clouds and the MEC system 400. The Mm2 reference point between the OSS 422 and the MEC platform manager 431 is used for the MEC platform manager 431 configuration, fault and performance management. The Mm1 reference point between the MEC-O 421 and the OSS 422 is used for triggering the instantiation and the termination of multi-access edge applications 436 in the MEC system 400.

The UE app(s) 405 (also referred to as "device applications" or the like) is one or more applications running in a device, computing system, etc. (e.g., UE 420), that has the capability to interact with the MEC system 900 via the user application lifecycle management proxy 425. The UE app(s) 405 may be, include, or interact with one or more client applications, which in the context of MEC, is application software running on a device, computing system, etc. that utilizes functionality provided by one or more specific MEC application(s) 436. The user application lifecycle management proxy ("user app LCM proxy") 425 may authorize requests from UE applications 405 in the UE and interacts with the OSS 422 and the MEC-O 421 for further processing of these requests. The term "lifecycle management," in the context of MEC, refers to a set of functions required to manage the instantiation, maintenance and termination of a MEC application 436 instance. The user app LCM proxy 425 may interact with the OSS 422 via the Mm8 reference point, and is used to handle UE applications 405 requests for running applications in the MEC system 400. A user application 405 may be an MEC App 436 that is instantiated in the MEC system 400 in response to a request of a user via an application running in the UE 420 (e.g., UE application 405). The user app LCM proxy 425 allows UE applications 405 to request on-boarding, instantiation, termination of user applications and when supported, relocation of user applications in and out of the MEC system 400. It also allows informing the UE applications 405 about the state of the user applications 405. The user app LCM proxy 425 is only accessible from within the mobile network, and may only be available when supported by the MEC system 400. A UE application 405 may use the Mx2 reference point between the user app LCM proxy 425 and the UE application 405 to request the MEC system 400 to run an application in the MEC system 400, or to move an application in or out of the MEC system 400. The Mx2 reference point may only be accessible within the mobile network and may only be available when supported by the multi-access edge system.

In order to run an MEC App 436 in the MEC system 400, the MEC-O 421 receives requests triggered by the OSS 422, a third-party, or a UE application 405. In response to receipt of such requests, the MEC-O 421 selects a MEC server 136 to host the MEC App 436 for computational offloading. These requests may include information about the application to be run, and possibly other information, such as the location where the application needs to be active, other application rules and requirements, as well as the location of the application image if it is not yet on-boarded in the MEC system 400.

In various embodiments, the MEC-O 421 selects one or more MEC servers 136 for computational intensive tasks. The selected one or more MEC servers 136 may offload computational tasks of a UE application 405 based on various operational parameters, such as network capabilities and conditions, computational capabilities and conditions, application requirements, and/or other like operational parameters. The application requirements may be rules and requirements associated to/with one or more MEC Apps 436, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 436 to be able to run; multi-access edge services that the MEC Apps 436 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 437*b*; DNS rules 437*c*; etc.

The MEC-O 421 considers the requirements and information listed above and information on the resources currently available in the MEC system 400 to select one or several MEC servers 136 within the MEC system 400 to host MEC Apps 436 and/or for computational offloading. After one or more MEC servers 136 are selected, the MEC-O 421 requests the selected MEC host(s) 136 to instantiate the application(s) or application tasks. The actual algorithm used to select the MEC servers 136 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 421 may decide to select one or more new MEC servers 136 to act as a master node, and initiates the transfer of an application instance or application-related state information from the one or more source MEC servers 136 to the one or more target MEC servers 136.

As mentioned previously, the MEC system architecture 400 provides support for applications. In the context of FIG. 4, the UE app 405 is an application instance running on a UE 420, which may subscribe to LPP services/notifications from the LPPS 200 and/or request and receive LPP services to/from the system. Additionally, the UE app 405 is an application instance running on a UE 420, which may be used by the LPPS 200 to collect real-time and spatio-historical data from the UE 420 (or from components therein). These application instances obtain or otherwise interact with a LPP service via MEC LPP API 451*a* and 451*b* (collectively referred to as "MEC LPP API 451"). [[[MEC hosts 136 are co-located with edge infrastructure (e.g., NANs 131, 132, and 133 of FIG. 1) and communicate with each other through the Mp3 interface.]]]

In embodiments, LPP Information Services (LPP-IS) 452-1 and 452-2 (collectively referred to as "MEC LPP-IS 452") permits information exposure pertinent to the support of link quality/performance prediction use cases to MEC app 436 instances. The LPP-IS 452 may be produced by the MEC platform 437 or by the MEC Apps 436. In the framework of LPPS 200, the UE 420 is hosting an LPP client application (see e.g., LPP App 620 of FIG. 6), and is connected to a certain MEC host 136 and a related MEC App 436 operating within that MEC host 136. In presence of multiple MEC hosts 136, the LPP-IS 452 permits exposure of LPP information between MEC Apps 436 running on different MEC hosts 136, and exposure of LPP information with remote systems/services via the LPP API 451. The remote systems/services may be remote application server instances (e.g., server(s) 150 of FIG. 1), which can be located outside the MEC system 135 (e.g., private clouds owned by the operator or by the OEM such as cloud 144) and may access the LPP notifications via the LPP API 451.

LPP-IS 452 also permits a single network operator to offer a LPP service(s) over a region that may span different countries and involve multiple networks, MEC systems 400, and MEC app 436 providers. For that purpose, the MEC LPP-IS 452 includes the following functionalities.

In some aspects, the MEC platform 437 can include a MEC LPP API 451 and provide MEC LPP-IS 452, which can include the following functionalities: (a) gathering of relevant UE information from an access network for purposes of performing UE authorization for LPP services (e.g., obtaining a list of LPP authorized UEs 420, obtaining relevant information about the authorization based on UE subscription information/data, and obtaining UE configuration parameters such as a common set of radio link configuration parameters and/or UE capabilities, if available); (b) gathering of relevant radio link and/or backhaul link information from the access network for determining and providing LPPs to the UEs 420; (c) exposure of the information obtained in (a)-(b) to MEC apps 436 in the same MEC host 136 or MEC apps 436 in other MEC hosts 136 via the MEC LPP API 451; (d) for core network based implementations, enablement of MEC apps 436 to communicate securely with the LPP-related core network functions (e.g., enabling communication between the MEC host and an "LPP control function" in the core network); (e) enablement of MEC apps 436 in different MEC systems 400 to communicate securely with each other; and (d) gathering and processing information available in other MEC hosts 136 via one or more other MEC APIs 453 (e.g., gathering and processing information obtained from the RNI API, LS API, BWM API, a WLAN API, and/or other APIs that may be implemented within the MEC platform 437 such as those discussed herein) in order to predict radio network congestion, BW measurements/resources, UE 420 location(s)/mobility, and provide suitable notifications (e.g., LPP notifications) to the UE 420.

From that perspective, the LPP-IS 452 is relevant to Mp1 and Mp3 reference points in the MEC architecture 400. In particular, the relevant information is exposed to MEC apps 436 via the Mp1 reference point, and the Mp3 reference point may enable the possibility to transfer this information between different MEC platforms 437. The MEC LPP API 451 provides information to MEC apps 436 in a standardized way, which provides interoperability in multi-vendor scenarios. Nevertheless, MEC apps 436 may communicate in a direct way (e.g., without the use of MEC platform 437). Inter-system communication may be realized between MEC Orchestrators 421. As an alternative, or, in addition to that, possible Mp3 enhancements (or new reference points between MEC systems 400) may be defined.

In some aspects, the MEC host 136-2 in FIG. 4 can also implement a MEC LPP API 451-2, which can provide an interface to one or more of the apps instantiated within MEC host 2, such as MEC App 436-2b. In this regard, MEC host 136-1 and MEC host 136-2 can communicate with each other via the Mp3 interface as well as the MEC LPP APIs 451-1, 451-2. Additionally, one or more of the MEC apps 436-1 instantiated within MEC host 136-1 can communicate with one or more of the MEC apps 436-2 instantiated within MEC host 136-2 via the MEC LPP APIs 451-1, 451-2 as well as the Mp3 interface between the MEC host 136-1 and MEC host 136-2.

In some aspects, each of the MEC hosts 136 can be owned/managed by a different mobile services operator (while it can be operated directly by a MEC vendor or a third party). In some aspects, MEC apps 436 instantiated on MEC host 136-1 and MEC host 136-2 can be used to provide LPP-related services, and can be operated by the mobile services operator, by a MEC vendor, or by a third party (e.g., OEM, or OEM supplier, or system integrator).

In some aspects, the MEC LPP APIs 451 can be provided as a general middleware service, providing information gathered from UEs 420 and other network elements (e.g., NANs 131, 132, and/or 133 of FIG. 1), and exposed as a service within the MEC hosts 136 (e.g., as a RESTful API) for the higher layers (e.g., the MEC apps 436 instantiated within the MEC hosts 136). In some aspects, the MEC LPP APIs 451 can be configured to gather information and data from various sensors. In this regard, the deployment of the MEC LPP APIs 451 is ensuring continuity of the service across different mobile networks, for the same OEM (e.g., UE manufacturer) and/or mobile network operator (MNO).

In some embodiments, MEC apps 436 can be configured to host and/or store LPP-related data and/or configuration parameters, such as collected measurement data, UE operational/performance data (e.g., application usage statistics, processor and/or memory utilization, and/or other like data such as those disused herein), UE capability information, and/or the like. The availability of this LPP-related data and/or configuration parameters also in absence of network coverage is ensured by the usage of an Mp3 interface (or another type of interface) between the MEC hosts 136.

In some embodiments, MEC apps 436 can be configured to host one or more prediction layers as discussed herein, such as a data collection layer (or UE feedback layer), cell load layer (or cell model layer), an intra-cell layer, a cell mobility layer (or cell transition layer), a geoposition layer (or geographical position layer), a network topology layer, and/or other like prediction layers. The various prediction layers may provide respective predicted performance metrics in absence of network coverage by the usage of an Mp3 interface (or another type of interface) between the MEC hosts 136.

In the aforementioned embodiments, MEC app 436-1 can be configured to connect to MEC host 136-2 (through MEC LPP API 451-2 in MEC host 2), and MEC app 436-2 can be configured to connect to MEC host 136-1 (through V2X MEC API 451-1 in MEC host 1). In case of a multi-operator architecture, multiple MEC hosts 136 can be configured to communicate with each other via the MEC LPP APIs 451 and synchronize in order to transfer the relevant LPP-related data (e.g., real-time data and/or spatio-historical data) and/or predicted performance metrics so that they can be available across the multi-operator architecture in absence of network coverage or during network infrastructure/equipment failures. In this way, the LPP service (e.g., LPPS 200 of FIG. 2) can have access to the LPP-related data and/or the predicted performance metrics even when the UEs 420 are not in network coverage or when failures or overload situations occur at different parts of the network.

In some embodiments, one or more MEC apps 436 within a MEC host 136 can be instantiated to perform functionalities of an LPP engine (e.g., LPP layer 202 of FIG. 2), which may provide the LPP-IS 452. Additionally, MEC hosts 136 can use MEC LPP APIs 451 to perform various LPP-IS 452 functions. In particular, these one or more MEC apps 436 can be instantiated within a MEC host 136 to perform various aspects of the LPP embodiments discussed herein, as well as the following functionalities: obtaining LPP subscription information for UE 420; determining whether the UE 420 is authorized to obtain LPP notifications, which may or may not be in response to a request for LPP services; communicating LPP-related data and/or configuration parameters; and so forth.

Figure 5:
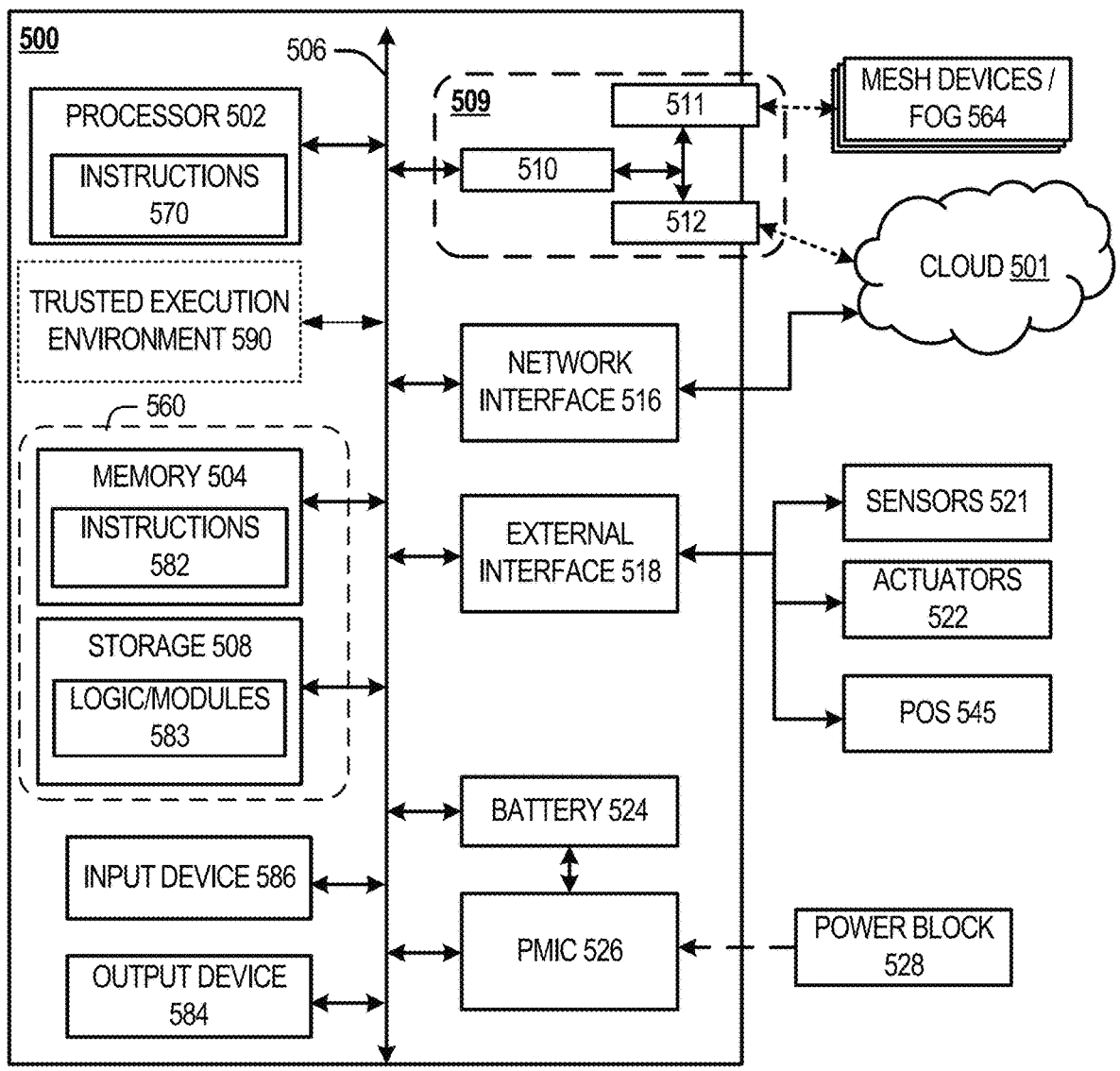
FIG. 5 depicts example components of a computer platform in accordance with various embodiments.

FIG. 5 illustrates an example of a platform 500 (also referred to as "system 500," "device 500," "appliance 500," or the like) in accordance with various embodiments. In embodiments, the platform 500 may be suitable for use as intermediate nodes 120 and/or endpoints 110 of FIG. 1, and/or any other element/device discussed herein with regard any other figure shown and described herein. Platform 500 may also be implemented in or as a server computer system or some other element, device, or system discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The example of FIG. 5 is intended to show a high level view of components of the computer platform 500. However, some of the components shown may be omitted, additional components may be present, and different arrangement of the components shown may occur in other implementations.

The platform 500 includes processor circuitry 502. The processor circuitry 502 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 502 may include one or more hardware accelerators, which may be microprocessors, programmable processing devices (e.g., FPGA, ASIC, etc.), or the like. The one or more hardware accelerators may include, for example, computer vision, machine learning, and/or deep learning accelerators. In some implementations, the processor circuitry 502 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 502 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof The processors (or cores) of the processor circuitry 502 may be coupled with or may include memory/storage and may be configured to execute instructions stored in the memory/storage to enable various applications or operating systems to run on the platform 500. In these embodiments, the processors (or cores) of the processor circuitry 502 is configured to operate application software to provide a specific service to a user of the platform 500. In some embodiments, the processor circuitry 502 may be a special-purpose processor/controller to operate according to the various embodiments herein.

As examples, the processor circuitry 502 may include an Intel® Architecture Core™ based processor, such as a Quark™, an Atom™, an i3, an i5, an i7, an i9, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 502 may be a part of a system on a chip (SoC), System-in-Package (SiP), a multi-chip package (MCP), and/or the like, in which the processor circuitry 502 and other components are formed into a single integrated circuit, or a single package, such as the Edison™ or Galileo™ SoC boards from Intel® Corporation. Other examples of the processor circuitry 502 are mentioned elsewhere in the present disclosure.

Additionally or alternatively, processor circuitry 502 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 502 may comprise logic blocks or logic fabric including and other interconnected resources that may be programmed to perform various functions, such as the procedures, methods, functions, etc. of the various embodiments discussed herein. In such embodiments, the circuitry of processor circuitry 502 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 502 may communicate with system memory circuitry 504 over an interconnect 506 (e.g., a bus). Any number of memory devices may be used to provide for a given amount of system memory. As examples, the memory circuitry 504 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 504 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 504 may also comprise persistent storage devices, which may be temporal and/or persistent storage of any type, including, but not limited to, non-volatile memory, optical, magnetic, and/or solid state mass storage, and so forth.

The individual memory devices of memory circuitry 504 may be implemented as one or more of solder down packaged integrated circuits, socketed memory modules, and plug-in memory cards. The memory circuitry 504 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 504. In embodiments, the memory circuitry 504 may be disposed in or on a same die or package as the processor circuitry 502 (e.g., a same SoC, a same SiP, or soldered on a same MCP as the processor circuitry 502).

To provide for persistent storage of information such as data, applications, operating systems (OS), and so forth, a storage circuitry 508 may also couple to the processor circuitry 502 via the interconnect 506. In an example, the storage circuitry 508 may be implemented via a solid-state disk drive (SSDD). Other devices that may be used for the storage circuitry 508 include flash memory cards, such as SD cards, microSD cards, xD picture cards, and the like, and USB flash drives. In low power implementations, the storage circuitry 508 may be on-die memory or registers associated with the processor circuitry 502. However, in some examples, the storage circuitry 508 may be implemented using a micro hard disk drive (HDD). Further, any number of new technologies may be used for the storage circuitry 508 in addition to, or instead of, the technologies described, such resistance change memories, phase change memories, holographic memories, or chemical memories, among others.

The storage circuitry 508 stores computational logic 583 (or "modules 583") in the form of software, firmware, or hardware commands to implement the techniques described herein. The computational logic 583 may be employed to store working copies and/or permanent copies of computer programs, or data to create the computer programs, for the operation of various components of platform 500 (e.g., drivers, etc.), an operating system of platform 500, one or more applications, and/or for carrying out the embodiments discussed herein. The computational logic 583 may be stored or loaded into memory circuitry 504 as instructions 582, or data to create the instructions 582, for execution by the processor circuitry 502 to provide the functions described herein. The various elements may be implemented by assembler instructions supported by processor circuitry 502 or high-level languages that may be compiled into such instructions (e.g., instructions 570, or data to create the instructions 570). The permanent copy of the programming instructions may be placed into persistent storage devices of storage circuitry 508 in the factory or in the field through, for example, a distribution medium (not shown), through a communication interface (e.g., from a distribution server (not shown)), or over-the-air (OTA).

The instructions 582 and/or modules 583 (also referred to as "program code" or "programming instructions") provided via the memory circuitry 504 and/or the storage circuitry 508 of FIG. 5 are embodied as one or more non-transitory computer readable storage media (NTCRSM) 560 including program code, a computer program product or data to create the computer program, with the computer program or data, to direct the processor circuitry 502 of platform 500 to perform electronic operations in the platform 500, and/or to perform a specific sequence or flow of actions, for example, as described with respect to the flowchart(s) and block diagram(s) of operations and functionality depicted by FIGS. 1-2 and 6-19. In some embodiments, the programming instructions (or data to create the programming instructions) to be executed may be in a pre-configured form that may require configuration instructions to install or provision the programming instructions to an apparatus (such as any of the devices/components/systems described herein). When installed/provisioned, configured and executed, the programming instructions can complete or perform various programming operations associated with operating system functions, one or more applications, and/or aspects of the present disclosure (including various programming operations associated with FIGS. 1-2 and 6-19.

In various embodiments, the instructions 582 and/or modules 583 may include, or may be, program code for one or more applications, components, plug-ins, firmware, etc., which when running on the system 500, collect spatial-temporal data, and provides this information to one or more prediction layers 205 in the LPPS 200 via a suitable access network (e.g., a NAN 131, 132, 133 and CN142 or cloud 144). An example of such an application is discussed infra with respect to FIG. 6. As discussed in more detail infra, the spatial-temporal data such as operational parameters of the system 200, signal measurements, and/or other like data as discussed herein, which may be accessed using suitable APIs, drivers, etc., (e.g., a modem driver for accessing signal measurements and/or other like information from the modem 510). In some embodiments, these applications, components, plug-ins, firmware, etc., may also subscribe to the LPPS 200 to receive LPP notifications or "hints" from the LPPS 200 (see e.g., FIGS. 13-19).

In alternate embodiments, programming instructions (or data to create the instructions) may be disposed on multiple NTCRSM 560. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 560 may be embodied by devices described for the storage circuitry 508 and/or memory circuitry 504. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 583, instructions 582, 570 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 500, partly on the system 500, as a stand-alone software package, partly on the system 500 and partly on a remote computer or entirely on the remote computer or server. In the latter scenario, the remote computer may be connected to the system 500 through any type of network, including a LAN or WAN, or the connection may be made to an external computer (e.g., through the Internet using an Internet Service Provider).

In an example, the instructions 570 on the processor circuitry 502 (separately, or in combination with the instructions 582 and/or logic/modules 583 stored in computer-readable storage media) may configure execution or operation of a trusted execution environment (TEE) 590. The TEE 590 operates as a protected area accessible to the processor circuitry 502 to enable secure access to data and secure execution of instructions. In some embodiments, the TEE 590 may be a physical hardware device that is separate from other components of the system 500 such as a secure-embedded controller, a dedicated SoC, or a tamper-resistant chipset or microcontroller with embedded processing devices and memory devices. In other embodiments, the TEE 590 may be implemented as secure enclaves, which are isolated regions of code and/or data within the memory of the system 500. Only code executed within a secure enclave may access data within the same secure enclave, and the secure enclave may only be accessible using the secure application (which may be implemented by an application processor or a tamper-resistant microcontroller). Various implementations of the TEE 590, and an accompanying secure area in the processor circuitry 502 or the memory circuitry 504 and/or storage circuitry 508 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 500 through the TEE 590 and the processor circuitry 502.

Although the instructions 582 are shown as code blocks included in the memory circuitry 504 and the computational logic 583 is shown as code blocks in the storage circuitry 508, it should be understood that any of the code blocks may be replaced with hardwired circuits, for example, built into an FPGA, ASIC, or some other suitable circuitry. For example, where processor circuitry 502 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 504 and/or storage circuitry 508 may store program code of an operating system (OS), which may be a general purpose OS or an OS specifically written for and tailored to the computing platform 500. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®. QNX® RTOS provided by BlackBerry Ltd., or any other suitable RTOS, such as those discussed herein.

The OS may include one or more drivers that operate to control particular devices that are embedded in the platform 500, attached to the platform 500, or otherwise communicatively coupled with the platform 500. The drivers may include individual drivers allowing other components of the platform 500 to interact or control various IO devices that may be present within, or connected to, the platform 500. For example, the drivers may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, actuator drivers to obtain actuator positions of the actuators 522 and/or control and allow access to the actuators 522, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from TEE 590.

The components may communicate over the interconnect 506. The interconnect 506 may include any number of technologies, including industry standard architecture (ISA), extended ISA (EISA), peripheral component interconnect (PCI), peripheral component interconnect extended (PCIx), PCI express (PCIe), or any number of other technologies. The interconnect 506 may be a proprietary bus, for example, used in a SoC based system. Other bus systems may be included, such as an I²C interface, an SPI interface, point-to-point interfaces, and a power bus, among others.

The interconnect 506 couples the processor circuitry 502 to the communication circuitry 509 for communications with other devices. The communication circuitry 509 is a hardware element, or collection of hardware elements, used to communicate over one or more networks (e.g., cloud 501) and/or with other devices (e.g., mesh devices/fog 564). The communication circuitry 509 includes baseband circuitry 510 (or "modem 510") and radiofrequency (RF) circuitry 511 and 512.

The baseband circuitry 510 includes one or more processing devices (e.g., baseband processors) to carry out various protocol and radio control functions. Baseband circuitry 510 may interface with application circuitry of platform 500 (e.g., a combination of processor circuitry 502, memory circuitry 504, and/or storage circuitry 508) for generation and processing of baseband signals and for controlling operations of the RF circuitry 511 or 512. The baseband circuitry 510 may handle various radio control functions that enable communication with one or more radio networks via the RF circuitry 511 or 512. The baseband circuitry 510 may include circuitry such as, but not limited to, one or more single-core or multi-core processors (e.g., one or more baseband processors) or control logic to process baseband signals received from a receive signal path of the RF circuitry 511 and/or 512, and to generate baseband signals to be provided to the RF circuitry 511 or 512 via a transmit signal path. In various embodiments, the baseband circuitry 510 may implement a real-time OS (RTOS) to manage resources of the baseband circuitry 510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 5, in one embodiment, the baseband circuitry 510 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 509 is a cellular radiofrequency communication system, such as millimeter wave (mmWave) communication circuitry or some other suitable cellular communication circuitry. In the first example, the protocol processing circuitry 502 would operate MAC, RLC, PDCP, SDAP, RRC, and NAS functions. In a second example, the protocol processing circuitry may operate one or more IEEE-based protocols when the communication circuitry 509 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 510 and/or RF circuitry 511 and 512. The baseband circuitry 510 may also support radio communications for more than one wireless protocol.

Continuing with the aforementioned embodiment, the baseband circuitry 510 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/de-mapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 509 also includes RF circuitry 511 and 512 to enable communication with wireless networks using modulated electromagnetic radiation through a non-solid medium. Each of the RF circuitry 511 and 512 include a receive signal path, which may include circuitry to convert analog RF signals (e.g., an existing or received modulated waveform) into digital baseband signals to be provided to the baseband circuitry 510. Each of the RF circuitry 511 and 512 also include a transmit signal path, which may include circuitry configured to convert digital baseband signals provided by the baseband circuitry 510 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 511 or 512 using metal transmission lines or the like.

The RF circuitry 511 (also referred to as a "mesh transceiver") is used for communications with other mesh or fog devices 564. The mesh transceiver 511 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 511, configured for a particular wireless communication protocol, may be used for the connections to the mesh devices 564. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 511 may communicate using multiple standards or radios for communications at different ranges. For example, the platform 500 may communicate with close/proximate devices, e.g., within about 10 meters, using a local transceiver based on BLE, or another low power radio, to save power. More distant mesh devices 564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 512 (also referred to as a "wireless network transceiver," a "cloud transceiver," or the like) may be included to communicate with devices or services in the cloud 501 via local or wide area network protocols. The wireless network transceiver 512 includes one or more radios to communicate with devices in the cloud 501. The cloud 501 may be the same or similar to cloud 144 discussed previously. The wireless network transceiver 512 may be a LPWA transceiver that follows the IEEE 802.15.4, or IEEE 802.15.4 g standards, among others, such as those discussed herein. The platform 500 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4 specification may be used.

In one example implementation, the communication circuitry 509 may be, or may include, a software defined radio (SDR) in which RF operating parameters including, but not limited to, frequency range, modulation type, and/or output power can be set or altered by software, and/or the technique by which this is achieved. Additionally or alternatively, the communication circuitry 509 may be, or may include, a software defined multiradio (SDMR), which is a device or technology where multiple radio technologies (or RATs) coexist and share their wireless transmission and/or reception capabilities, including but not limited to regulated parameters, by operating them under a common software system. In either of these example implementations, each of the transceivers 511 and 512 may be radio applications, which are software application executing in a SDR or SDMR. Radio applications are typically designed to use certain RF band(s) using agreed-to schemes for multiple access, modulation, channel and data coding, as well as control protocols for all radio layers needed to maintain user data links between adjacent radio equipment, which run the same radio application.

Any number of other radio communications and protocols may be used in addition to the systems mentioned for the mesh transceiver 511 and wireless network transceiver 512, as described herein. For example, the radio transceivers 511 and 512 may include an LTE or other cellular transceiver that uses spread spectrum (SPA/SAS) communications for implementing high-speed communications. Further, any number of other protocols may be used, such as WiFi® networks for medium speed communications and provision of network communications. The transceivers 511 and 512 may include radios that are compatible with, and/or may operate according to any one or more of the following radio communication technologies and/or standards including but not limited to those discussed herein.

Network interface circuitry/controller (NIC) 516 may be included to provide wired communication to the cloud 501 or to other devices, such as the mesh devices 564 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 500 via NIC 516 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 516 may include one or more dedicated processors and/or FPGAs to communicate using one or more of the aforementioned network interface protocols. In some implementations, the NIC 516 may include multiple controllers to provide connectivity to other networks using the same or different protocols. For example, the platform 500 may include a first NIC 516 providing communications to the cloud over Ethernet and a second NIC 516 providing communications to other devices over another type of network.

The interconnect 506 may couple the processor circuitry 502 to an external interface 518 (also referred to as "IO interface circuitry" or the like) that is used to connect external devices or subsystems. The external devices include, inter alia, sensor circuitry 521, actuators 522, and positioning circuitry 545. The sensor circuitry 521 may include devices, modules, or subsystems whose purpose is to detect events or changes in its environment and send the information (sensor data) about the detected events to some other a device, module, subsystem, etc. Examples of such sensors 521 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 518 connects the platform 500 to actuators 522, allow platform 500 to change its state, position, and/or orientation, or move or control a mechanism or system. The actuators 522 comprise electrical and/or mechanical devices for moving or controlling a mechanism or system, and converts energy (e.g., electric current or moving air and/or liquid) into some kind of motion. The actuators 522 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 522 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 500 may be configured to operate one or more actuators 522 based on one or more captured events and/or instructions or control signals received from a service provider and/or various client systems.

The positioning circuitry 545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-Technology for Positioning, Navigation, and Timing (Micro-PNT) IC that uses a master timing clock to perform position tracking/estimation without GNSS assistance. The positioning circuitry 545 may also be part of, or interact with, the communication circuitry 509 to communicate with the nodes and components of the positioning network. The positioning circuitry 545 may also provide position data and/or time data to the application circuitry, which may use the data to synchronize operations with various infrastructure (e.g., radio base stations), for turn-by-turn navigation, or the like.

In some examples, various 10 devices may be present within, or connected to, the platform 500, which are referred to as input device circuitry 586 and output device circuitry 584 in FIG. 5. The input device circuitry 586 and output device circuitry 584 include one or more user interfaces designed to enable user interaction with the platform 500 and/or peripheral component interfaces designed to enable peripheral component interaction with the platform 500. Input device circuitry 586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 584 may be included to show information or otherwise convey information, such as sensor readings, actuator position(s), or other like information. Data and/or graphics may be displayed on one or more user interface components of the output device circuitry 584. Output device circuitry 584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry 584 may also include speakers or other audio emitting devices, printer(s), and/or the like. In some embodiments, the sensor circuitry 521 may be used as the input device circuitry 586 (e.g., an image capture device, motion capture device, or the like) and one or more actuators 522 may be used as the output device circuitry 584 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 524 may be coupled to the platform 500 to power the platform 500, which may be used in embodiments where the platform 500 is not in a fixed location. The battery 524 may be a lithium ion battery, a lead-acid automotive battery, or a metal-air battery, such as a zinc-air battery, an aluminum-air battery, a lithium-air battery, a lithium polymer battery, and/or the like. In embodiments where the platform 500 is mounted in a fixed location, the platform 500 may have a power supply coupled to an electrical grid. In these embodiments, the platform 500 may include power tee circuitry to provide for electrical power drawn from a network cable to provide both power supply and data connectivity to the platform 500 using a single cable.

Power management integrated circuitry (PMIC) 526 may be included in the platform 500 to track the state of charge (SoCh) of the battery 524, and to control charging of the platform 500. The PMIC 526 may be used to monitor other parameters of the battery 524 to provide failure predictions, such as the state of health (SoH) and the state of function (SoF) of the battery 524. The PMIC 526 may include voltage regulators, surge protectors, power alarm detection circuitry. The power alarm detection circuitry may detect one or more of brown out (under-voltage) and surge (over-voltage) conditions. The PMIC 526 may communicate the information on the battery 524 to the processor circuitry 502 over the interconnect 506. The PMIC 526 may also include an analog-to-digital (ADC) convertor that allows the processor circuitry 502 to directly monitor the voltage of the battery 524 or the current flow from the battery 524. The battery parameters may be used to determine actions that the platform 500 may perform, such as transmission frequency, mesh network operation, sensing frequency, and the like. As an example, the PMIC 526 may be a battery monitoring integrated circuit, such as an LTC5020 or an LTC2990 from Linear Technologies, an ADT7488A from ON Semiconductor of Phoenix, Ariz., or an IC from the UCD90xxx family from Texas Instruments of Dallas, Tex.

A power block 528, or other power supply coupled to a grid, may be coupled with the PMIC 526 to charge the battery 524. In some examples, the power block 528 may be replaced with a wireless power receiver to obtain the power wirelessly, for example, through a loop antenna in the platform 500. A wireless battery charging circuit, such as an LTC5020 chip from Linear Technologies of Milpitas, Calif., among others, may be included in the PMIC 526. The specific charging circuits chosen depend on the size of the battery 524, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 6:
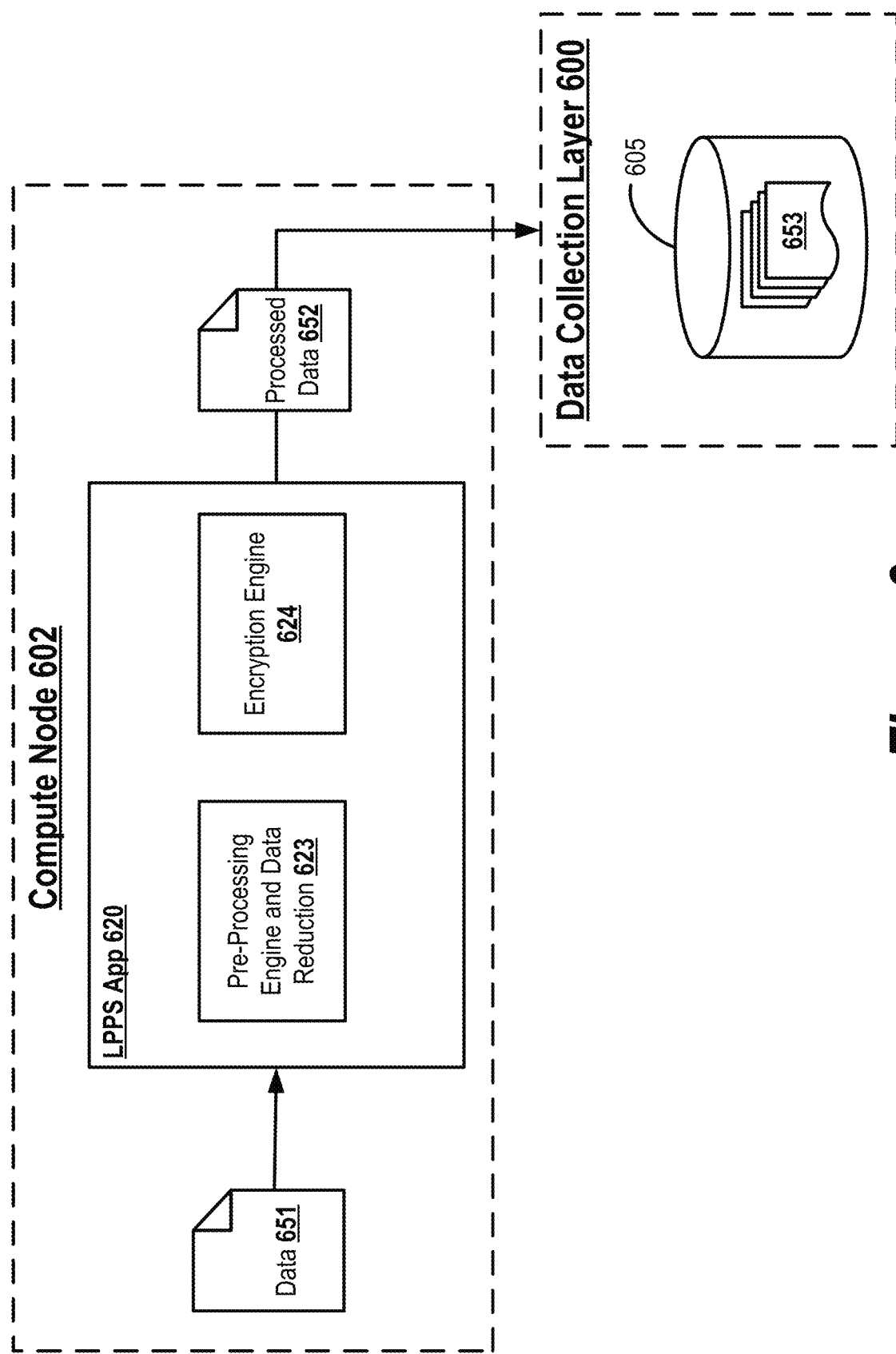
FIG. 6 depicts example data collection layer in accordance with various embodiments.

FIG. 6 depicts example logical components and interaction points of a data collection prediction layer 600 in accordance with various embodiments. The data collection layer 600 (also referred to as a "feedback layer" or the like) corresponds to one of the prediction layers 225-1 to 225-N of FIG. 2, and the compute node 602 corresponds to a device or system from which data is to be collected, such as a UE 111, 121, a NAN 131-133, or the like. Additionally, the LPPS application (app) 620 is an application to be operated by the compute node 602, which obtains and/or collects data 651 from various sources, performs various operations on the data 651, and provides processed data 652 to the data collection layer 600. In some embodiments, the LPPS app 620 may also be used to subscribe to, or consume, LPP notifications from the LPPS 200 of FIG. 2 as discussed elsewhere herein.

In the example of FIG. 6, the LPPS app 620 collects data 651 (e.g., raw data), which is fed to a pre-processing engine 623. The LPPS app 620 may collect the data 651 from various components of the compute node 602 using suitable APIs, ABIs, drivers, libraries, etc. In some embodiments, the data collection layer 600 may request or instruct the LPPS app 620 to collect certain types of data 651 such as one or more of the types of data/measurements discussed herein. This process may also be referred to as "feature extraction."

In an example, the LPPS app 620 may use a suitable driver, API, etc., to collect signal measurement data from modem or baseband circuitry of the compute node 602 (e.g., baseband circuitry 310 of FIG. 3 or baseband circuitry 510 of FIG. 5). In another example, the LPPS app 620 may use individual drivers, APIs, etc., to collect processor utilization and memory utilization from processor circuitry of the compute node 602 (e.g., application circuitry 305 of FIG. 3 or processor circuitry 502 of FIG. 5) and memory circuitry of the compute node 602 (e.g., memory circuitry 320 of FIG. 3 or memory circuitry 504 of FIG. 5), respectively. In another example, the LPPS app 620 may use respective APIs, ABIs, etc., to collect application parameters/data from various applications running on or stored by the compute node 602. In another example, the LPPS app 620 may use respective APIs, drivers, etc., to collect sensor data (e.g., speed/velocity data, position data, orientation data, etc.) from various sensors of the compute node 602 (e.g., positioning circuitry 345 of FIG. 3, sensor circuitry 521 and/or positioning circuitry 545 of FIG. 5, etc.). The LPPS app 620 may additionally or alternatively collect data from the compute node 602 according to other methods or techniques.

The pre-processing engine 623 performs various pre-processing and/or data reduction operations on the data 651, which may include, inter alia, converting the data 651 into digital data (e.g., where data 651 comprises analog signals or samples of such signals), normalizing (e.g., indexing, partitioning, augmenting, re-formatting, canonicalizing, etc.), editing, scaling, encoding, sorting, ordering, collating, and/or performing other transformations on the data 651. The pre-processing engine 623 may also remove out-of-range values from the data 651, impossible combinations of data, removing corrupt or inaccurate data, and/or the like. These pre-processing operations may be performed in order to ease the learning process of other prediction layers 225.

The pre-processed data may then be passed to the encryption engine 624 where the pre-processed data is encrypted using a suitable cipher or encryption algorithm to produce processed data 652. The processed data 652 is then sent to the data collection layer 600. Additionally, the processed data 652 may be packaged into appropriate messages for communication according to know mechanisms and protocols, such as those discussed herein.

In some embodiments, the LPPS app 620 may be a user or client system, such as the UEs 111, 121 of FIG. 1, and/or the computing system 500 of FIG. 5. In these embodiments, the data 651 collected by the LPPS app 620 and/or the data 652 provided to the data collection layer 600 may include, for example, cell identifier (ID) of a cell on which the LPPS app 620 is currently camping, a network ID of a NAN 131-133 to which the LPPS app 620 is attached, position information or geolocation of the NAN 131-133; a network ID of an edge compute node 136 providing services to the compute node 602 (if any); position information or geolocation of the edge compute node 136 (if any); a compute node ID, mobility state information (e.g. whether the LPPS app 620 is moving or stationary, as well as speed and direction of travel), operational parameters, measurement information (e.g., channel state and/or quality measurements of fronthaul links 103, 105, and/or 107, BW measurements, latency measurements, etc.), GPS/GNSS information of the compute node 602 (e.g., geolocation information and speed/direction of movement from positioning circuitry 545 of FIG. 5 or the like), navigation application information (e.g., planned route or journey configuration or the like), and/or other like data. In these embodiments, the compute node ID may be a raw ID, obfuscated ID, or temporary ID. As examples, the compute node ID may be an International Mobile Subscriber Identity (IMSI); Mobile Station International Subscriber Directory Number (MSISDN); a Radio Network Temporary Identifier (RNTI) including a cell-RNTI (C-RNTI), temporary C-RNTI, random access (RA)-RNTI, and/or any other RNTI(s) such as those discussed by 3GPP TS 38.300, 3GPP TS 36.300, and/or TS 36.401; a Subscriber or SAE Temporary Mobile Subscriber Identity (S-TMSI), Subscription Permanent ID (SUPI), Globally Unique Temporary UE Identity (GUTI), a Media Access Control (MAC) address, an IP address, manufacturer/device serial number(s) including component serial number(s), and/or the like.

In some embodiments, the LPPS app 620 may be a NAN 131-133 and/or the infrastructure equipment 300 of FIG. 3. In these embodiments, the data 651 collected by the LPPS app 620 and/or the data 652 provided to the data collection layer 600 may include, for example, cell ID assigned to the NAN 131-133, a network to which the LPPS app 620 belongs, compute node ID, operational parameters, measurement information (e.g., channel state and/or quality measurements of fronthaul links 103 and/or 107, channel state and/or quality measurements of backhaul links/interfaces, BW measurements, latency measurements, etc.), GPS/GNSS information (e.g., geolocation information from positioning circuitry 345 of FIG. 3 or the like), and/or other like data. In these embodiments, the data 651, 652, 653 related to the NAN 131-133 may be referred to as "NAN characteristics" or the like. In these embodiments, the compute node ID may be a raw ID, obfuscated ID, or temporary ID. As examples, the compute node ID may be a Global eNB ID, a gNB ID, a Global gNB ID, an NG-RAN ID such as any of those discussed in 3GPP TS 38.401, Access Point Name (APN), MAC address, an IP address, manufacturer/device serial number(s) including component serial number(s), and/or the like.

In either of the aforementioned embodiments, the cell ID may include, for example, a E-UTRAN Cell Global Identifier (ECGI), an NR Cell Global Identifier (NCGI), a Service Set Identifier (SSID), or the like. In either of the aforementioned embodiments, the network ID may be, for example, a domain name, a Fully Qualified Domain Name (FQDN), a Public Land Mobile Network (PLMN) ID, Service Area Identifier (SAI), Shared Network Area ID (SNA-ID), Data Network Name (DNN), Network Slice Selection Assistance Information (NSSAI), Network Access ID (NAI), an enterprise network ID, or some other suitable network identity information.

In either of the aforementioned embodiments, the operational parameters may include information regarding the device/equipment capabilities, as well as contexts and/or constraints under which the compute node 602 (or the LPPS app 620) is operating. Examples of the operational parameters may include configuration information or UE/equipment model (e.g., a hardware platform make and model, hardware component types and arrangement within the hardware platform, associated peripheral and/or attached devices/systems, processor architecture, currently running operating systems and/or applications and/or their requirements, etc.), subscription data (e.g., data plan and permissions for network access), security levels or permissions (e.g., possible authentication and/or authorization required to access the LPPS app 620, etc.); computational capacity (e.g., a total or maximum processor speed of one or more processors, a total number of VMs capable of being operated by the LPPS app 620, a memory or storage size/capacity, an average computation time per workload, a reuse degree of computational resources, etc.); current or predicted computational load and/or computational resources (e.g., processor utilization or occupied processor resources, memory or storage utilization, etc.); current or predicted unoccupied computational resources (e.g., available or unused memory and/or processor resources, available VMs, etc.); network/communication capabilities (e.g., UE capabilities as defined by 3GPP/ETSI standards, communication interfaces/circuitries of the compute node (e.g., WiFi, LTE/NR, Bluetooth/BLE, NFC, Ethernet, and/or other like chipsets), link adaptation capabilities, configured and/or maximum transmit power, achievable data rate per channel usage, antenna configurations, supported RATs, supported functionalities of each supported RAT, subscription information of the LPPS app 620, etc.); energy budget (e.g., battery power budget); and/or other like capabilities.

The operational contexts and/or constraints may also indicate any type of information about how a particular compute node is operating and/or the conditions under which the LPPS app 620 is operating. The operational contexts and/or constraints include, for example, an operational state of the LPPS app 620 (e.g., an on/off state of the LPPS app 620, whether the LPPS app 620 is in an idle mode, sleep mode, active state, etc., a currently running activity/application instance and any paused activities/application instances, etc.); a time of day and/or a date that the operational parameters, measurements, etc. are reported and/or collected; overload conditions experienced by the LPPS app 620; application parameters such as computational needs, input/output characteristics, and volume of exchanged data with an edge compute node 136, or the like; conditions of individual hardware components (e.g., temperature, load, utilization, current or predicted available power, energy consumption measurements, etc.); environmental information of an environment surrounding a LPPS app 620 (e.g., temperature, ambient light, sound/volume, altitude, humidity, moisture, information/data related to geographic objects (e.g., mountains) and/or human-created objects (e.g., buildings, highways, etc.), weather data for a given location, the geolocation or other positioning information, and/or other like environmental measurements); operating system (OS) and/or application parameters and requirements; and/or other like contextual information.

The fronthaul and/or backhaul link conditions may include network performance information related to network traffic measurements (e.g., measurements of the amount and type of traffic flowing through or across one or more network nodes), as well as various performance measurements. The performance measurements may include information/data related to BW, channel/link throughput and/or data rate, latency, jitter, error rate, a number of active UEs 111, 121 and/or user sessions, packet delay, call and/or connection drops, loss rate, data volume measurements, round trip times (RTTs) and/or round-trip delay times (RTDs), QoS parameters, etc. The fronthaul link conditions may include the aforementioned traffic and performance measurements, as well as information/data related to signal strength measurements (e.g., reference signal received power (RSRP), received signal strength indicator (RSSI), etc.), signal quality measurements (e.g., reference signal received quality (RSRQ), energy per bit to noise power spectral density ratio (a/NO), signal-to-noise ratio (SNR), signal-to-interference-plus-noise ratio (SINR), etc.), channel state information (CSI), channel or network access information (e.g., a number of radio resource control (RRC) connection/setup/reconfiguration attempts, a number of random access and/or random access channel (RACH) attempts, a number of radio link failures (RLFs), a number of handovers (HOs)/HO attempts/HO failures, etc.), and/or other like measurement data such as those discussed elsewhere herein.

Any of the aforementioned operational parameters may be measured or otherwise determined stochastically or deterministically. The stochastic operational parameters (or stochastic components of the operational parameters) may be randomly determined or measured, or may have a random probability distribution or pattern that is analyzed statistically but may not be predicted precisely. The deterministic operational parameters (or deterministic components of the operational parameters) may be measurements or information produced without randomness. In other words, the deterministic operational parameters when measured or determined are likely to produce the same outcome given a particular situation and/or context.

In embodiments, the data 652 may be stored in a database 605 as records 653 for later analysis by the different layers 225. In these embodiments, the data 652 may be loaded into the database 605 and/or some other data store (not shown) and stored as database objects (DBOs), key-value pairs, and/or some other suitable data structure. In some embodiments, the data 652 may be provided directly to the LPP engine 202 for direct usage. As discussed in more detail infra, the data 652/653 may be used for other prediction layers 225.

In some embodiments, the pre-processing engine 623 phrases the data 651 into a supervised learning problem, while in other embodiments, the data collection layer 600 phrases the data 652/653 into a supervised learning problem. In other embodiments, other prediction layers that use the data 652/653 may phrase the data 652/653 individual for their respective ML models.

Figure 7:
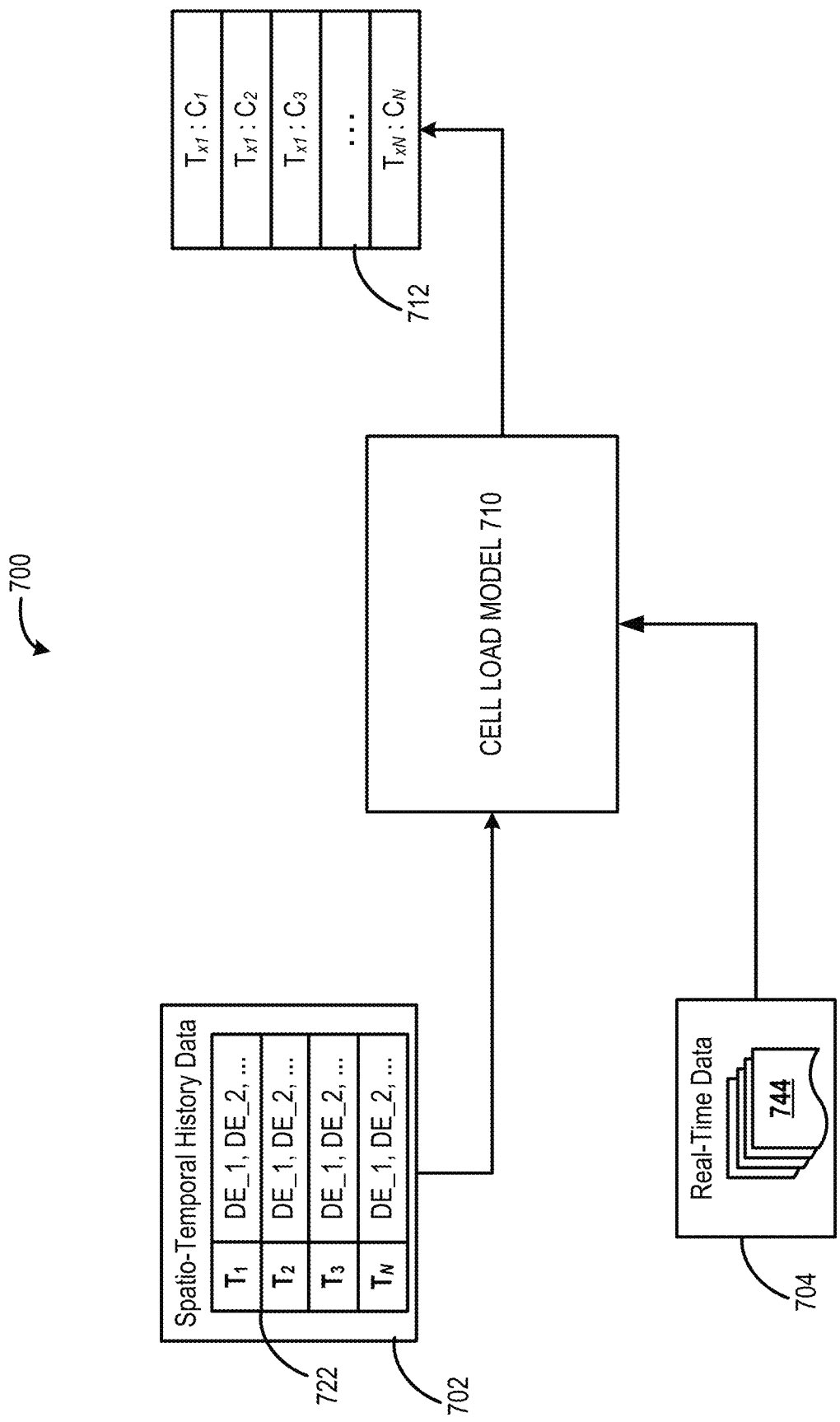
FIG. 7 illustrates an example cell load prediction layer according to various embodiments.

FIG. 7 illustrates an example cell load prediction layer 700 according to various embodiments. The cell load prediction layer 700 (also referred to as a "cell model layer" or the like) corresponds to one of the prediction layers 225-1 to 225-N of FIG. 2. The cell load prediction layer 700 uses data that is specific to individual cells in order to produce performance metrics related the individual cells for current behaviors or to produce performance metrics related the individual cells for future predicted behaviors. In other words, the cell load layer 700 determines, for each cell or NAN 131-133, predicted performance metrics (e.g., a predicted BW, and/or the like) given certain signaling/radio properties, position, operational parameters, time of day, and/or other like information about the compute node 602 that was by the data collection layer 600.

In embodiments, the cell load prediction layer 700 can obtain and/or store cell characteristics, which is data or information about a particular cell and/or NAN 131-133 that provides that cell, such as the type of RAT(s) supported in or by the NAN 131-133 providing the cell, frequency band or spectrum supported in the cell, BW(s) and/or BW parts (BWPs) of the frequency band, a number of carrier frequencies in the frequency band, transmission range or size/shape of the cell, maximum and/or average transmit power of the NAN 131-133 providing the cell, geographic coordinates of the cell (or within the cell), and/or other like cell parameters or characteristics. For example, a first cell or NAN 131-133 providing an LTE cell may have different characteristics (e.g., maximum channel BW, total cell BW, etc.) than a second cell or NAN 131-133 providing a 5G/NR cell. In another example, cell or NAN 131-133 located in an industrial area or an urban environment may experience more noise or interference than a cell or NAN 131-133 located in a rural area. In another example, cell or NAN 131-133 located in an industrial area or an urban environment may have a smaller cell size/shape and/or maximum transmit power than a cell or NAN 131-133 located in a rural area. The various characteristics of a cell or NAN 131-133 may cause the cell or NAN 131-133 to exhibit different behaviors at different time instances under different operational parameters or constraints.

Additionally, the cell load prediction layer 700 includes one or both of two prediction sub-layers, namely spatial-temporal history layer 702 and a real-time load layer 704.

The spatial-temporal-history layer 702 analyses spatial-temporal-history data 722 of the various link performance prediction options (e.g., predicted BW, predicted latency, etc.) for different scenarios such as different destinations, cell loads, signal quality, time of day, day of the week, date, special events, and/or the like. The spatial-temporal-history data 722 may include data/measurements 652, 653 collected from the compute node 602 and/or the data collection layer 600 of FIG. 6 at previous time instances (e.g., in the past), predicted performance metrics computed for the compute node 602 at previous time instances, and/or link performance predictions computed for the compute node 602 at previous time instances.

The spatial-temporal-history data 722 may be stored in a database and represented as timed data structure. In the example of FIG. 7, the spatial-temporal-history data 722 includes records or database objects for respective time instances including a first time instance ($T_1$), a second time instance ($T_2$), a third time instance ($T_3$), up to an Nth time instance ($T_N$) where N is a number. Each of these records or database objects includes one or more data elements (DEs) such as a first DE (DE_1), a second DE (DE_2), and so forth. As an example, a value of DE_1 in each record or database object may be a BW measurement taken at each of time instances $T_1$-$T_N$, a value of DE_2 in each record or database object may be a cell load measurement taken at each of time instances $T_1$-$T_N$.

The real-time load layer 704 processes incoming real-time data 744 from a network operator (or CN 142, cloud 144, or the like) about the cell's load. The real-time data 744 may indicate the cell's current or most up-to-date load parameters, but could also include historic data pertaining to the cell's loads, which can then in turn be communicated over to the spatial-temporal history layer 702. In one implementation, the real-time data 744 may be a suitable message including an information element (IE), field, or other like data structure, which contains a value. The value could be an enumerated value (e.g., one of "Low Load", "Medium Load", "High Load", "Overload") or one of a range of values indicated an amount of occupied or utilized network resources (e.g., an integer from 1 to M, where M is a number such as a maximum number of PRBs or a maximum number of BWs or BWPs).

As shown by FIG. 7, the spatial-temporal-history data 722 and the real-time data 744 (or subsets thereof) are supplied to the cell load model 710, which is a machine learning (ML) model used to predict one or more cell characteristics, such as an expected cell performance at a given location and time instance. In embodiments, individual cell load models 710 may be generated for respective cells or NANs 131-133. In some embodiments, the cell load model 710 is generated from one or more ML algorithms using a sample of the spatial-temporal-history data 722 and the real-time data 744 during a training phase. In such embodiments, the cell load model 710 makes predictions on new or different versions or datasets of the spatial-temporal-history data 722 and the real-time data 744. In various embodiments, the cell load model 710 may be further refined or updated based on new/updated datasets.

In some embodiments, the cell load model 710 may be a Recurrent Neural Network (RNN) with a Long Short Term Memory (LSTM). RNNs are a type of neural network having connections between nodes form a directed graph along a temporal sequence, which allows temporal patterns to be identified in time-series data. RNNs can use their internal state (e.g., stored in memory) to process sequences of inputs, and keep track of arbitrary long-term dependencies in the input sequences. In such embodiments, the cell load model 710 comprises one or more cells (e.g., memory cells) to store values over arbitrary time intervals, an input gate to control a flow of new values into the cell(s), a forget gate to control whether values in the cell(s) remain in the cell(s), and an output gate to control whether the values in the cell(s) is/are used to compute an output activation of the cell load model 710. Weights assigned to the connections between the gates may be determined during the training phase, and these weights may determine how the gates operate.

In some embodiments, the cell load model 710 (or the data collection layer 600 or the pre-processing engine 623 of FIG. 6) phrases the spatial-temporal-history data 722 and the real-time data 744 (or the data 651, 652, 653 of FIG. 6) into a supervised learning problem, wherein the data is arranged into a set of input and output pairs. During the training phase, the cell load model 710 is provided with the set of input and output pairs and learns an association between the pairs. Additionally, the training targets for individual cell load models 710 may be different from one another since each cell load model 710 may have to learn different behaviors depending on the cell characteristics of its corresponding cell or NAN 131-133.

The cell characteristic predictions output by the cell load model 710 may include any of the aforementioned cell characteristic types (e.g., predicted BW. Predicted cell load, etc.). The predicted cell characteristics are output by the cell load model 710 as a time series data structure 712. In the example of FIG. 7, the time series data structure 712 includes a cell characteristic prediction (C) for each future time instance ($T_{xi}$). For example, as shown by FIG. 7, the time series data structure 712 includes a first cell characteristic prediction ($C_1$) for a first future time instance ($T_{x1}$), a second cell characteristic prediction ($C_2$) for a second future time instance ($T_{x2}$) up to an Nth cell characteristic prediction ($C_N$) for a second future time instance ($T_x$) where N is a number. Once generated, the time series data structure 712 is provided to the LPP layer 202 for data fusion.

Figure 8:
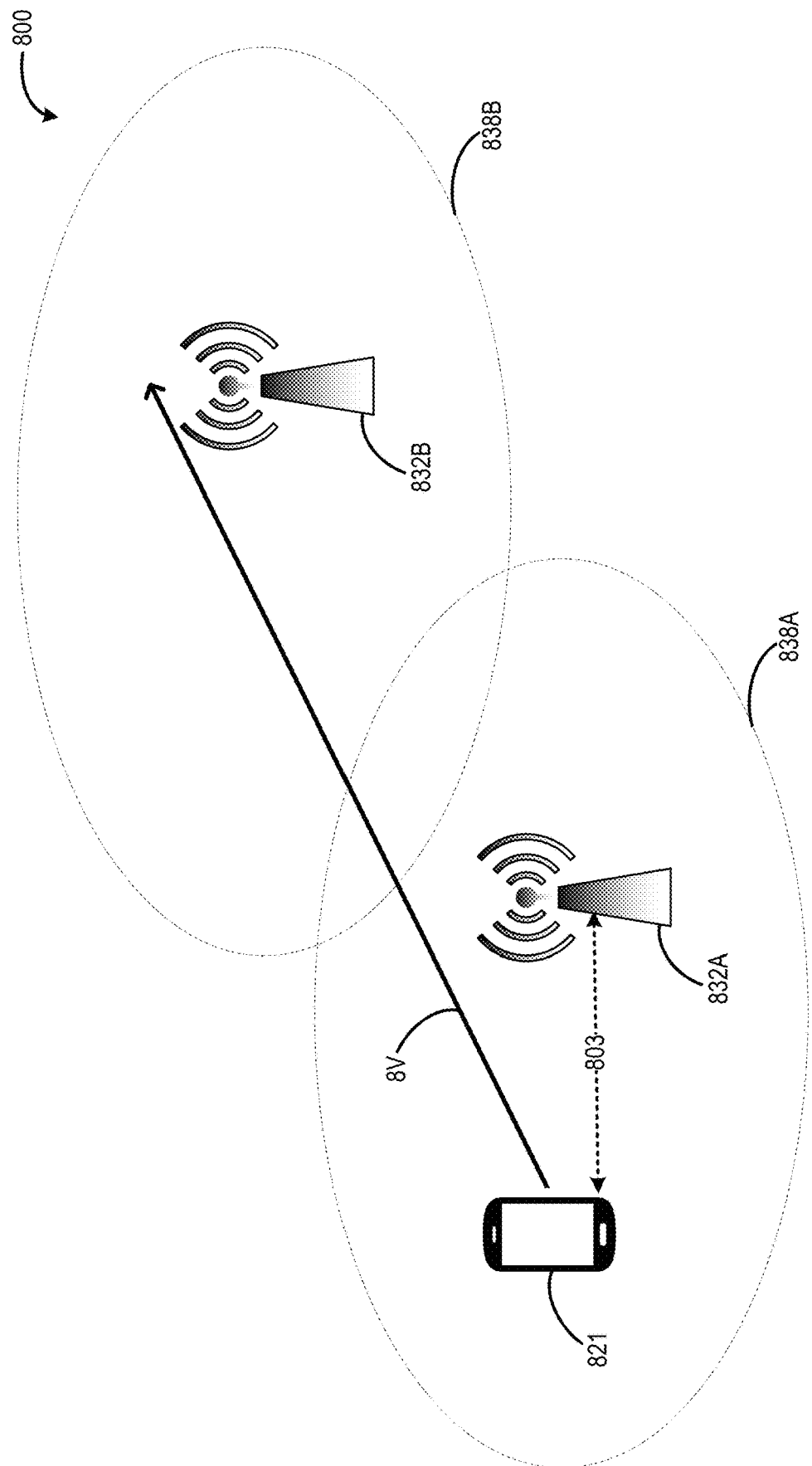
FIG. 8 illustrates an example scenario involving intra-cell characteristic predictions according to various embodiments.

FIG. 8 shows a scenario 800 involving intra-cell characteristic predictions according to various embodiments. In scenario 800, the UE 821 may be the same or similar to the UEs 121, 122 of FIG. 1 and/or the compute node 602 of FIG. 6; the link 803 may be the same or similar as the link 103 of FIG. 1; and the NANs 832A and 832B may be the same or similar as the NANS 131-132 of FIG. 1.

In scenario 800, the NANs 832A and 832B are configured to provide communication services in respective cells 838A and 838B. Additionally, the UE 821 is traveling through cell 838A and will eventually be handed over from NAN 832A to NAN 832B when the UE 821 approaches an edge of the cell 838A and/or enters cell 838B. The travel direction of the UE 821 is represented by the vector line 8V.

In embodiments, one of the prediction layers 225 includes an intra-cell layer, which may have a same or similar structure/implementation as the cell load prediction layer 700 of FIG. 7, and/or may operate in a same or similar manner as the cell load prediction layer 700 of FIG. 7. In embodiments, an intra-cell layer may be generated for each cell 838 or NAN 832. The cell load prediction layer 700 is used to predict BW and cell load at a given time instance, whereas the intra-cell layer 225 is used to predict signal quality and/or signal strength taking into account UE 821 mobility as well as one or more other parameters. As mentioned previously with respect to FIGS. 6-7, the data collection layer 600 collects and stores spatio-temporal history data, which may be done on a continuous or periodic basis, and updated or new temporal spatio-temporal history data is used to train and further refine the cell load model 710 to provide better and/or more accurate predicted performance metrics. Similarly, the intra-cell layer 225 utilizes the spatio-temporal history data and/or real-time load data to identify or determine how signal properties change over time and space.

In these embodiments, the intra-cell layer 225 analyses a change in signal quality (e.g., using RSRQ, SNR, SINR, and/or the like) and/or signal strength (e.g., using RSSI, RSRP, and/or the like) using known or predicted movement patterns, and predicts how these signal parameters will change for a given UE 821 at a given time instance and/or at a particular position or geolocation within a cell 838A-B. For instance, and with reference to FIG. 8, when the UE 821 travels through cell 838A, the signal strength and/or quality of link 803 may increase and/or improve as the UE 821 moves closer to NAN 832A, and the signal strength and/or quality of link 803 may decrease and/or degrade as the UE 821 moves away from NAN 832A and approaches cell 838B. Additionally, when the UE 821 is handed over to cell 838B from cell 838A, the signal strength or quality is weak or degraded but then increases or improves as the UE 821 moves toward the NAN 832B and/or closer to the center of cell 838B. As the UE 821 moves closer to the edge of cell 838B, the signal strength/quality will decrease, and finally the UE 821 will be handed over to another cell (not shown by FIG. 8). In a different scenario with a small-angle directional antenna the signal will start to weakened/decrease and may increase/improve until a peak at which point the UE 821 is handed over to another cell. Additionally or alternatively, signal strength/quality may degrade as the UE 821 approaches physical objects in a cell 838, such as man-made or natural objects that may obstruct or otherwise block a line-of-sight (LoS) between the UE 821 and the NAN 832.

Similar to the cell load layer 700, intra-cell layer 225 may include a spatial-temporal history sublayer and/or a real-time load sublayer, which collect and record, in suitable data structures, signal strength/quality measurements with respect to time/date and position/geolocation in a same or similar manner as described previously with respect to spatial-temporal history layer 702 and real-time load layer 704 of FIG. 7. In scenario 800, these sublayers may track the signal strength/quality increase and decreases as the UE 821 travels from cell 838A to cell 838B. Additionally, the intra-cell layer may output predicted intra-cell performance metrics in a time series data structure similar to the time series data structure 712 of FIG. 7. The predicted intra-cell performance metrics output by the intra-cell layer may include, for example, a predicted signal strength or signal quality at a given position within a cell 838 at a particular time instance.

In some embodiments, the intra-cell layer 225 may not use exact physical locations (or geolocations) of the UE 821, and instead may use predicted or known movement patterns for predicting the signal strength/quality. For example, the movement direction 8V may be a known direction when the NANs 832A-B are deployed along a road, a railway, or currently observed velocity changes (delta) versus typically observed speeds/velocities which may be cause by, for example, traffic running slower than normal due to an automobile accident. Additionally, the travel speed may also be predicted based on, for example, a speed limit of the road or known train traveling speeds. These aspects are discussed in more detail with respect to FIGS. 9 and 10.

Figure 9:
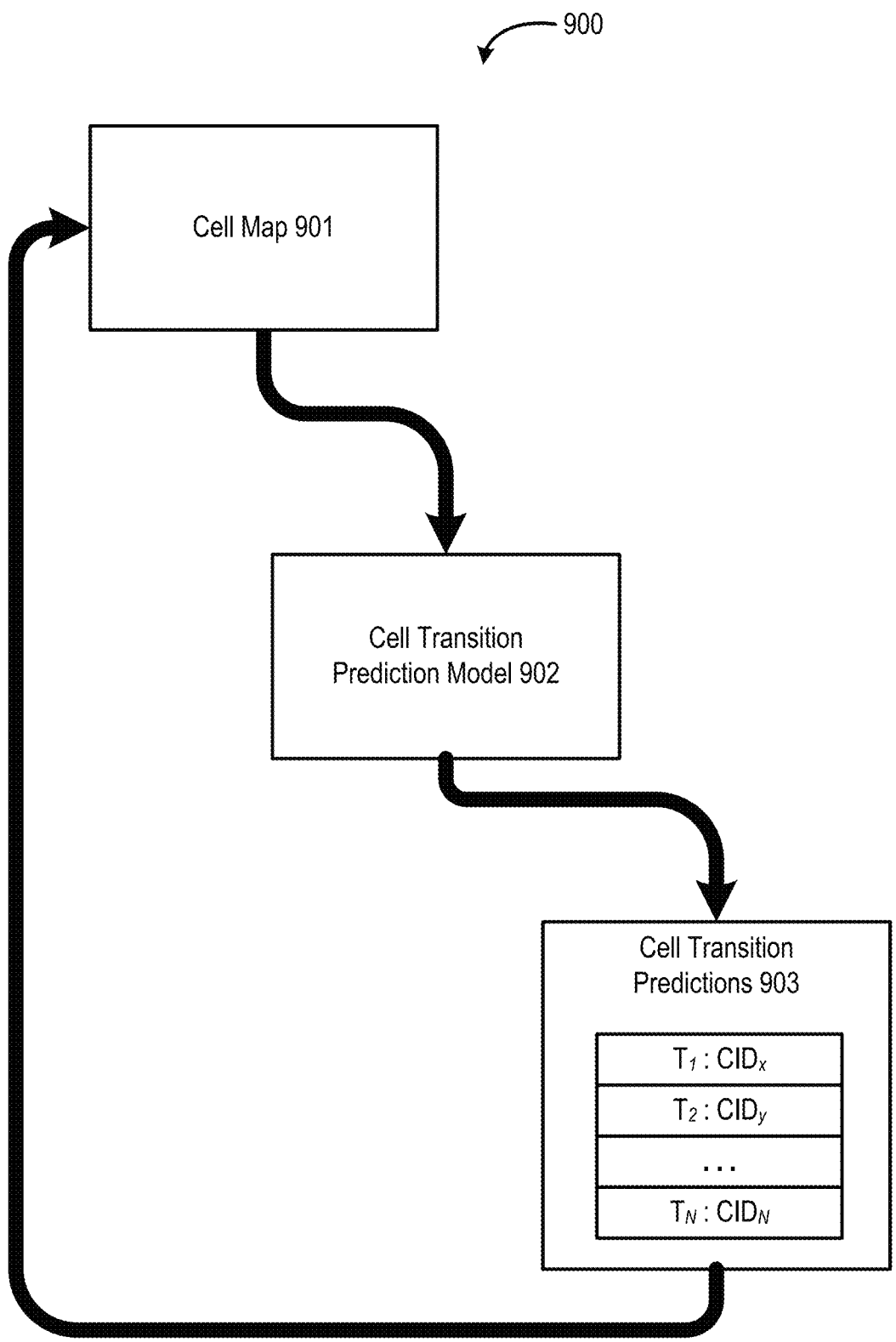
FIG. 9 illustrates an example cell transition prediction layer according to various embodiments.

FIG. 9 depicts an example cell transition prediction layer 900 according to various embodiments. The cell transition layer 900 is used to predict how a UE transitions between cells based on cell map 901, the spatio-temporal history data discussed previously, and real-time data discussed previously. The cell map 901 is a logical and/or mathematical representation of a group of cells or NANs 131-133 in a given region or deployment area, and may include for example, a graph data structure such as a tree or arborescence graph. In some embodiments, the cell map 901 can be pre-configured or otherwise supplied by a network operator that owns, operates, and/or has deployed the cells or NANs 131-133. In some embodiments, a graph drawing algorithm may be used to generate the graph data structure 901 based on positioning information (e.g., geolocation coordinates) of one or more NANs 131-133 and/or other like data.

Initially, the cell map 901 may include or represent the topology of various cells (or NANs 131-133) and a subset of spatio-temporal history data indicating UE travel directions and speeds. Additionally, the cell transition predictions 903 may also be based on other parameters besides travel speed and direction. For example, UEs 111, 121 could be handed over to cells/NANs 131-133 experiencing better radio conditions than other cells/NANs 131-133, or cells/NANs 131-133 having less load characteristics than other cells/NANs 131-133. In some embodiments, this subset of the spatio-temporal history data may include cell handover history for the cells represented in the cell map 901. In such embodiments, the cell map 901 may be a graph data structure that includes nodes representing each cell and edges between the nodes representing a number of handovers between the nodes representing those cells. Alternatively, the edges between the nodes may represent a probability of handover between the nodes representing those cells, which may be based on the number of handovers taking place between the cells, a time that the handovers took place, and/or other like spatio-temporal history data. In either of these embodiments, the edges may also represent a direction of travel from one node (cell) to another node (cell). After this initial cell map 901 is processed by the cell transition prediction layer 900, the cell map 901 may include or represent cell transition predictions. In such embodiments, the cell map 901 may be a graph data structure that includes nodes representing each cell and edges between the nodes representing a direction, time, and probability of transition.

Next, the cell map 901 is fed into a cell transition prediction model 902, which uses one or more ML techniques to learn the cell transitions and/or UE traveling behaviors using the collected spatio-temporal history data discussed previously with respect to FIGS. 6-8. In various embodiments, the cell transition prediction model 902 is trained using a sequence prediction algorithm, and is stored in or as a suitable data structure. Sequence prediction is an ML and/or deep learning problem that is used to predict the likelihood that an event of a sequence will occur by only observing the previous events of that sequence. In embodiments, after training, real time cell transitions prediction takes place by supplying the cell prediction model 902 with relatively recent spatial-temporal history data (e.g., current cell, a previous cell, UE mobility information (e.g., travel direction and speed), current operational parameters of one or more UEs, and/or the like).

In some cases, UEs may travel along a fairly deterministic path, such as when the cells/NANs 131-133 in the cell map 901 are deployed along a set of train tracks, in or around a subway, a road or highway, or the like, at least when compared to scenarios where users are randomly traveling around a city or the like. However, even within a relatively crowded city there are typically, cells/NANs 131-133 are not usually deployed in a manner that would allow UEs to attach to a random cell/NAN 131-133. Instead, there are usually a limited number of cells/NANs 131-133 near a given cell/NAN 131-133 to which a UE can attach. In some more rare cases, a UE could be attached to a first cell/NAN 131-133 and then attach to a second cell/NAN 131-133 that is not neighbor of the first cell/NAN 131-133 such as, for example, when a user travels in an elevator, travels from one subway station to another subway station, or when a UE is turned off and turned back on at a later time in another location. Even in these rarer cases, UEs usually travel in a somewhat deterministic manner, such that there may not be very many options for a UE to transition to a non-neighboring cell/NAN 131-133. For example, after entering a first subway station, there will likely be a relatively small number of potential cells/NANs 131-133 that a UE could transition to after traveling on the subway, assuming that there are only a small number of cells/NANs 131-133 at each subway station in the subway system. In any of the aforementioned scenarios, there are relatively few cells/NANs 131-133 that a UE can transition to given a current cell/NAN 131-133. And, the cell transition prediction layer 900 lists the different options for cell transition and the probability for those options.

In one embodiment, the sequence prediction algorithm is a Compact Prediction Tree (CPT) algorithm. A CPT comprises three data structures: a prediction tree (PT), an inverted Index (II), and a lookup table (LT). The PT is recursively defined node containing an item, a list of children nodes, and a pointer to its parent node. A sequence is represented within a tree data structure as a full branch or a partial branch starting from a direct child of the root node. The prediction tree is constructed by checking if a current node has a direct child matching the first item of the sequence. If it does not, a new child is inserted to the root node with a value of the first item. Then a newly created child node becomes the current node, and the process is repeated for the next item in the training sequence. The II quickly finds in which sequences a given item appears. The II is a hash table containing a key for each unique item encountered during the training, where each key leads to a bitset that indicates IDs of the sequences where the item appears. A bitset contains n bits, where n is the number of training sequences. The presence of an item in the s-th sequence is indicated by setting the s-th bit to 1 in its bitset, and 0 otherwise. The LT contains sequence IDs, each of which points to the last node of the sequence in the PT. The LT is updated after each sequence insertion in the PT. Training is done using a training dataset including a set of sequences (e.g., the initial cell map 901 discussed previously, or a cell map 901 included previously predicted cell transitions), and sequences are inserted one at a time in the PT and the II. Prediction for a given sequence S (e.g., cell transitions of the cell map 901) by performing the intersection of the bitsets of the last x items from the sequence S, where x is a number. The resulting bitset indicates a set of sequences Y that is/are similar to sequence S. For each similar sequence Y, each item of a consequent with respect to the sequence S is stored in a count table (CT). The consequent of a sequence Y with respect to a sequence S is the subsequence of sequence Y starting after the last item in common with sequence S until the end of sequence Y. The CT stores candidate items in association with a corresponding score. For example, the CT is a hash table where the candidate items are keys and the scores the associated values. The score for a candidate item represents the likelihood that the candidate item is the next item in the similar sequence Y. The item with the highest score within the CT is the predicted item.

In another embodiment, the sequence prediction algorithm is a random decision forest (also referred to as "random forest" or "random forest regression") algorithm. In this embodiment, the cell transition prediction model 902 constructs a tree data structure by splitting a source dataset into subsets that constitute successor child nodes. The splitting is based on select a random subset of features for each candidate split in the decision tree. Splitting is repeated on each derived subset in a recursive manner. Then bootstrap aggregation is performed by building multiple decision trees (e.g., an "ensemble") by repeatedly resampling the training dataset with replacement. Then the cell transition prediction model 902 predicts the cell transitions by aggregating the predictions of the ensemble. The aggregation may be performed by averaging the predictions from all the individual trees or by taking a majority vote.

In another embodiment, the sequence prediction algorithm is a Graph Traversal (or graph search) algorithm such as Breadth First Search (BFS), Depth First Search (DFS) algorithms, or the like. In BFS, the cell transition prediction model 902 may start from a selected node in the cell map 901, such as a current cell in which a UE is camping, and explores all neighboring nodes at a present depth prior to moving on to the nodes at the next depth level. In DFS, the cell transition prediction model 902 may start from a selected node, such as a current cell in which a UE is camping, and traverses each edge in the cell map 901 by exploring as far as possible along each branch from the starting node before backtracking. In either of these embodiments, the cell transition prediction model 902 may traverse the cell map 901 in order of handover or transition probability.

During the prediction phase, the cell transition prediction model 902 outputs cell transition predictions 903, which includes a listing or other indication of the next cells the UE may transition to a different time instances. In the example of FIG. 9, the cell transition predictions 903 include a cell ID (CID) (e.g., $CID_1$ to $CID_N$) for each future time instance (e.g., $T_1$ o $T_N$). In some embodiments, the cell transition prediction 903 may be fed back into the cell map 901, which may then be fed into the cell transition prediction layer 902 for updated or refined cell transition predictions 903.

Figure 10:
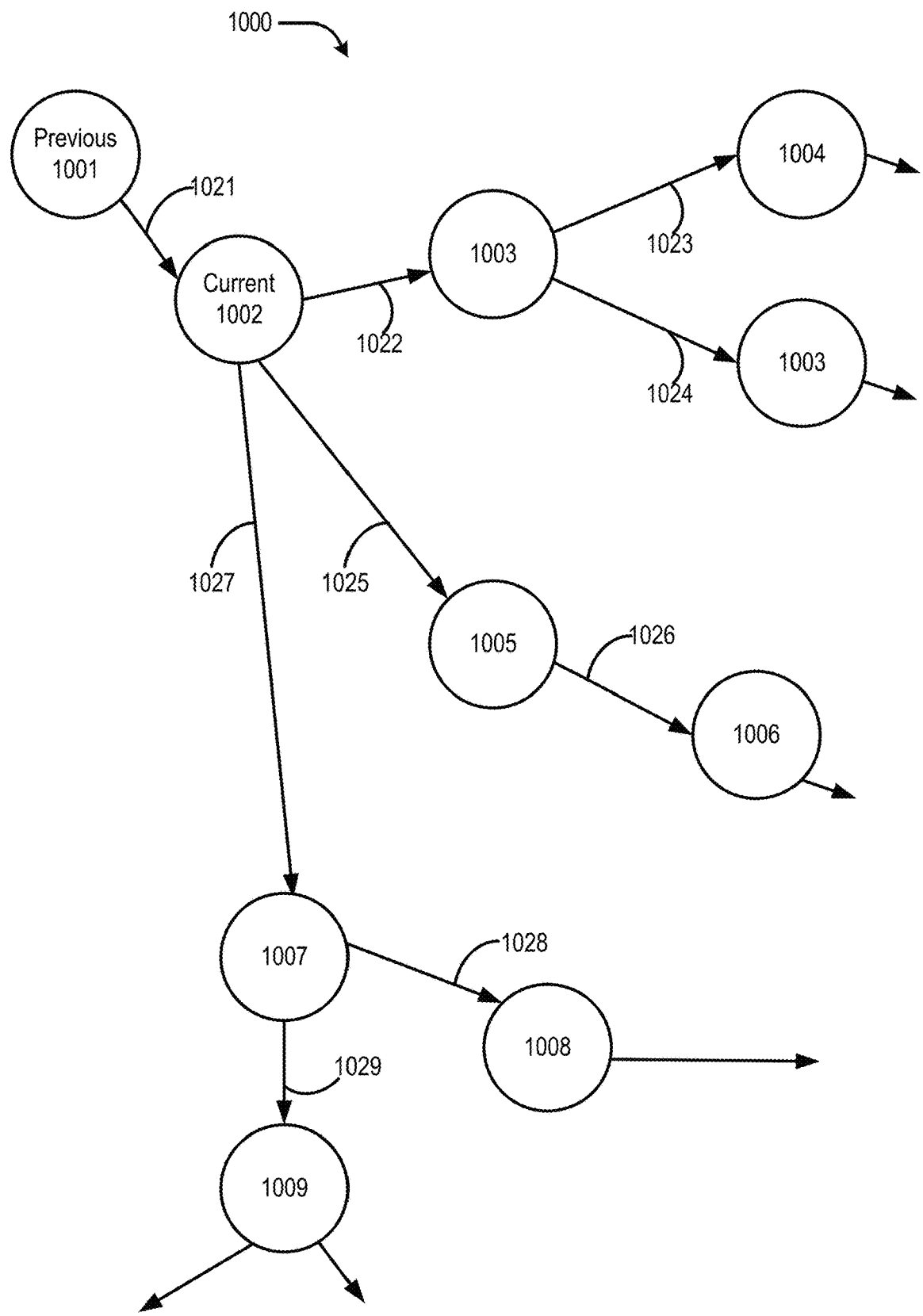
FIG. 10 illustrates an example cell transition graph according to an example embodiment.

Referring now to FIG. 10, which illustrates an example cell transition graph 1000 according to an example embodiment. The cell transition graph 1000 is a graph data structure mathematically representing cells in a cell map to which a UE (e.g., the UEs 111, 121 of FIG. 1, the compute node 602 of FIG. 6, and/or the UE 821 of FIG. 8) has or may travel. As an example, the cell transition graph 1000 may be output by the cell transition prediction layer 902 of FIG. 9 as cell transition predictions 903 (see e.g., FIG. 9), and/or may be fed into the cell transition prediction layer 902 as or with a cell map 901 for further refinement of the cell transition predictions 903.

A "graph" in this context refers to a data structure or data type that comprises a number of (or set of) nodes (also referred to as "vertices," "points," or "objects"), which are connected by a number of (or set of) edges, arcs, or lines. In the example of FIG. 2, the cell transition graph 1000 includes 10 nodes including a previous cell 1001, a current cell 1002, and multiple potential cells 1003 to 1009 (collectively referred to as "potential cells 1003-1009" or the like). Additionally, the previous cell 1001 is connected to the current cell 1002 by edge 1021; the current cell 1002 is connected to potential cell 1003 by edge 1022; the potential cell 1003 is connected to potential cell 1004 by edge 1023; the potential cell 1003 is connected to potential cell 1003 by edge 1024; the current cell 1002 is connected to potential cell 1005 by edge 1025; the potential cell 1005 is connected to potential cell 1006 by edge 1026; the current cell 1002 is connected to potential cell 1007 by edge 1027; the potential cell 1007 is connected to potential cell 1008 by edge 1028; and the potential cell 1008 is connected to potential cell 1009 by edge 1029. Additionally, in some embodiments, the cells 1001-1009 include numbers that may represent an identifier of the cell or NAN 131-133 such as a global base station ID (e.g., global gNB ID, global eNB ID, global ng-eNB ID, global en-gNB ID, WiFi AP (globally unique) MAC address, etc.), a Cell Global Identifier (CGI) (e.g., NR CGI, E-UTRAN CGI (ECGI), WiFi AP SSID, etc.), or some other identifier.

A graph may be an undirected graph having edges having no orientation and/or pairs of nodes are unordered, or a directed graph having edges with an orientation or pairs of vertices that are ordered. An edge has two or more vertices to which it is attached, called endpoints. Edges may also be directed or undirected; undirected edges are referred to as "lines" and directed edges are referred to as "arcs" or "arrows." The two or more vertices forming an edge may be referred to as the "endpoints" of that edge, and the edge is said to be incident to the vertices. The cell transition graph 1000 of FIG. 9 is a directed graph with directed edges 1021-1029. The edges 1021-1029 (or "arrows 1021-1029") represent a direction of travel from one cell to another cell, a time, and probability of a transition from one cell to another.

The probabilities of the edges 1021-1029 represent a probability or likelihood that the UE will transition to that cell 1005 based on the current cell 1002 in which the UE is camping. The probabilities may be based on various criteria such as an expected time in a cell, current relative speed for cell transitions, other UE change patterns, and/or other like information. Depending on available spatio-temporal history data, real-time data, and/or usage scenario, the cell transition layer can take the following parameters into consideration: generic client transition pattern, client specific motion pattern based on client specific identified provided by UE feedback, patterns dependent on time of day (e.g., to office in the morning, home in the afternoon), day of week (e.g. home earlier on Friday), patterns mapping to supported 3GPP radio standard (e.g. a client moved between LTE cells if currently in an LTE cell), abnormal patterns (e.g. all other clients take a detour around a roadwork on interstate), as well as relative transition time (e.g. road traffic moves slower than normal, determined by clients earlier transition times, other clients current transition time or Geographic positioning feedback, so time in cell is longer than normal).

A cell transition prediction layer (e.g., cell transition prediction layer 900 of FIG. 9) handles the respective cells logical relationship and how the UE transitions between cells. The cell transition prediction layer (e.g., cell transition prediction layer 900 of FIG. 9) uses the UE's current position (e.g., current cell 1002 in FIG. 10) as well as the spatio-temporal history data to produce a prediction of the potential cells 1003-1009 that may be visited, or a probability that the UE will transition to a given potential cell 1003-1009 at a particular future time instance, given the current cell 1002, a travel direction of the UE, the velocity of the UE, and/or other like information.

In addition to the cell transition prediction layer 900 of FIG. 9 and discussed with respect to FIG. 10, the prediction layers 225 may also include a geographic position prediction layer (not shown by FIG. 9 or 10). The geographic position prediction layer considers the physical positions/locations of the cells/NANs 131-133 as well as UE position/location information. In various embodiments, the geographic position prediction layer maps or correlates radio signal properties or predictions determined by the cell load prediction layer 700 of FIG. 7 to a physical positions/locations of UEs 111, 121, which may be collected by the data collection layer 600 of FIG. 6. The geographic position prediction layer can also use real-time signal measurements collected by the data collection layer 600 of FIG. 6, as well as traffic conditions determined by any of the prediction layers discussed herein.

The geographic position prediction layer may use various UE mobility information to determine a UE's geoposition, such as sensor data indicating a speed and direction of travel of a UE, GNSS data, mapping application or navigation application route data, turn-by-turn navigation data, signal based position calculations (e.g., based on signal strength measurements, triangulation, etc.), LTE location based services, and/or the like. In embodiments, the geographic position prediction layer generates a geoposition ML model for respective cells/NANs 131-133 using the UE mobility information (or a subset of the UE mobility information). The geoposition ML model may be generated using any of the ML algorithms discussed herein or some other suitable ML algorithm. As mentioned previously, the geoposition ML model correlates the predicted signal quality for each UE with one or more measurements taken at the given geolocation at the one or more time instances. The geoposition ML model is then used to determine predicted signal quality for a given UE at a given geolocation at one or more time instances, which may be output as a suitable data structure similar to those discussed herein.

In addition to the cell transition prediction layer 900 of FIG. 9 and discussed with respect to FIG. 10, the prediction layers 225 may also include a network topology prediction layer (NTPL), which predicts performance of an overall route between a source node (e.g., a UE 111, 121, an edge compute node 136, or server 150 sending data) and a destination node (e.g., a UE 111, 121, an edge compute node 136, or server 150 receiving data). The NTPL considers parts of link performance other than parameters associated with the wireless connection itself. These other parts of link performance include, for example, intra-network and inter-network link (intra/inter-network link) performance as well as service provider load and location. The intra/inter-network link performance may be based on, for example, RAN backhaul connections, datacenter connections and topology, connections and topology of NFs in the CN 142, connections to different service provider platforms, and/or the like. The NTPL analyzes the routes that traffic from a link 103, 105, 107 will take to an intended destination, such as edge compute nodes 136, CN 142, cloud 144, and/or server(s) 150 of FIG. 1, including the individual hops or intermediary devices between the source and destination nodes. In some embodiments, the NTPL generates a network topology ML model (NTMM) using a network topology map and/or a subset of network element characteristics. The NTMM may be generated using any of the ML algorithms discussed herein and/or some other suitable ML algorithm. In one example, the ML algorithms/models used to generate the NTMM may be the same as those used for the cell transition prediction layer 900 of FIG. 9. After training, the NTMM is used to predict link quality for one or more backhaul links and/or for a given link 103, 105, 107 based on the backhaul links in a route between the source and destination nodes.

For the intra/inter-network link performance prediction, the NTMM associates the connection topology (or network topology) with capacity and load levels of individual intra/inter-network links. The NTMM may be trained on measured link performance to different service provider platforms (or individual servers 150) locations in a network, or service provider platforms (or individual servers 150) positions with respect to a position/location of each cell or NAN 131-133. In these embodiments, individual services provided by the service provider platforms (or individual servers 150) are then mapped to a closest matching service provider platforms (or individual server 150) position/location. In embodiments, the NTMM uses correlation and pattern matching techniques to relate how different cells or NANs 131-133 view the service provider platform (or individual server 150) positions/locations to speed up the learning and/or training process(es).

In some embodiments, the positions/locations of the service provider platforms, individual servers 150, and/or network elements may be based on a network topology map. The network topology map may be the same or similar to the cell map 901 of FIG. 9, but describes or represents the topology of a network operator's network where nodes represent various network elements and edges represent connections between the network elements. In some embodiments, the NTMM can be preconfigured with a network operator's backend topology information in a same or similar manner as discussed previously with respect to FIGS. 9-10. Additionally or alternatively, various ML techniques may be used to learn the relative positions/locations of different endpoints/destination nodes, and how routes between different source and destination nodes change over time.

The network element characteristics used for the intra/inter-network link performance prediction may include information such as load levels of individual network elements or servers 150 at different times and/or load levels for different intra/inter-network links between network elements in a network. In some embodiments, the load on intra/inter-network links can be estimated based on capacity and load on cells. In some embodiments, load on intra/inter-network links can be measured by interfacing with network infrastructure in the network topology (e.g., switches, routers, server farm servers, edge compute nodes 136, network elements in the CN 142, etc.).

For the air-interface portion of the route performance prediction, the NTMM may obtain input data for each cell or NAN 131-133. This input data include, for example, a cell ID, cell load, noise and/or interference measurements (e.g., SNR or the like), signal strength, service provider server location, service provider server load, among other measurements or parameters. This information may be provided by the data collection layer 600 of FIG. 6 and/or directly from the NANs 131-133 and/or UEs 111, 121. As alluded to previously, the amount of data that can be transmitted in a PRB affects the realized and/or perceived performance of a wireless network or a given link 103, 105, 107, and the number of PRB slots is a function of cell load and the cell ID. Additionally, the slot bandwidth per-PRB is a function of noise measurements (and/or signal strength measurements) and the cell ID. The noise measurements and/or signal strength measurements are weakly dependent on each other, but this dependency is dependent on cell behavior. In embodiments, the total air interface performance is a function of these two functions (e.g., the number of PRB slots being a function of cell load and cell ID, and the slot bandwidth per-PRB being a function of noise measurements (and/or signal strength measurements) and cell ID) as well as a service provider server location and load. In such embodiments, the NTMM can include these functions, which may be trained using a suitable ML algorithm, such as a regression analysis.

Figure 11:
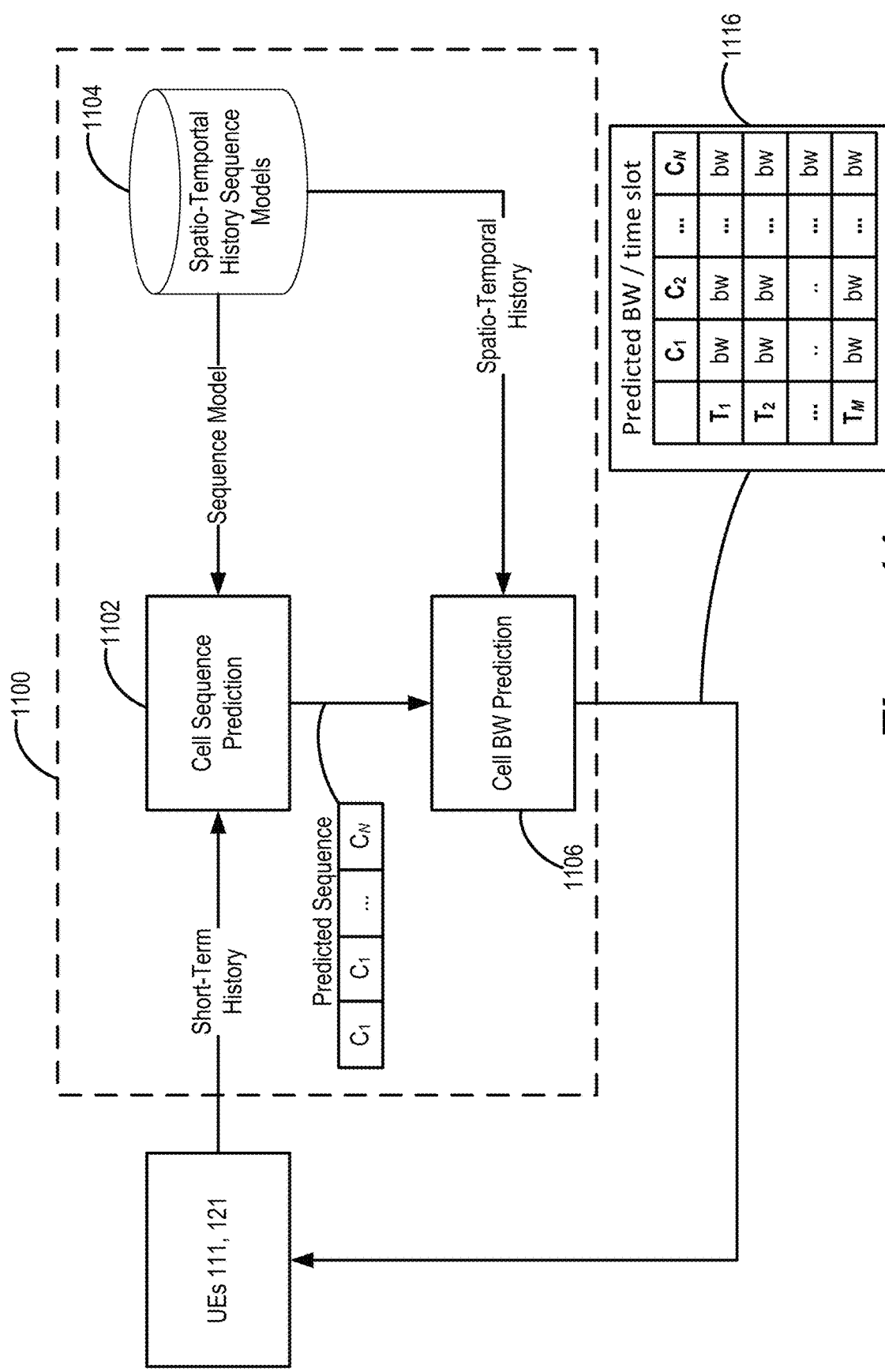
FIG. 11 illustrates an example data fusion engine for predicting bandwidths according to an example embodiment.

FIG. 11 illustrates an example data fusion engine 1100 that performs cell transition and cell load data fusion for BW prediction according to various embodiments. FIG. 11 depicts an example of bandwidth prediction using cell sequence and cell load ML models performed by the data fusion engine 1100. The data fusion engine 1100 may correspond to the LPP layer 202 of FIG. 2.

In this example, UEs 111, 121 send short-term history data to a cell sequence prediction model 1102 within the data fusion engine 1100. The short-term history data may include any of the measurements and/or operational parameters discussed herein that were collected or measured by the UEs 111, 121 during a predetermined time period, which may be expressed as a number of days, hours, minutes, seconds, or the like. The cell sequence prediction model 1102 also obtains one or more sequence models from the spatio-temporal history sequence models database 1104. The cell sequence models (and/or the spatio-temporal history sequence models database 1104) are stored by a suitable database system and are continuously updated based on the cell change history of multiple UEs 111, 121. The cell sequence prediction model 1102 uses the short-term history data and the one or more sequence models to predict a cell change (or transition) sequence at different time intervals (e.g., predicted cell sequence including cells $C_1, C_2, \ldots C_N$ in FIG. 11 where N is a number).

The predicted cell change sequence is fed to the cell BW prediction model 1106. Additionally, the spatio-temporal history data is fed to the cell BW prediction model 1106. The cell BW prediction model 1106 uses the predicted cell change sequence and the spatio-temporal history data to predict a BW and other parameters at different time instances or time intervals. As shown by FIG. 11, the cell BW prediction model 1106 outputs a data structure 1116, which includes a predicted BW for each cell in the predicted cell sequence (e.g., including cells $C_1, C_2, \ldots C_N$ in FIG. 11) at individual time instances (e.g., predicted cell sequence including cells $T_1, T_2, \ldots T_M$ in FIG. 11 where M is a number). The data structure 1116 (or portions thereof) is then sent as an LPP notification to the UEs 111, 121 so that the UEs 111, 121 can adjust their operational parameters accordingly. Additionally or alternatively, the data structure 1116 (or portions thereof) may be sent as an LPP notification to one or more NANs 131-133 that are serving UEs 111, 121 and/or that are in a vicinity of the UEs 111, 121 so that the one or more NANs 131-133 can adjust their operational parameters accordingly. Additionally or alternatively, the data structure 1116 may be sent as an LPP notification to one or more edge compute nodes 136, the CN 142, the cloud 144, and/or server provider platforms (e.g., server(s) 150 of FIG. 1) that are serving UEs 111, 121 so that these devices can adjust their operational parameters accordingly. In some embodiments, the data structure 1116 may be sent as an LPP notification to the one or more NANs 131-133, which extract one or more of the predicted BWs and transmit the extracted predicted BWs to the UEs 111, 121 in some other network-specific message/signaling. Other variations of these embodiments are also possible.

Figure 12:
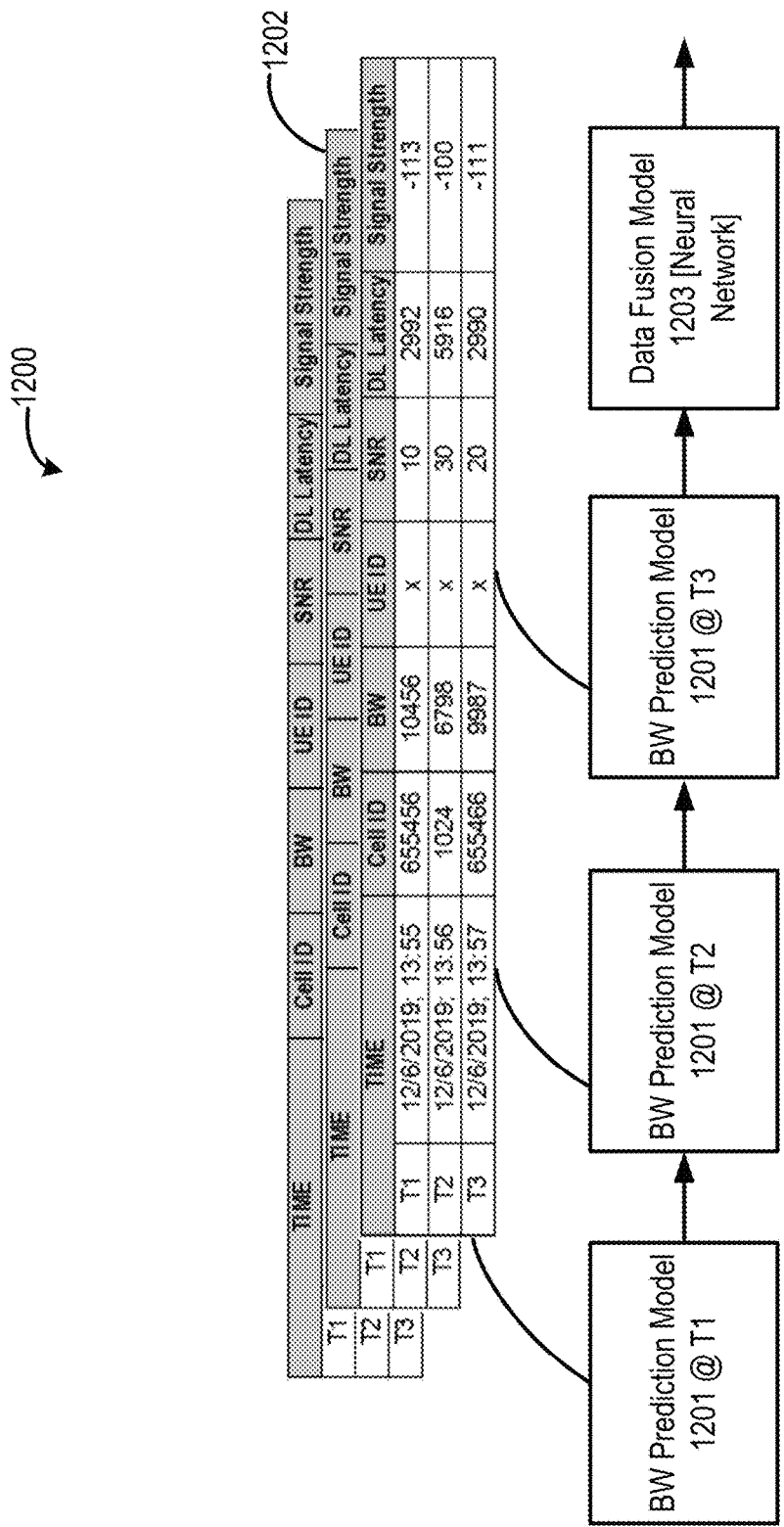
FIG. 12 illustrates another example data fusion engine for predicting bandwidths according to an example embodiment.

FIG. 12 illustrates an example data fusion engine 1200 that performs BW prediction according to various embodiments. FIG. 12 depicts an example of BW prediction using an LSTM based machine learning model, which is learned using spatio-temporal history data 1202 of multiple UEs 111, 121. The data fusion engine 1200 may correspond to the data fusion engine 1100 of FIG. 11 and/or the LPP layer 202 of FIG. 2.

In this example, each of the tables of the spatio-temporal history data 1202 may correspond to an individual UE 111, 121. As shown by FIG. 12, each of the spatio-temporal history data 1202 tables includes a cell ID, BW measurement, a UE ID, SNR measurement, downlink (DL) latency measurement, signal strength measurement for respective time instances (e.g., time instances T1, T2, and T3 in FIG. 12 where T is a number). The spatio-temporal history data 1202 of the multiple UEs 111, 121 is fed into a BW prediction ML model 1201, which predicts a BW for each of the time instances indicated by the spatio-temporal history data 1202 (e.g., time instances T1, T2, and T3 in FIG. 12 where T is a number). Each of the predicted BWs at each of the time instances is then fed into a data fusion model 1203. In this way, the data fusion model 1203 inherently learns a cell change path and BW changes over multiple time intervals, and relationships between BW, signal strength, and SNR. During prediction, additional or alternative UE spatio-historical history data (e.g., BW, latency, signal strength, SNR, cell ID, etc.) is used to predict BW and other parameters for future time intervals/instances.

Any suitable ML model may be used for the BW prediction model 1201 and the data fusion model 1203. In one example implementation, the BW prediction model 1201 is an LTSM neural network (NN) such as an LTSM RNN, and the data fusion model 1203 is another suitable NN, which may include a convolutional NN (CNN), a deep CNN (DCN), a deconvolutional NN (DNN), another RNN, a gated recurrent unit (GRU), a deep belief NN, a feed forward NN (FFN), a deep feed forward NN (DFF), a deep stacking network, a Markov chain, a perception NN, etc. In another example implementation, the BW prediction model 1201 is an LTSM, and the data fusion model 1203 is another LTSM.

FIGS. 13-17 illustrate example LPPS procedures 1300-1800, respectively, for practicing various embodiments discussed herein. The procedures 1300-1800 may be performed by an LPPS consumer, an LPPS provider, and in some cases, one or more other entities. In embodiments, the LPPS consumer may be a UE 111, 121, a NAN 131-133, an edge compute node 136, a service provider platform (e.g., one or more servers 150) of FIG. 1, the compute node 602 of FIG. 6, the UE 821 and/or a NAN 832A-B of FIG. 8, or some other device or system discussed herein. Additionally, the LPPS provider may be the LPPS 200 and/or the LPP layer 202 of FIG. 2. From the LPPS consumer's perspective, the LPPS provider is a resource representing the LPP information or LPP notifications. In embodiments, the connections for passing the various messages described below may be sent over a secure communication channel, which may be SSL or the like. The communication channels between the LPPS consumer, LPPS provider, and/or any other element discussed infra may be established and maintained using any of the mechanisms discussed herein, or the like.

Figure 13:
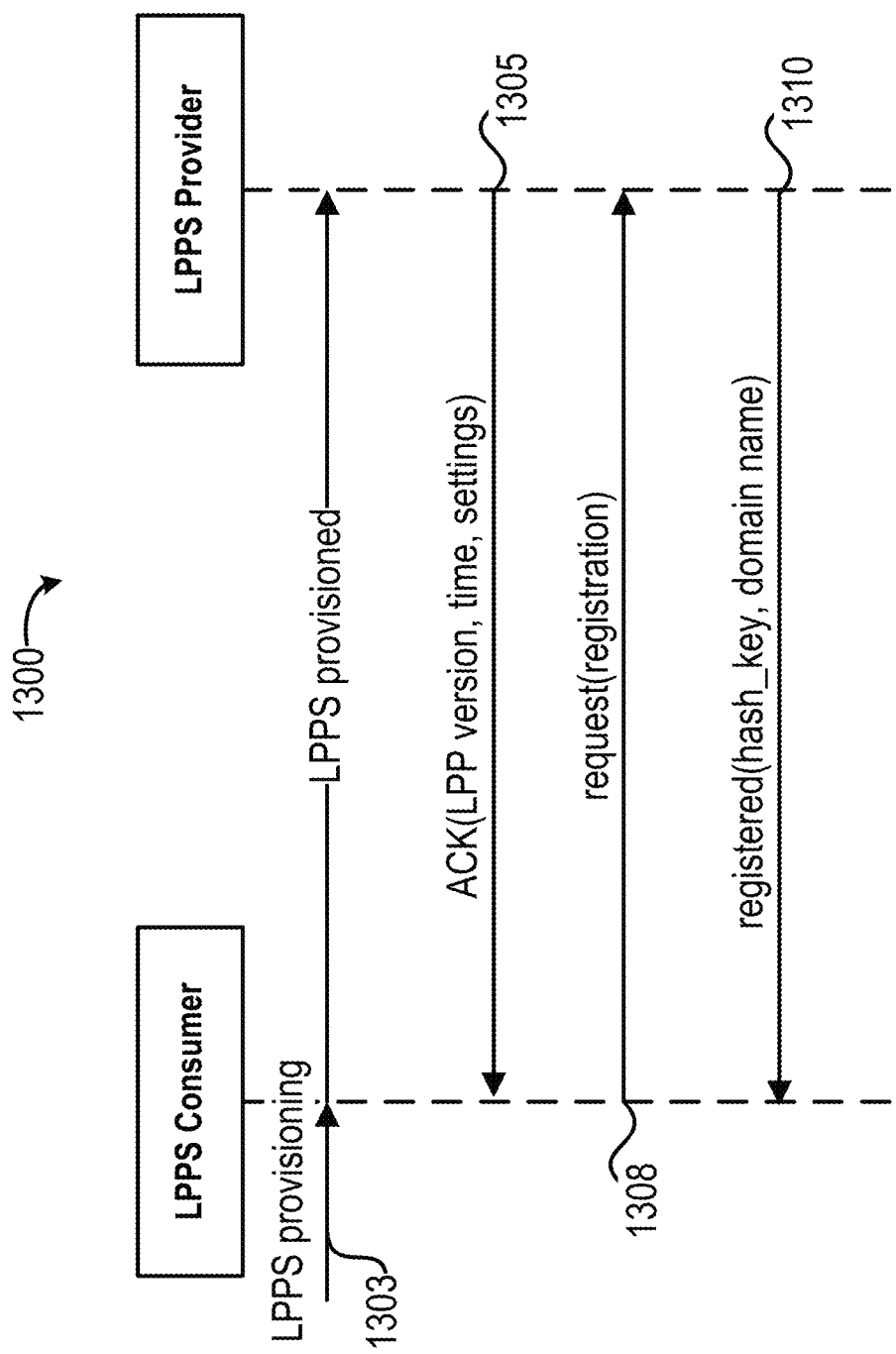
FIGS. 13-17 illustrate example LPPS procedures according to various embodiments.

Referring now to FIG. 13, which illustrates an example LPPS registration procedure 1300 according to an example embodiment. The procedure 1300 may be used by the LPPS consumers to register with the LPPS provider. Procedure 1300 begins at operation 1303 where LPPS provisioning takes place, and the LPPS consumer sends an indication to the LPPS provider indicating completion of the LPPS provisioning. The LPPS provisioning may involve loading and installing a suitable LPPS application on the LPPS consumer device. At operation 1305, the LPPS provider sends an acknowledgment (ACK) message to the LPPS consumer indicating receipt of the provisioning completion indication. The ACK message may include information such as a version of the LPPS provided by the LPPS provider, a time of receipt of the provisioning indication, and settings/configuration for receiving LPP services. At operation 1308, the LPPS consumer sends a registration request message to the LPPS provider, and at operation 1310, the LPPS provider sends a registration acceptance message to the LPPS consumer. In embodiments, the registration request message may include various LPPS consumer data and/or capabilities, and the registration accept message includes a unique key (hash_key) and a domain name of the LPPS provider. In embodiments, the LPPS Provider may use a suitable mechanism to validate the LPPS consumer when registering. The domain name in the registration acceptance message may uniquely identify the LPPS provider and may be used to send LPPS requests to the LPPS provider. Additionally, the hash_key may be included in the requests for LPP notifications, which is then used to access information about the LPPS consumer that is stored by the LPPS provider. Additionally or alternatively, the LPPS Provider may use the hash_key to validate the LPPS consumer. Moreover, the procedures 1400-1800 of FIGS. 14-18, respectively, may be performed once registration is complete.

Figure 14:
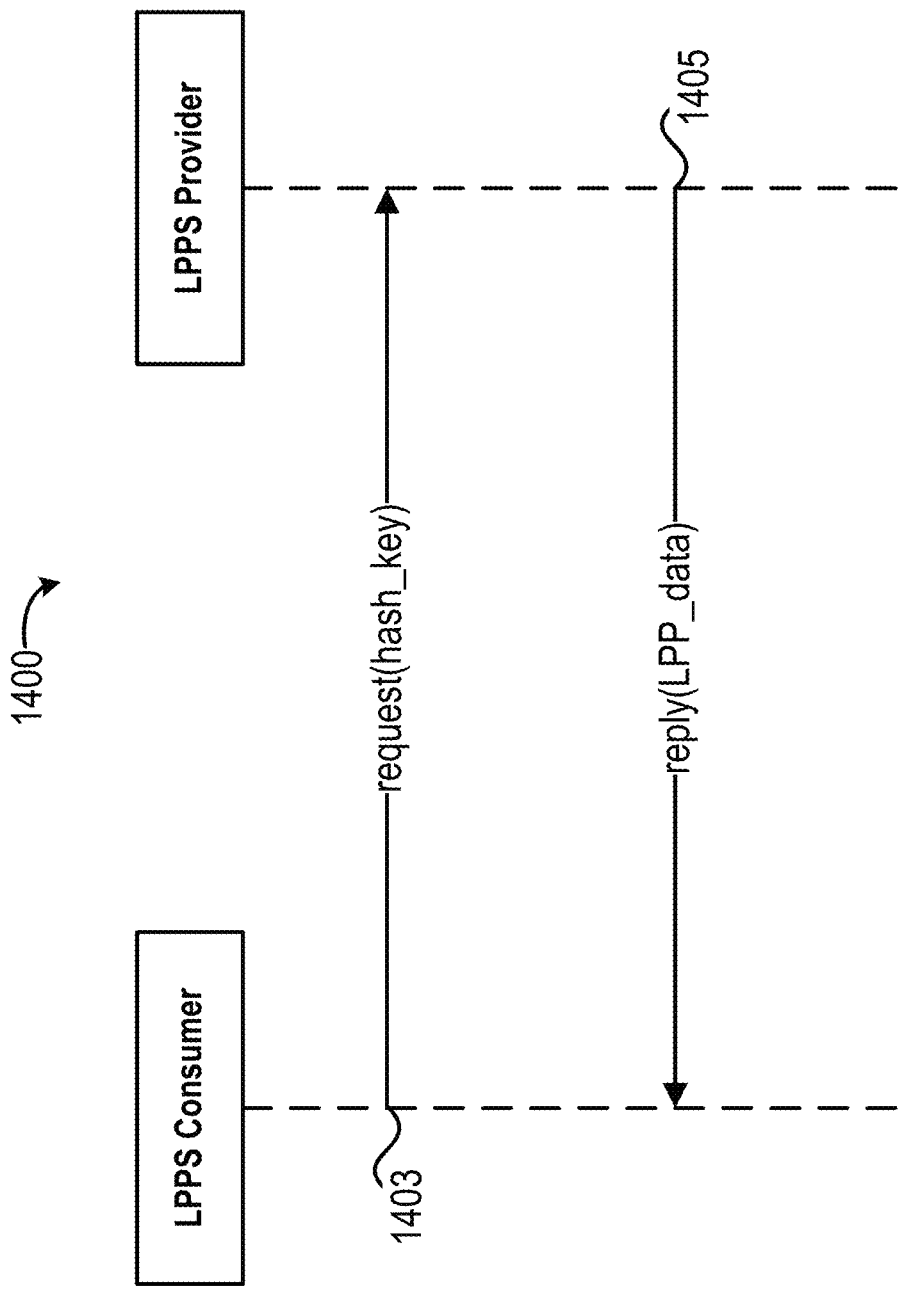

FIG. 14 illustrates an example LPPS procedure 1400 according to a first example embodiment. This first example embodiment is a request/reply model, wherein an LPPS consumer requests LPP notifications from the LPPS provider. Procedure 1400 begins at operation 1403 where the LPPS consumer sends a request message to the LPPS provider. In embodiments, the request message includes a request for an LPP notification. In embodiments, the request message may include the hash_key that the LPPS consumer obtained during the registration procedure 1300 of FIG. 13, as well as other parameters that may be needed to provider LPP notifications to the LPPS consumer. At operation 1405, the LPPS provider sends a reply message, which includes an LPP notification (LPP_data). The LPPS consumer may then adjust its operational parameters based on the LPP_data. Operations 1403 and 1405 may repeat as necessary, for example, when the LPPS consumer is triggered or otherwise desires to receive an LPP notification.

Figure 15:
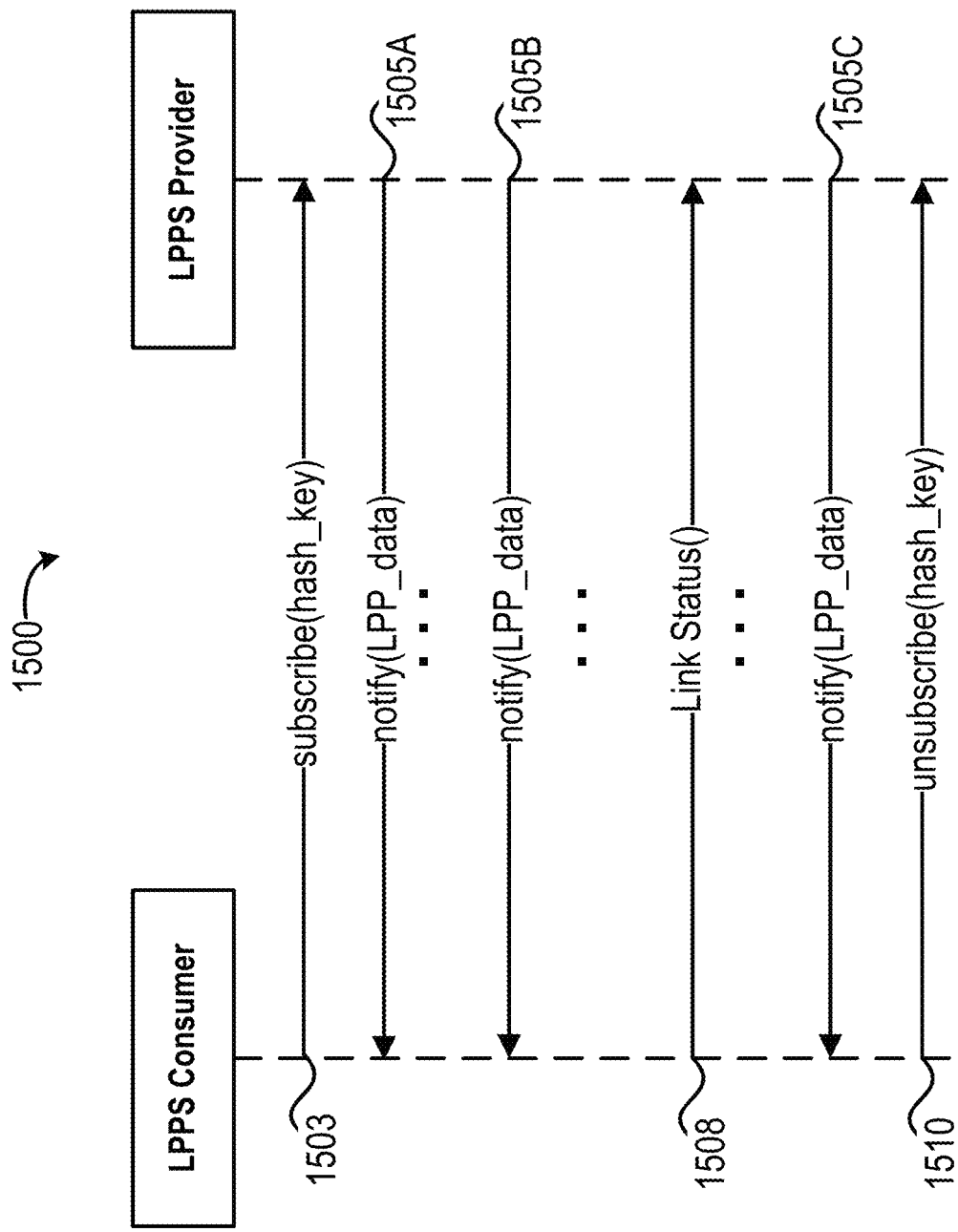

FIG. 15 illustrates an example LPPS procedure 1500 according to a second example embodiment. The second example embodiment is a subscribe/notify model, wherein the LPPS consumer subscribes to receive LPP notifications from the LPPS provider. Procedure 1500 begins at operation 1503 where the LPPS consumer sends a subscribe message to the LPPS provider. In embodiments, the subscribe message includes a subscription request to receive one or more LPP notifications from the LPPS provider. In embodiments, the subscribe message may include the hash_key that the LPPS consumer obtained during the registration procedure 1300 of FIG. 13, as well as other parameters that may be needed to provider LPP notifications to the LPPS consumer. In such embodiments, the LPPS provider may add the LPPS consumer to a subscribers list or other like data structure with the information included in the subscribe message. The subscribers list may include various LPPS consumers for which LPP notifications are to be generated.

At operation 1505A, the LPPS provider sends a notification message, which includes an LPP notification (LPP_data). The LPPS consumer may then adjust its operational parameters based on the LPP_data. After some time, the LPPS provider sends another notification message including LPP_data at operation 1505B and 1505C. In embodiments, the LPPS provider may generate and send notification messages each time it is triggered to send such messages to the LPPS consumer. The triggers may be time-based triggers wherein the LPPS provider sends notification messages when a timer expires or at periodic time intervals. The triggers may be asynchronous triggers wherein the LPPS provider sends notification messages each time an LPP notification is generated and indicated as available for transmission to the LPPS consumer. Other triggers, such as location-based triggers, application/event-based triggers, and the like, may be used in other embodiments. The LPPS provider may continue to send notification messages until the LPPS consumer sends an unsubscribe message at operation 1510. In embodiments, the unsubscribe message may include the hash_key that the LPPS consumer obtained during the registration procedure 1300 of FIG. 13 and an indication or an instruction for the LPPS provider to stop sending notification messages to the LPPS consumer.

In some embodiments, the LPPS consumer may send link status message, which is shown as being performed at operation 1508 in FIG. 15. The link status message may include measurement data or other like data related to link 103, 105, 107 performance, which may be used by the various prediction layers 225, 202 for future link performance predictions. The LPPS consumer may send link status messages at some predetermined or configured interval. Additionally, the LPPS consumer may send link status messages during any of the other LPPS procedures 1300-1400 and 1600-1800.

Figure 16:
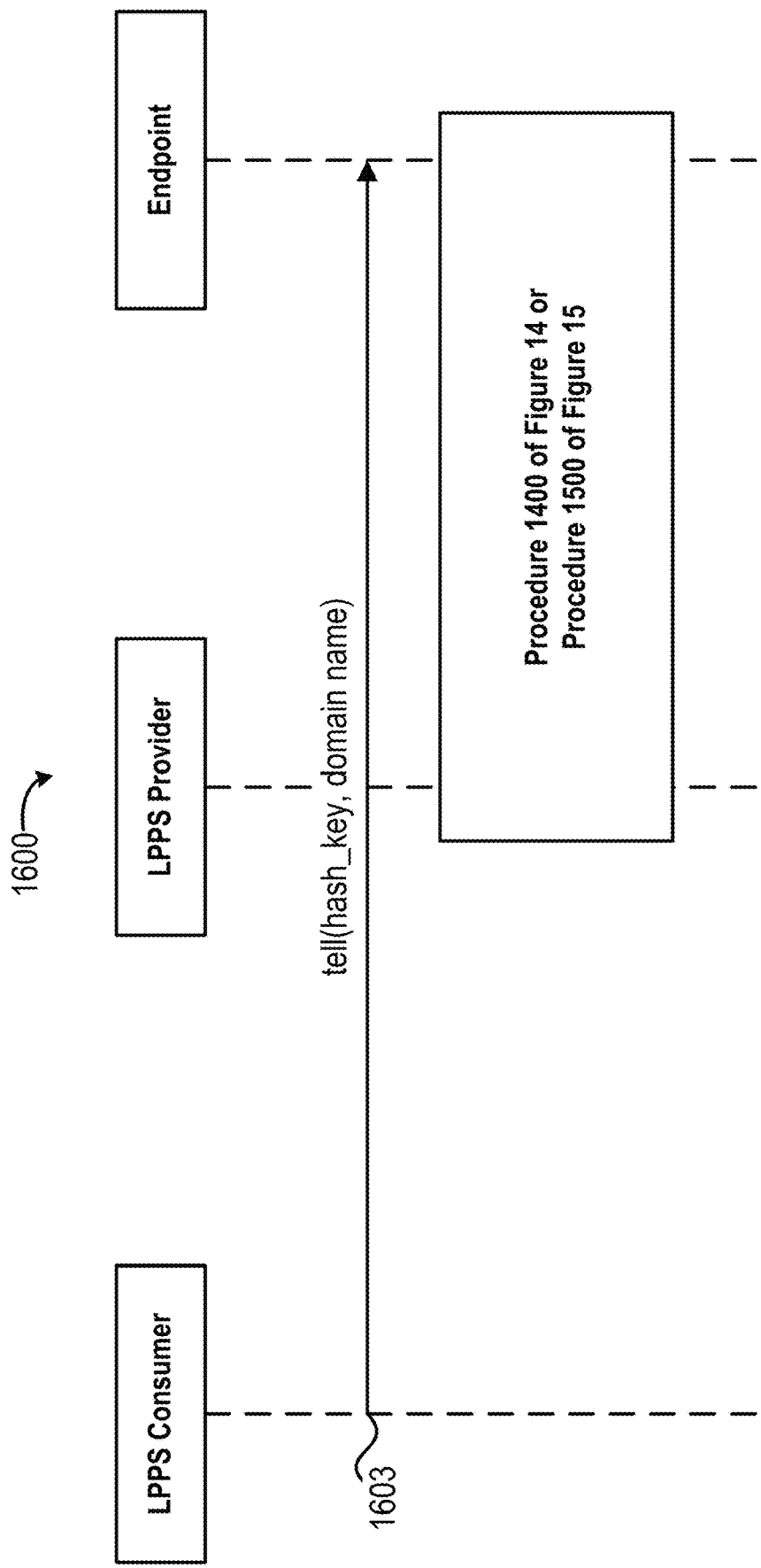

FIG. 16 illustrates an example multi-endpoint LPPS procedure 600 according to an example embodiment. The procedure 1600 is used to provide LPP notifications to an endpoint that is different than the LPPS consumer. In embodiments, the endpoint may be any of the devices or systems discussed herein. In one example, the LPPS consumer may be a UE 111, 121, and the endpoint may be a service provider platform or an edge compute node 136. Procedure 1600 begins at operation 1603 where the LPPS consumer sends a tell message to the endpoint via the LPPS provider. In embodiments, the tell message may be sent immediately after the registration procedure 1300 of FIG. 13 is complete, or at some other time after registration is complete. In some embodiments, the LPPS provider acts as a transparent relay node and forwards the tell message to the endpoint. In other embodiments, the LPPS provider extracts pertinent information from the tell message, and repackages this information (and/or adds additional information) into another tell message, which is then sent to the endpoint. In either of these embodiments, the tell message may be sent using out of band channels to provide the information to the endpoint. In either of these embodiments, the tell message includes the hash_key that the LPPS consumer obtained during the registration process 1300, and a domain name of the LPPS provider. This information is used by end point to obtain LPP notifications from the LPPS provider (see e.g., discussion of operation 1310 of FIG. 13). Next, the endpoint performs the LPPS request procedure 1400 of FIG. 14 or the LPPS subscribe procedure 1500 of FIG. 15. In embodiments, the endpoint takes the place of, or acts as an LPPS consumer as discussed previously with respect to FIGS. 14-15.

Figure 17:
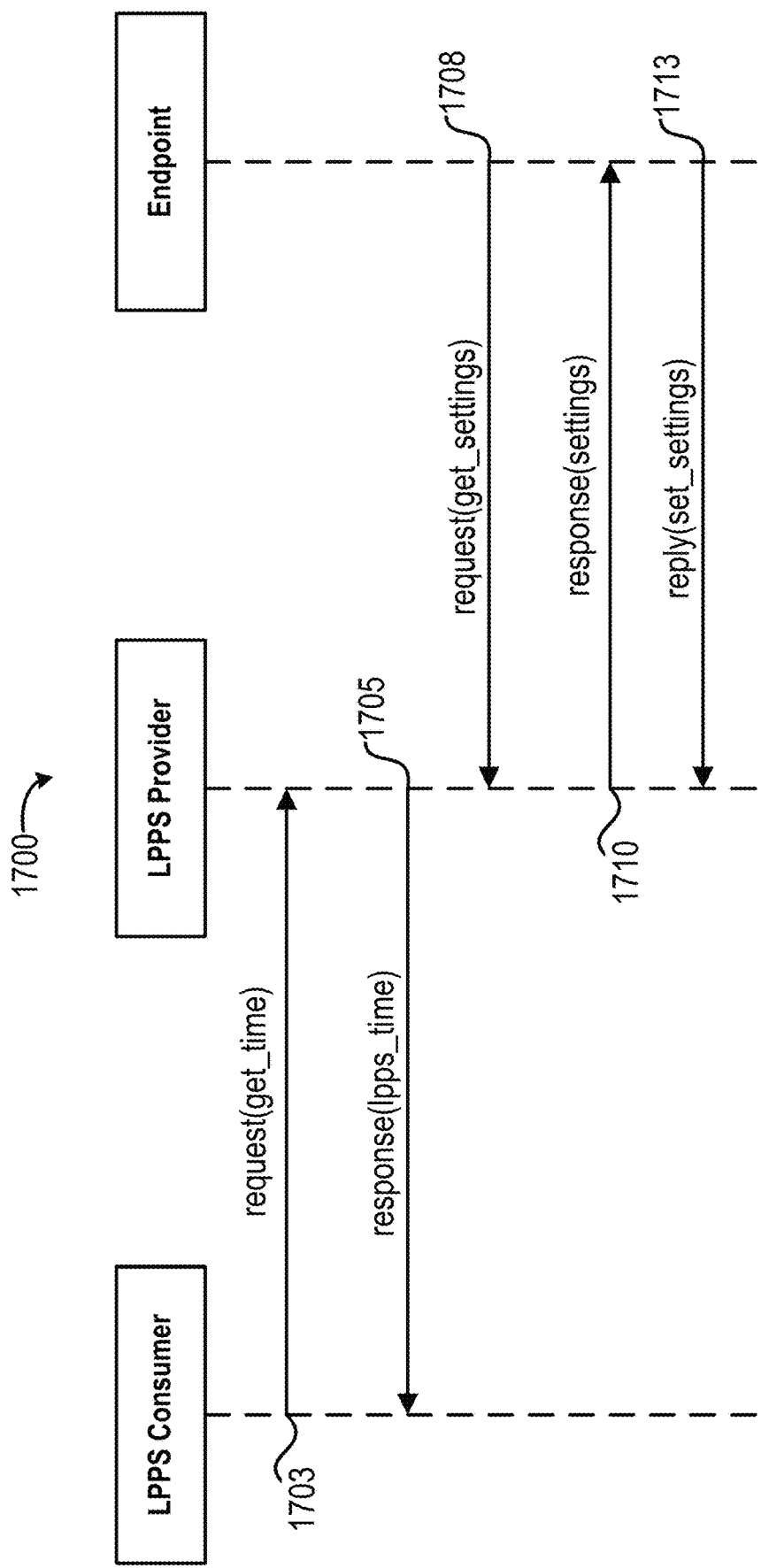

FIG. 17 illustrates an example time and settings synchronization (sync) LPPS procedure 1700 according to an example embodiment. The procedure 1700 is used by the LPPS consumer and endpoint to synchronize their local time and local LPPS settings with a reference time and LPPS settings of the LPPS provider. Procedure 1700 begins at operation 1703 where the LPPS consumer sends a request message to the LPPS provider. In embodiments, the request message may be sent immediately after the registration procedure 1300 of FIG. 13 is complete, or at some other time after registration is complete. In embodiments, this request message may include a request for a reference (or global) LPPS time (e.g., "get_time" in FIG. 17). At operation 1705, the LPPS provider sends a response message, which includes the reference LPPS time (e.g., "lpps_time" in FIG. 17). In some embodiments, the request and response messages of operations 1703 and 1705, respectively, may be sent according to the Network Time Protocol (NTP), and may include data/information as required by the NTP. For example, the response message may include a reference identifier (REFID) indicating a clock synchronization source, and a 64 bit timestamp and/or an 128 bit date stamp. The synchronization source may be a network (e.g., CN 142 or cloud 144) or one or more external (or global) synchronization sources such as a GNSS time. In other embodiments, the LPPS provider may instruct the LPPS consumer to use a component or embedded device as a synchronization source such as, for example, when the LPPS consumer includes a relatively stable atomic clock, a crystal oscillator included in positioning circuitry (e.g., positioning circuitry 345 or 545 of FIGS. 3 and 5, respectively), which can be used to derive an absolute timing for synchronization. Other message and/or time formats may be used in other embodiments.

At operation 1708, the endpoint sends a request message requesting LPPS settings from the LPPS producer. In embodiments, this request message may include a request for LPPS setting/configuration information (e.g., "get_settings" in FIG. 17). At operation 1710, the LPPS provider sends a response message, which includes the LPPS settings (e.g., "settings" in FIG. 17). In response to receipt of the response message, the endpoint may adjust or change its local settings according to the settings/configuration information in the response message (if necessary). At operation 1713, the endpoint sends a reply message indicating that the endpoint's local settings have been changed (e.g., "set_settings" in FIG. 17). It should be noted that in various embodiments, operations 1703 and 1705 may be performed by the endpoint and the LPPS provider, and operation 1708-1713 may be performed by the LPPS consumer and the LPPS provider.

The various messages in each of the procedures 1300-1700 may be suitable HTTP (e.g., HTTP/1.x, HTTP/2, HTTP/3, HTTPS, SPDY, etc.) messages. For example, the request messages (and the reply message in FIG. 17) may be HTTP GET, POST, PUT, CONNECT messages or the like, with a suitable request line. The request/reply messages may include a body portion with the described information as well as other information such as an LPPS consumer instance ID (e.g., an application instance ID for LPPS app 620 of FIG. 6). Additionally, the various response messages may be suitable HTTP response messages including a suitable status code such as "200 OK" in the header of the HTTP message, which indicates that the LPPS consumer's request succeeded. Additionally, the requested information may be included in the body of the HTTP response messages. In this embodiment, the HTTP response message may include other HTTP status codes, such as a bad request status code (400) (e.g., when incorrect parameters are passed in the request), a not found status code (404) (e.g., when a Universal Resource Indicator (URI) provided in the request cannot be mapped to a valid resource URI), a forbidden status code (403) (e.g., when the operation is not allowed given the current status of the resource), and/or other like HTTP status codes. In the aforementioned examples, the response body may include a ProblemDetails data type indicating/including information about the particular error. Other message formats may be used in other embodiments, and the request/response data may be located in the header or body portion of such messages. Additionally or alternatively, a message format used for procedures 1300-1700 includes the convention for packet definition discussed by ETSI TS 102 636-4-1 V1.1.1 (2011-06). Example message formats for this purpose are shown by FIG. 12. The messages may be exchanged directly between vehicles and/or RSUs or through intermediate relay stations (or relays) as illustrated by FIG. 11.

Figure 18:
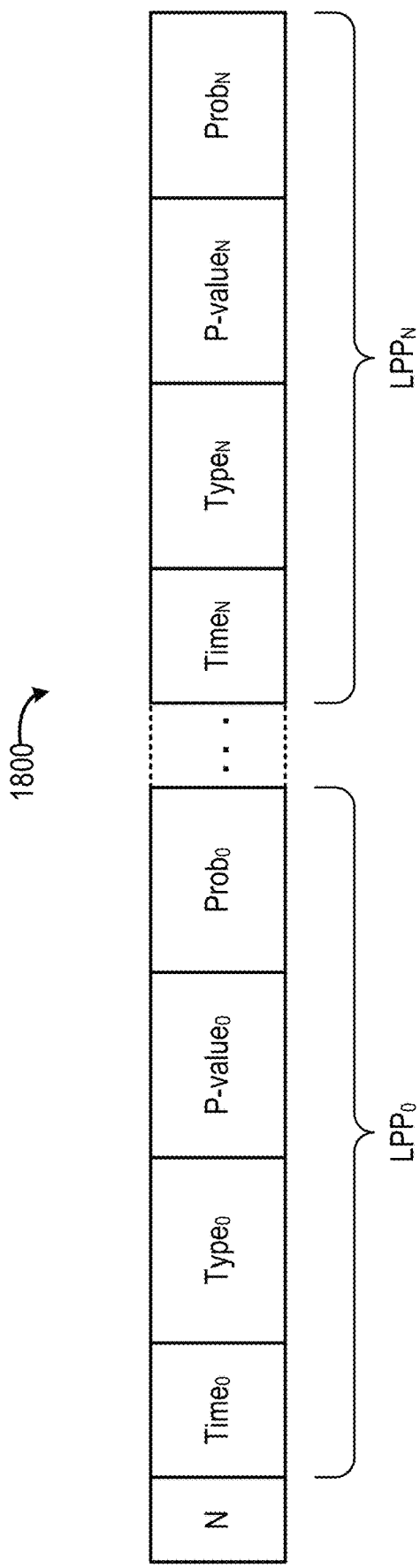
FIG. 18 illustrates an example LPP protocol data unit according to various embodiments.

FIG. 18 illustrates an example LPP protocol data unit (PDU) 1800 according to various embodiments. The PDU 1800 may be any suitable data structure used by LPPS providers to convey link performance predictions to LPPS consumers. In various embodiments, the PDU 1800 may be the LPP notifications discussed previously.

In some embodiments, the LPP PDU 1800 may be a segment or datagram when conveyed via a transport layer protocol (e.g., TCP, UDP, QUIC, RSVP, SCTP, VPN, MPTCP, GRE, GeoNetworking protocol, BTP, etc.), or a packet when conveyed via a network layer or internet layer protocol (e.g., IPv4, IPv4, etc.). In some embodiments, the PDU 1800 could be a frame when conveyed via a link layer, data link layer, or some other layer 2 protocol (e.g., Ethernet data link layer; Point-to-Point (PPP); 3GPP MAC, RLC, PDCP, or SDAP layers, etc.). In other embodiments, the PDU 1800 could be an message or other like data structure when conveyed via an application layer protocol (e.g., Session Initiation Protocol (SIP), Session Description Protocol (SDP), HTTP, SPDY, etc.). In any of the aforementioned embodiments, the PDU 1800 is identified by one or more values in a header portion of the message (not shown by FIG. 18) and has a variable size with following fields.

The N field indicates a number of LLPs that are contained within the LPP PDU 1800. Following the N field is each $LPP_x$ of the number of LPPs 0-N, where x is a number from 0 to N, and N is a number of link performance predictions indicated by the N field. Each $LPP_x$ includes a $time_x$ field, a $type_x$ field, a p-$value_x$ field, and a $prob_x$ field. The $time_x$ field includes a value that indicates a timestamp for the x-th link performance prediction. The timestamp may be in NTP format or any other suitable timestamp format, such as those discussed herein. The $type_x$ field includes a value that indicates the type of the x-th link performance prediction. The type may be a predicted BW, a predicted latency, a predicted transmission power, a predicted bit error rate, a predicted signal strength measurement, a predicted interference measurement, a predicted noise measurement, a predicted packet loss rate, and/or a prediction of any other measurement type, such as those discussed herein. The p-$value_x$ field includes a value of the predicted measurement type indicated by the $type_x$ field. The units of the value in the p-$value_x$ field is dependent on the type of prediction indicated by the $type_x$ field. The $prob_x$ field includes a value that indicates a probability that the x-th link performance prediction indicated by the p-$value_x$ field will actually occur at the timestamp indicated by the $time_x$ field. In some embodiments, the value in the $prob_x$ field is an estimated standard deviation of the link performance prediction. The values included in any of the aforementioned fields may be numerals or characters, but the type of information included in each field may be dependent on the type of protocol used to convey the LPP PDU 1800.

Figure 19:
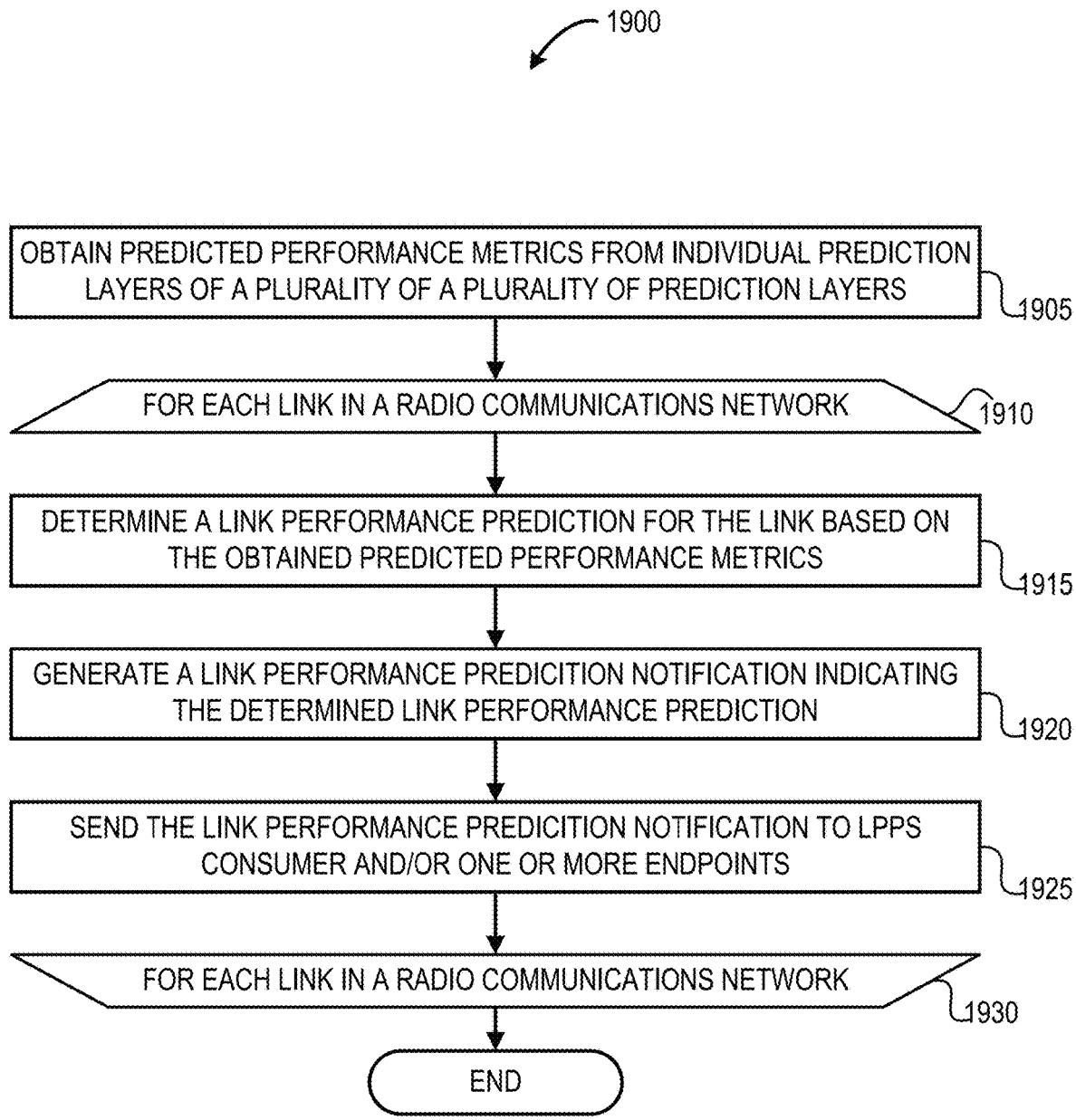
FIG. 19 depicts an example procedure for practicing the various embodiments herein.

FIG. 19 depicts an example process 1900 for practicing the various embodiments discussed herein. In particular, process 1900 may be performed by an LPPS provider, such as the LPPS 200 of FIG. 2, to provide LPPs to one or more LPPS consumers, such as the UEs 111, 121, NANs 131-133, edge system/network 135, edge compute nodes 136, CN 142, cloud 144, and/or server(s) 150 of FIG. 1, and/or any other device or system discussed herein. While particular examples and orders of operations are illustrated FIG. 19, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1900 begins at operation 1905 where the LPPS provider obtains obtain predicted performance metrics from individual prediction layers of a plurality of prediction layers. In embodiments, each prediction layer of the plurality of prediction layers uses an ML algorithm to generate an ML model to generate respective predicted performance metrics. In various embodiments, at least one prediction layer of the plurality of prediction layers uses an ML algorithm and/or ML model that is different than ML algorithms and/or ML models used by other prediction layers of the plurality of prediction layers. The plurality of prediction layers may be the prediction layers 225-1 to 225-N of FIG. 2 and/or any of the prediction layers discussed previously with respect to FIGS. 6-10.

At open loop operation 1910, the LPPS provider processes each link (e.g., links 103, 105, 107 of FIG. 1), in turn, for example, by performing operations 1915 to 1925 for each link. Additionally or alternatively, At open loop operation 1910, the LPPS provider performs operations 1915 to 1925 for each of one or more LPPS consumers (e.g., each of a plurality of UEs 111, 121 being served by one or more NANs 131-133 of FIG. 1). At operation 915, the LPPS provider determines an LPP for the link based on the obtained predicted performance metrics and/or various combinations thereof. In some embodiments, the LPPS provider employs a suitable data fusion technique to determine the LPP, and/or predicts a value of the LPP based on a suitable probability distribution. At operation 1920, the LPPS provider generates an LPP notification (e.g., LPP PDU 1800 of FIG. 18) indicating the determined LPP. At operation 1925, the LPPS provider sends the LPP notification to the LPPS consumer or one or more endpoints (see e.g., FIGS. 16-17). At close loop operation 1930, the LPPS provider proceeds back to operation 1910 process the next link (or LPPS consumer), if any. When there are no more links (or LPPS consumers) to process, process 1900 may end or repeat as necessary.

In various embodiments, the LPPS provider may be an apparatus comprising processor circuitry (e.g., application circuitry 305 of FIG. 3) coupled with network interface circuitry (e.g., network controller circuitry 335 of FIG. 3). The network interface circuitry communicatively couples the apparatus with one or more NANs 131-133, each of which provide network connectivity to one or UEs 111, 121 via respective links 103, 107 between the individual NANs 131-133 and the one or more UEs 111, 121.

According to a first embodiment, the processor circuitry is arranged to operate an LPP engine to perform 1910 to 1930, which includes controlling the network interface circuitry to send the LPP notification at operation 1925. In the first embodiment, the plurality of prediction layers are operated by remote computing devices, and the network interface circuitry may obtain the predicted performance metrics from these remote computing devices at operation 1905. As an example of the first embodiment, individual prediction layers are operated by respective edge computing servers (e.g., edge compute nodes 136 of FIG. 1), application servers (e.g., one or more servers 150 of FIG. 1), or RANs (e.g., including RAN nodes 131-132 of FIG. 1), and the network interface circuitry is arranged to receive the predicted performance metrics from the respective edge computing servers, application servers, and/or RANs. In the first embodiment, the apparatus may be disposed in a server computing system that is part of a cloud computing service (e.g., cloud 144 of FIG. 1), a cellular core network (e.g., CN 142 of FIG. 1), a service provider platform (e.g., one or more servers 150 of FIG. 1), an edge network (e.g., an edge compute node 136 within edge network 135 of FIG. 1), and/or the like.

According to a second embodiment, the processor circuitry is arranged to operate an LPP engine to perform 1905 to 1930, which includes controlling the network interface circuitry to send the LPP notification at operation 1925. In the second embodiment, the plurality of prediction layers and the LPP engine are operated by the apparatus and/or a system in which the apparatus is deployed, and the processor circuitry obtains the predicted performance metrics from the individual prediction layers at operation 1905. The system in which the apparatus is deployed may be one or more cluster nodes in a cloud computing service (e.g., cloud 144 of FIG. 1). As an example of the second embodiment, the plurality of prediction layers and the LPP engine are operated by respective VMs and/or application containers (e.g., docker® containers, Kubernetes™, etc.) on top of virtualization infrastructure provided by the apparatus or a system in which the apparatus is disposed. In the second embodiment, the processor circuitry obtains the predicted performance metrics from the individual prediction layers at operation 1905 using a suitable API(s), proxy application(s), trusted application(s), virtual/VM switch(es), VM network address translator(s) (NAT), etc. In the second embodiment, the apparatus may be disposed in a server computing system that is part of a cloud computing service (e.g., cloud 144 of FIG. 1), a cellular core network (e.g., CN 142 of FIG. 1), or a service provider platform (e.g., one or more servers 150 of FIG. 1), and the processor circuitry or virtualization infrastructure is arranged to operate the individual prediction layers.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes an apparatus for providing link performance predictions (LPPs), the apparatus comprising: processor circuitry coupled with network interface circuitry, the network interface circuitry arranged to communicatively couple the apparatus with one or more network access nodes (NANs), wherein individual NANs of the one or more NANs are arranged to provide network connectivity to one or more user equipment (UEs) via respective links between the individual NANs and the one or more UEs, and the processor circuitry is arranged to operate an LPP engine to: obtain predicted performance metrics for LPP from individual prediction layers of a plurality of prediction layers, determine, for each of the respective links, a corresponding LPP based on the obtained predicted performance metrics, and generate, for each of the respective links, a message indicating the corresponding LPP; and wherein the network interface circuitry is further arranged to send the message for each of the respective links to the individual NANs or the one or more UEs via the individual NANs.

Example A02 includes the apparatus of example A01 and/or some other example(s) herein, wherein the message includes a time field to indicate a timestamp of the corresponding LPP, a type field to indicate an LPP type of the corresponding LPP, a value field to indicate a value of the LPP, and a probability field to indicate a likelihood that the corresponding LPP comes true or an estimated standard deviation of the corresponding LPP.

Example A03 includes the apparatus of example A02 and/or some other example(s) herein, wherein the LPP type is one of bandwidth, latency, jitter, round trip time (RTT), number of interrupts, out-of-order delivery of data packets, transmission power, bit error rate, bit error ratio (BER), packet loss rate, a packet reception rate (PRR), a signal-to-noise ratio (SNR), a signal-to-noise and interference ratio (SINR), a signal-plus-noise-plus-distortion to noise-plus-distortion (SINAD) ratio, a peak-to-average power ratio (PAPR), a Block Error Rate (BLER), a Reference Signal Received Power (RSRP), a Reference Signal Received Quality (RSRQ), a Received Signal Strength Indicator (RSSI), a channel interference measurement, a thermal noise power measurement, a received interference power measurement, network or cell load, a recommended transmission power.

Example A04 includes the apparatus of examples A01-A03 and/or some other example(s) herein, wherein, to determine the corresponding LPP for each of the respective links, the processor circuitry is arranged to operate the LPP engine to: combine one or more predicted performance metrics from the individual prediction layers with one or more other predicted performance metrics from at least one other prediction layer of the plurality of prediction layers.

Example A05 includes the apparatus of examples A01-A04 and/or some other example(s) herein, wherein the individual prediction layers are to be operated by respective edge compute nodes, and the network interface circuitry is further arranged to receive the predicted performance metrics from the respective edge compute nodes.

Example A06 includes the apparatus of example A05 and/or some other example(s) herein, wherein individual prediction layers are to be operated within respective virtual machines (VMs) or application containers in the respective edge compute nodes.

Example A07 includes the apparatus of examples A05-A06 and/or some other example(s) herein, wherein the edge compute nodes are Content Delivery Network (CDN) servers, Nebula edge-cloud computing systems, fog computing systems, cloudlet edge-cloud computing systems, Mobile Cloud Computing (MCC) systems, Central Office Re-architected as a Datacenter (CORD) systems, mobile CORD (M-CORD) systems, Converged Multi-Access and Core (COMAC) computing systems, or Multi-access Edge Computing (MEC) servers.

Example A08 includes the apparatus of examples A01-A04 and/or some other example(s) herein, wherein the apparatus is a System-On-Chip (SoC) or a Multi-Chip Package (MCP) disposed in a server computing system, the server computing system is to operate as an application server, a server of a service provider platform, or a as a cloud computing node provided by a cloud computing service.

Example A09 includes the apparatus of example A08 and/or some other example(s) herein, wherein the processor circuitry is arranged to operate individual prediction layers of the plurality of prediction layers, and each prediction layer of the plurality of prediction layers is arranged to use a machine learning (ML) algorithm to generate an ML model for corresponding NANs of the one or more NANs, and each prediction layer is arranged to use the ML model for the corresponding NANs to generate respective predicted performance metrics.

Example A10 includes the apparatus of examples A08-A09 and/or some other example(s) herein, wherein at least one prediction layer of the plurality of prediction layers is arranged to use an ML algorithm that is different than ML algorithms used by other prediction layers of the plurality of prediction layers.

Example A11 includes the apparatus of examples A08-A10 and/or some other example(s) herein, wherein the processor circuitry is arranged to operate individual prediction layers in respective virtual machines (VMs) or application containers.

Example B01 includes a Link Performance Prediction (LPP) method comprising: obtaining or causing to obtain predicted performance metrics from individual prediction layers of a plurality of prediction layers; and for each radio link provided by one or more network access nodes (NANs) to a plurality of user equipment (UEs) being served by the one or more NANs: determining or causing to determine an LPP for the radio link based on combinations of the obtained predicted performance metrics, generating or causing to generate an LPP notification including the LPP, and transmitting or causing to transmit the LPP notification to the NAN or the UE.

Example B02 includes the method of example B01 and/or some other example(s) herein, wherein the plurality of layers includes a data collection layer, and the method comprises: collecting and storing or causing to collect and store, by the data collection layer, operational parameters, mobility information, and measurement information from the plurality of UEs or the one or more NANs as spatio-temporal data.

Example B03 includes the method of example B02 and/or some other example(s) herein, wherein: the operational parameters include one or more of hardware configuration information, subscription data, security permissions, processor speed, memory or storage capacity, average computation time per workload, reuse degree of computational resources, processor utilization, memory utilization, available memory, available processor resources, communication capabilities, available battery power, and a battery power budget; the mobility information indicating a speed and direction of travel of the plurality of UEs, and the mobility information includes one or more of global navigation satellite system (GNSS) data, mapping application data, turn-by-turn navigation data, signal measurement based calculations, Long Term Evolution (LTE) location based services; and the measurement information includes one or more of bandwidth, network or cell load, latency, jitter, round trip time (RTT), number of interrupts, out-of-order delivery of data packets, bit error rate, bit error ratio (BER), Block Error Rate (BLER), packet loss rate, packet reception rate (PRR), transmission power measurements, reception power measurements, Received Signal Strength Indicator (RSSI) measurements, Reference Signal Received Power (RSRP) measurements, Reference Signal Received Quality (RSRQ) measurements, peak-to-average power ratio (PAPR), channel interference measurement, thermal noise power measurement, received interference power measurement, signal-to-noise ratio (SNR) measurements, signal-to-noise and interference ratio (SINR) measurements, signal-plus-noise-plus-distortion to noise-plus-distortion (SINAD) ratio, GNSS timing information, GNSS code measurements, and GNSS carrier phase measurements.

Example B04 includes the method of examples B02-B03 and/or some other example(s) herein, wherein the plurality of layers further includes a cell load layer, and the method comprises: generating or causing to generate, by the cell load layer for respective NANs of the one or more NANs, a cell load machine learning (ML) model using at least a subset of the spatio-temporal data and NAN characteristics of the respective NANs, the cell load ML model representing a predicted bandwidth or predicted resource utilization for the respective NANs at one or more time instances; and determining or causing to determine, by the cell load layer using the cell load ML model for the respective NANs, a predicted bandwidth or predicted resource utilization for the respective NANs at one or more future time instances.

Example B05 includes the method of example B04 and/or some other example(s) herein, wherein generating the cell load ML model comprises: operating or causing to operate, by the cell load layer, one or both of a Long Short Term Memory (LSTM) algorithm and a Recurrent Neural Network (RNN) using the subset of the spatio-temporal data and the NAN characteristics as an input.

Example B06 includes the method of examples B02-B05 and/or some other example(s) herein, wherein the plurality of layers includes an intra-cell layer, and the method comprises: generating or causing to generate, by the intra-cell layer, an intra-cell ML model for respective NANs of the one or more NANs using at least a subset of the spatio-temporal data, the intra-cell ML model representing a predicted signal quality for a given UE within a coverage area of the respective NANs at one or more time instances; and determining or causing to determine, by the intra-cell layer using the intra-cell ML model for the respective NANs, a predicted signal quality for each UE of the plurality of UEs within the coverage area of the respective NANs at one or more future time instances.

Example B07 includes the method of example B06 and/or some other example(s) herein, wherein generating the intra-cell ML model comprises: operating or causing to operate one or more of a pattern matching algorithm and a graph matching algorithm using the subset of the spatio-temporal data as an input.

Example B08 includes the method of examples B06-B07 and/or some other example(s) herein, wherein the plurality of layers includes a geoposition layer, and the method comprises: generating or causing to generate, by the geoposition layer, a geoposition ML model for the respective NANs using at least a subset of the spatio-temporal data, the geoposition ML model representing a predicted signal quality for a given UE at a given geolocation at one or more time instances; and determining or causing to determine, by the geoposition layer, using the geoposition ML model for the respective NANs, a predicted signal quality for each UE at one or more geolocations at one or more future time instances.

Example B09 includes the method of example B08 and/or some other example(s) herein, wherein generating the geoposition ML model comprises: correlating or causing to correlate, by the geoposition layer, the predicted signal quality for each UE with one or more measurements taken at the given geolocation at the one or more time instances.

Example B10 includes the method of examples B02-B09 and/or some other example(s) herein, wherein the plurality of layers includes a cell transition layer, and the method comprises: generating or causing to generate, by the cell transition layer, a cell transition ML model for respective NANs of the one or more NANs using at least a subset of the spatio-temporal data, the cell transition ML model representing a probability that a given UE will travel from a coverage area of the respective NANs to another coverage area of another NAN of the one or more NANs; and determining or causing to determine, by the cell transition layer using the cell transition ML model for the respective NANs, a predicted coverage area to be visited by each UE at one or more future time instances.

Example B11 includes the method of example B10 and/or some other example(s) herein, wherein generating the cell transition ML model comprises: operating or causing to operate a graph drawing algorithm to generate a graph data structure including a node to represent a corresponding one of the one or more NANs and an edge between the node and at least one other node, the edge representing a direction, time and probability of a transition between the node and the at least one other node; and operating or causing to operate a sequence prediction algorithm to determine, for each node in the graph data structure, a probability that the given UE will travel from the node to the at least one other node at a given time instance.

Example B12 includes the method of example B11 and/or some other example(s) herein, wherein the graph drawing algorithm includes one or more of a forced-based layout algorithm, a spectral layout algorithm, and a tree layout algorithm; and wherein the sequence prediction algorithm includes one or more of a Compact Prediction Tree (CPT) algorithm, a Random Forest algorithm, and a graph traversal algorithm.

Example B13 includes the method of examples B02-B12 and/or some other example(s) herein, wherein the plurality of layers includes a network topology layer, and the method comprises: generating or causing to generate, by the network topology layer, a network topology ML model using one or more NAN characteristics of the respective NANs, the network topology ML model representing a predicted link quality for one or more backhaul links connected to the respective NANs at one or more time instances; and determining or causing to determine, by the network topology layer using the network topology ML model for the respective NANs, a predicted link quality for each of the one or more backhaul links at one or more future time instances.

Example C01 includes a computer-implemented link performance predictions (LPP) method, the method comprising: receiving, by an LPP service (LPPS) provider from an LPPS consumer, a first message for requesting LPP services from the LPPS provider; determining, by the LPPS provider, an LPP for a radio link based on combinations of predicted performance metrics obtained from one or more performance prediction layers; and sending, by the LPPS provider to the LPPS consumer, a second message including an LPP notification, the LPP notification indicating the determined LPP.

Example C02 includes the method of example C01 and/or some other example(s) herein, wherein the first message is a request message, the second message is a reply message, and the method further comprises: determining, by the LPPS provider, the LPP for the radio link based at least in part on information contained in the request message; and generating, by the LPPS provider, the LPP notification in response to receipt of the request message.

Example C03 includes the method of example C01 and/or some other example(s) herein, wherein the first message is a subscribe message, the second message is a notify message, and the method further comprises: adding, by the LPPS provider, the LPPS consumer and information contained in the request message to a subscriber list; detecting, by the LPPS provider, a trigger to determine the LPP for the radio link; and in response to detecting the trigger, generating, by the LPPS provider, the LPP notification, and sending the notify message to the LPPS consumer.

Example C04 includes the method of examples C01-C03 and/or some other example(s) herein, wherein the first message is a registration request message, the second message is a registration response message, and the method further comprises: in response to receipt of the registration request message, determining, by the LPPS provider, a unique key based on information included in the registration request message; and generating, by the LPPS provider, the registration response message to include the unique key and a domain name of the LPPS provider.

Example C05 includes the method of examples C01-C04 and/or some other example(s) herein, wherein the second message is to cause the LPP service consumer to perform one or more operational decisions for link resource utilization based on the LPP notification.

Example Z01 may include an apparatus comprising means to perform one or more elements of a method described in or related to any of examples A01-A10, B01-B13, C01-C04, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A10, B01-B13, C01-C04, or any other method or process described herein. Example Z03 may include an apparatus comprising logic, modules, or circuitry to perform one or more elements of a method described in or related to any of examples A01-A10, B01-B13, C01-C04, or any other method or process described herein. Example Z04 may include a method, technique, or process as described in or related to any of examples A01-A10, B01-B13, C01-C04, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A10, B01-B13, C01-C04, or portions thereof. Example Z06 may include a signal as described in or related to any of examples A01-A10, B01-B13, C01-C04, or portions or parts thereof. Example Z07 may include a datagram, packet, frame, segment, protocol data unit (PDU), or message as described in or related to any of examples A01-A10, B01-B13, C01-C04, or portions or parts thereof, or otherwise described in the present disclosure.

Example Z08 may include a signal encoded with data as described in or related to any of examples A01-A10, B01-B13, C01-C04, or portions or parts thereof, or otherwise described in the present disclosure. Example Z09 may include a signal encoded with a datagram, packet, frame, segment, protocol data unit (PDU), or message as described in or related to any of examples A01-A10, B01-B13, C01-C04, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A10, B01-B13, C01-C04, or portions thereof. Example Z11 may include a computer program comprising instructions, wherein execution of the program by a processing element is to cause the processing element to carry out the method, techniques, or process as described in or related to any of examples A01-A10, B01-B13, C01-C04, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, IO interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move. As used herein, the terms "access node," "access point," "network access node," or the like refers to equipment that provides the radio baseband functions for data and/or voice connectivity between a network and one or more user devices.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

As used herein, the term "computational offloading" or "offloading" refers to the transfer of resource intensive computational tasks or workloads from a device, computing system, etc., to an external platform such as an edge node/server, cluster, grid, cloud computing service, and/or the like.

As used herein, the term "workload" may refer to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The term "bandwidth" as used herein refers to a difference between upper and lower frequencies in a continuous band of frequencies, which is typically measured in hertz. The term "frequency band" as used herein refers to an interval of frequencies delimited by a lower frequency and an upper frequency, and may also be referred to as a "radio band", "spectrum", or the like. The term "carrier frequency" as used herein refers to a frequency of a carrier signal, or the frequency of a modulated signal.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus employed as a link performance prediction (LPP) service provider, the apparatus comprising:
    network interface circuitry arranged to communicatively couple the apparatus with one or more network access nodes (NANs), wherein individual NANs of the one or more NANs are arranged to provide network connectivity to one or more user equipment (UEs) via respective links between the individual NANs and the one or more UEs; and
    processor circuitry communicatively coupled with the network interface circuitry, the processor circuitry is arranged to:
        obtain, from an LPP service consumer via the network interface circuitry, a first message for requesting LPP services from the LPP service provider,
        determine an LPP for a link of the respective links based on one or more predicted performance metrics obtained from one or more performance prediction layers of a plurality of prediction layers, and
        send, to the LPP service consumer via the network interface circuitry, a second message including an LPP notification, the LPP notification including the determined LPP.

2. The apparatus of claim 1, wherein the processor circuitry is further arranged to determine the LPP based on a combination of the one or more predicted performance metrics.

3. The apparatus of claim 1, wherein the first message is a request message, the second message is a reply message, and the processor circuitry is further arranged to:
    determine the LPP based at least in part on information contained in the request message; and
    generate the LPP notification in response to receipt of the request message.

4. The apparatus of claim 1, wherein the first message is a subscribe message, the second message is a notify message, and the processor circuitry is further arranged to:
- add an identifier associated with the LPP service consumer and information contained in the subscribe message to a subscriber list;
- detect a trigger to determine the LPP for the radio link; and
- in response to detecting the trigger, generate the LPP notification and send the notify message to the LPP service consumer.

5. The apparatus of claim 1, wherein the second message is to cause the LPP service consumer to perform one or more operational decisions for link resource utilization based on the LPP notification.

6. The apparatus of claim 1, wherein the second message includes a time field to indicate a timestamp of the LPP, a type field to indicate an LPP type of the LPP, a value field to indicate a value of the LPP, and a probability field to indicate a likelihood that the LPP comes true or an estimated standard deviation of the LPP, wherein the LPP type is one of bandwidth, latency, jitter, round trip time (RTT), number of interrupts, out-of-order delivery of data packets, transmission power, bit error rate, bit error ratio (BER), packet loss rate, a packet reception rate (PRR), a signal-to-noise ratio (SNR), a signal-to-noise and interference ratio (SINR), a signal-plus-noise-plus-distortion to noise-plus-distortion (SINAD) ratio, a peak-to-average power ratio (PAPR), a Block Error Rate (BLER), a Reference Signal Received Power (RSRP), a Reference Signal Received Quality (RSRQ), a Received Signal Strength Indicator (RSSI), a channel interference measurement, a thermal noise power measurement, a received interference power measurement, network or cell load, a recommended transmission power.

7. The apparatus of claim 1, wherein, to determine the LPP, the processor circuitry is arranged to: combine the one or more predicted performance metrics from individual ones of the plurality of prediction layers with one or more other predicted performance metrics from at least one other prediction layer of the plurality of prediction layers.

8. The apparatus of claim 1, wherein each prediction layer of the plurality of prediction layers is arranged to use a machine learning (ML) algorithm to generate an ML model for corresponding NANs of the one or more NANs, and each prediction layer is arranged to use the ML model for the corresponding NANs to generate respective predicted performance metrics.

9. The apparatus of claim 8, wherein at least one prediction layer of the plurality of prediction layers is arranged to use an ML algorithm that is different than ML algorithms used by other prediction layers of the plurality of prediction layers.

10. The apparatus of claim 9, wherein the processor circuitry is arranged to operate individual prediction layers of the plurality of prediction layers in respective virtual machines (VMs) or application containers.

11. The apparatus of claim 10, wherein the apparatus is a System-On-Chip (SoC) or a Multi-Chip Package (MCP) disposed in a server computing system, the server computing system is to operate as an application server, an edge compute node, a web server, and one or more cloud compute nodes of a cloud computing service.

12. The apparatus of claim 1, wherein individual prediction layers of the plurality of prediction layers are to be operated by respective edge compute nodes, and the network interface circuitry is further arranged to receive the predicted performance metrics from the respective edge compute nodes.

13. The apparatus of claim 12, wherein the edge compute nodes include one or more servers of a Content Delivery Network (CDN), Nebula edge-cloud computing system, fog computing system, cloudlet edge-cloud computing system, Mobile Cloud Computing (MCC) system, Central Office Re-architected as a Datacenter (CORD) system, mobile CORD (M-CORD) system, Converged Multi-Access and Core (COMAC) computing system, or Multi-access Edge Computing (MEC) framework.

14. One or more non-transitory computer readable media (NTCRM) comprising instructions of a link performance prediction (LPP) service provider, wherein execution of the instructions by one or more processors is to cause a compute node to:
- obtain, from an LPP service consumer, a first message for requesting LPP services from the LPP service provider;
- obtain predicted performance metrics from individual prediction layers of a plurality of prediction layers;
- determine an LPP for a link of respective links over which the LPP service consumer is to obtain network services based on the obtained predicted performance metrics; and
- send, to the LPP service consumer, a second message including an LPP notification, the LPP notification including the determined LPP.

15. The one or more NTCRM of claim 14, wherein the first message is a request message, the second message is a reply message, and execution of the instructions is to cause the compute node to:
- determine the LPP based at least in part on information contained in the request message; and
- generate the LPP notification in response to receipt of the request message.

16. The one or more NTCRM of claim 14, wherein the first message is a subscribe message, the second message is a notify message, and execution of the instructions is to cause the compute node to:
- add an identifier associated with the LPP service consumer and information contained in the subscribe message to a subscriber list;
- detect a trigger to determine the LPP for the radio link; and
- in response to detecting the trigger, generate the LPP notification and send the notify message to the LPP service consumer.

17. The one or more NTCRM of claim 14, wherein the second message is to cause the LPP service consumer to perform one or more operational decisions for link resource utilization based on the LPP notification.

18. The one or more NTCRM of claim 14, wherein the plurality of layers includes a data collection layer, and execution of the instructions is to cause the compute node to operate the data collection layer to:
- collect and store, as spatio-temporal data, operational parameters, mobility information, and measurement information from a plurality of user equipment (UEs) or one or more network access nodes (NANs), wherein:
  - the operational parameters include one or more of hardware configuration information, subscription data, security permissions, processor speed, memory or storage capacity, average computation time per workload, reuse degree of computational resources, processor utilization, memory utilization, available memory, available processor resources, communication capabilities, available battery power, and a battery power budget, the mobility information indicating a speed and direction of travel of the plurality of UEs, and the mobility information includes one or more of global navigation satellite system (GNSS) data, mapping application data, turn-by-turn navigation data, signal measurement based calculations, Third Generation Partnership Project (3GPP) location based services, and the measurement information includes one or more of bandwidth, network or cell load, latency, jitter, round trip time (RTT), number of interrupts, out-of-order delivery of data packets, bit error rate, bit error ratio (BER), Block Error Rate (BLER), packet loss rate, packet reception rate (PRR), transmission power measurements, reception power measurements, Received Signal Strength Indicator (RSSI) measurements, Reference Signal Received Power (RSRP) measurements, Reference Signal Received Quality (RSRQ) measurements, peak-to-average power ratio (PAPR), channel interference measurement, thermal noise power measurement, received interference power measurement, signal-to-noise ratio (SNR) measurements, signal-to-noise and interference ratio (SINR) measurements, signal-plus-noise-plus-distortion to noise-plus-distortion (SINAD) ratio, GNSS timing information, GNSS code measurements, and GNSS carrier phase measurements.

19. The one or more NTCRM of claim 18, wherein the plurality of layers further includes a cell load layer, and execution of the instructions is to cause the compute node to operate the cell load layer to:

generate, for respective NANs of the one or more NANs, a cell load machine learning (ML) model using at least a subset of the spatio-temporal data and NAN characteristics of the respective NANs, the cell load ML model representing a predicted bandwidth or predicted resource utilization for the respective NANs at one or more time instances, and wherein, to generate the cell load ML model, execution of the instructions is to cause the compute node to operate the cell load layer to operate one or both of a Long Short Term Memory (LSTM) algorithm and a Recurrent Neural Network (RNN) using the subset of the spatio-temporal data and the NAN characteristics as an input; and determine, using the cell load ML model for the respective NANs, the predicted bandwidth or predicted resource utilization for the respective NANs at one or more future time instances.

20. The one or more NTCRM of claim 18, wherein the plurality of layers includes an intra-cell layer, and execution of the instructions is to cause the compute node to operate the intra-cell layer to:

generate an intra-cell ML model for respective NANs of the one or more NANs using at least a subset of the spatio-temporal data, the intra-cell ML model representing a predicted signal quality for a given UE within a coverage area of the respective NANs at one or more time instances, wherein, to generate the intra-cell ML model, execution of the instructions is to cause the compute node to: operate one or more of a pattern matching algorithm and a graph matching algorithm using the subset of the spatio-temporal data as an input; and determine, using the intra-cell ML model for the respective NANs, a predicted signal quality for each UE of the plurality of UEs within the coverage area of the respective NANs at one or more future time instances.

21. The one or more NTCRM of claim 20, wherein the plurality of layers includes a geoposition layer, and execution of the instructions is to cause the compute node to operate the geoposition layer to:

generate a geoposition ML model for the respective NANs using at least the subset of the spatio-temporal data, the geoposition ML model representing the predicted signal quality for a given UE at a given geolocation at the one or more time instances; and determine, using the geoposition ML model for the respective NANs, the predicted signal quality for each UE at one or more geolocations at the one or more future time instances.

22. The one or more NTCRM of claim 21, wherein, to generate the geoposition ML model, execution of the instructions is to cause the compute node to operate the geoposition layer to:

correlate the predicted signal quality for each UE with one or more measurements taken at the given geolocation at the one or more time instances.

23. The one or more NTCRM of claim 18, wherein the plurality of layers includes a cell transition layer, execution of the instructions is to cause the compute node to operate the cell transition layer to:

generate a cell transition ML model for respective NANs of the one or more NANs using at least the subset of the spatio-temporal data, the cell transition ML model representing a probability that a given UE will travel from a coverage area of the respective NANs to another coverage area of another NAN of the one or more NANs; and determine, using the cell transition ML model for the respective NANs, a predicted coverage area to be visited by each UE at one or more future time instances.

24. The one or more NTCRM of claim 23, wherein, to generate the cell transition ML model, execution of the instructions is to cause the compute node to operate the cell transition layer to:

operate a graph drawing algorithm to generate a graph data structure including a node to represent a corresponding one of the one or more NANs and an edge between the node and at least one other node, the edge representing a direction, time and probability of a transition between the node and the at least one other node; and operate a sequence prediction algorithm to determine, for each node in the graph data structure, a probability that the given UE will travel from the node to the at least one other node at a given time instance.

25. The one or more NTCRM of claim 24, wherein the graph drawing algorithm includes one or more of a forced-based layout algorithm, a spectral layout algorithm, and a tree layout algorithm; and wherein the sequence prediction algorithm includes one or more of a Compact Prediction Tree (CPT) algorithm, a Random Forest algorithm, and a graph traversal algorithm.

26. The one or more NTCRM of claim 18, wherein the plurality of layers includes a network topology layer, and execution of the instructions is to cause the compute node to operate the network topology layer to:

generate a network topology ML model using one or more NAN characteristics of respective NANs, the network topology ML model representing a predicted link quality for one or more backhaul links connected to the respective NANs at one or more time instances; and determine, using the network topology ML model for the respective NANs, a predicted link quality for each of the one or more backhaul links at one or more future time instances.

27. A computer-implemented link performance predictions (LPP) method, the method comprising:

receiving, by an LPP service provider from an LPP service consumer, a first message for requesting LPP services from the LPP service provider;

determining, by the LPP service provider, an LPP for a radio link based on combinations of predicted performance metrics obtained from one or more performance prediction layers; and sending, by the LPP service provider to the LPP service consumer, a second message including an LPP notification, the LPP notification indicating the determined LPP.

28. The method of claim 27, wherein the first message is a request message, the second message is a reply message, and the method further comprises:

determining, by the LPP service provider, the LPP for the radio link based at least in part on information contained in the request message; and generating, by the LPP service provider, the LPP notification in response to receipt of the request message.

29. The method of claim 27, wherein the first message is a subscribe message, the second message is a notify message, and the method further comprises:

adding, by the LPP service provider, the LPP service consumer and information contained in a request message to a subscriber list;

detecting, by the LPP service provider, a trigger to determine the LPP for the radio link; and in response to detecting the trigger,
generating, by the LPP service provider, the LPP notification, and
sending the notify message to the LPP service consumer.

30. The method of claim 27, wherein the second message is to cause the LPP service consumer to perform one or more operational decisions for link resource utilization based on the LPP notification.

* * * * *

UNITED STATES PATENT AND TRADEMARK OFFICE
CERTIFICATE OF CORRECTION

PATENT NO. : 11,711,284 B2
APPLICATION NO. : 17/505919
DATED : July 25, 2023
INVENTOR(S) : Svennebring et al.

Page 1 of 1

It is certified that error appears in the above-identified patent and that said Letters Patent is hereby corrected as shown below:

In the Claims

Column 84
Line 45: The word "radio" should be removed after "the" and before "link".

Signed and Sealed this
Twenty-sixth Day of September, 2023

Katherine Kelly Vidal
*Director of the United States Patent and Trademark Office*